US012811422B2

(12) United States Patent
Bertness

(10) Patent No.: US 12,811,422 B2
(45) Date of Patent: Nov. 24, 2026

(54) STACKABLE BATTERY MAINTENANCE SYSTEM

(71) Applicant: Midtronics, Inc., Willowbrook, IL (US)

(72) Inventor: Kevin I. Bertness, Batavia, IL (US)

(73) Assignee: MIDTRONICS, INC., Willowbrook, IL (US)

( * ) Notice: Subject to any disclaimer, the term of this patent is extended or adjusted under 35 U.S.C. 154(b) by 780 days.

(21) Appl. No.: 18/324,382

(22) Filed: May 26, 2023

(65) Prior Publication Data

US 2023/0387707 A1 Nov. 30, 2023

Related U.S. Application Data

(60) Provisional application No. 63/347,407, filed on May 31, 2022.

(51) Int. Cl.
*H02J 7/00* (2026.01)
*H02J 7/70* (2026.01)

(52) U.S. Cl.
CPC ................ *H02J 7/865* (2026.01); *H02J 7/70* (2026.01)

(58) Field of Classification Search
CPC .................................... H02J 7/865; H02J 7/70
USPC .......................................................... 320/128
See application file for complete search history.

(56) References Cited

U.S. PATENT DOCUMENTS 85,553 A 1/1869 Adams ............................ 33/472
2,000,665 A 5/1935 Neal ............................. 439/440
2,254,846 A 9/1941 Heyer ........................... 324/437
2,417,940 A 3/1947 Lehman ..................... 200/61.25
2,437,772 A 3/1948 Wall .............................. 324/523
2,514,745 A 7/1950 Dalzell .......................... 324/115
2,689,939 A 9/1954 Godshalk
2,727,221 A 12/1955 Springg ........................ 340/447
3,025,455 A 3/1962 Jonsson ........................ 323/369
3,178,686 A 4/1965 Mills ............................. 340/447
3,215,194 A 11/1965 Sununu et al. .............. 165/80.3
3,223,969 A 12/1965 Alexander .................... 340/447
3,267,452 A 8/1966 Wolf ............................. 340/249

(Continued)

FOREIGN PATENT DOCUMENTS

CN 2470964 Y 1/2002
CN 201063352 Y 5/2008

(Continued)

OTHER PUBLICATIONS

International Search Report for the Corresponding International Patent Application No. PCT/US2024/033558, dated Sep. 3, 2024, dated Jun. 12, 2024, 5 pages.

(Continued)

*Primary Examiner* — Suchin Parihar
(74) *Attorney, Agent, or Firm* — Westman, Champlin & Koehler, P.A.

(57) ABSTRACT

A battery maintenance system includes a first unit comprising a battery maintenance device, a second unit comprising a battery maintenance device, a third unit having a power supply and voltage input-output circuitry configured to couple to a battery and a fourth unit having an operator interface. Each of the first, second, third and fourth units are encased in a housing and include physical connectors that allow the first unit, the second unit, the third unit and the fourth unit to be coupled together in a stacked configuration in a user selectable order.

17 Claims, 16 Drawing Sheets

(56) References Cited

U.S. PATENT DOCUMENTS

| | | | | |
|---|---|---|---|---|
| 3,356,936 | A | 12/1967 | Smith | 324/429 |
| 3,562,634 | A | 2/1971 | Latner | 324/427 |
| 3,593,099 | A | 7/1971 | Scholl | 320/127 |
| 3,607,673 | A | 9/1971 | Seyl | 324/425 |
| 3,652,341 | A | 3/1972 | Halsall et al. | 29/623.2 |
| 3,676,770 | A | 7/1972 | Sharaf et al. | 324/430 |
| 3,699,433 | A | 10/1972 | Smith, Jr. | 324/523 |
| 3,704,439 | A | 11/1972 | Nelson | |
| 3,729,989 | A | 5/1973 | Little | 73/862.192 |
| 3,745,441 | A | 7/1973 | Soffer | 290/14 |
| 3,750,011 | A | 7/1973 | Kreps | 324/430 |
| 3,753,094 | A | 8/1973 | Furuishi et al. | 324/430 |
| 3,776,177 | A | 12/1973 | Bryant et al. | 116/311 |
| 3,796,124 | A | 3/1974 | Crosa | 411/521 |
| 3,808,401 | A | 4/1974 | Wright et al. | |
| 3,808,522 | A | 4/1974 | Sharaf | 324/430 |
| 3,808,573 | A | 4/1974 | Cappell | |
| 3,811,089 | A | 5/1974 | Strezelewicz | 324/170 |
| 3,816,805 | A | 6/1974 | Terry | 320/123 |
| 3,850,490 | A | 11/1974 | Zehr | 439/822 |
| 3,857,082 | A | 12/1974 | Van Opijnen | 320/143 |
| 3,873,911 | A | 3/1975 | Champlin | 324/430 |
| 3,876,931 | A | 4/1975 | Godshalk | 324/429 |
| 3,879,654 | A | 4/1975 | Kessinger | 324/434 |
| 3,886,426 | A | 5/1975 | Daggett | 320/117 |
| 3,886,443 | A | 5/1975 | Miyakawa et al. | 324/426 |
| 3,889,248 | A | 6/1975 | Ritter | 340/636.11 |
| 3,906,329 | A | 9/1975 | Bader | 320/134 |
| 3,909,708 | A | 9/1975 | Champlin | 324/431 |
| 3,920,284 | A | 11/1975 | Lane et al. | 303/122.06 |
| 3,936,744 | A | 2/1976 | Perlmutter | 324/772 |
| 3,939,400 | A | 2/1976 | Steele | 324/434 |
| 3,946,299 | A | 3/1976 | Christianson et al. | 320/430 |
| 3,947,757 | A | 3/1976 | Grube et al. | 324/416 |
| 3,969,667 | A | 7/1976 | McWilliams | 324/427 |
| 3,979,664 | A | 9/1976 | Harris | 324/397 |
| 3,984,762 | A | 10/1976 | Dowgiallo, Jr. | 324/430 |
| 3,984,768 | A | 10/1976 | Staples | 324/712 |
| 3,989,544 | A | 11/1976 | Santo | 429/65 |
| 3,997,830 | A | 12/1976 | Newell et al. | 320/102 |
| 4,008,619 | A | 2/1977 | Alcaide et al. | 73/724 |
| 4,023,882 | A | 5/1977 | Pettersson | 439/426 |
| 4,024,953 | A | 5/1977 | Nailor, III | 206/344 |
| 4,045,718 | A | 8/1977 | Gray | |
| 4,047,091 | A | 9/1977 | Hutchines et al. | 363/59 |
| 4,053,824 | A | 10/1977 | Dupuis et al. | 324/434 |
| 4,056,764 | A | 11/1977 | Endo et al. | 320/101 |
| 4,057,313 | A | 11/1977 | Polizzano | 439/219 |
| 4,070,624 | A | 1/1978 | Taylor | 324/772 |
| 4,086,531 | A | 4/1978 | Bernier | 324/772 |
| 4,106,025 | A | 8/1978 | Katz | 343/715 |
| 4,112,351 | A | 9/1978 | Back et al. | 324/380 |
| 4,114,083 | A | 9/1978 | Benham et al. | 340/636.13 |
| 4,126,874 | A | 11/1978 | Suzuki et al. | 396/301 |
| 4,160,916 | A | 7/1979 | Papasideris | 307/10.6 |
| 4,176,315 | A | 11/1979 | Sunnarborg | 324/133 |
| 4,178,546 | A | 12/1979 | Hulls et al. | 324/772 |
| 4,193,025 | A | 3/1980 | Frailing et al. | 324/427 |
| 4,207,610 | A | 6/1980 | Gordon | 701/33.9 |
| 4,207,611 | A | 6/1980 | Gordon | 701/33 |
| 4,217,645 | A | 8/1980 | Barry et al. | 702/63 |
| 4,218,745 | A | 8/1980 | Perkins | 324/66 |
| 4,280,457 | A | 7/1981 | Bloxham | 123/198 R |
| 4,295,468 | A | 10/1981 | Bartelt | |
| 4,297,639 | A | 10/1981 | Branham | 324/429 |
| 4,307,342 | A | 12/1981 | Peterson | 324/767 |
| 4,315,204 | A | 2/1982 | Sievers et al. | 322/28 |
| 4,316,185 | A | 2/1982 | Watrous et al. | 340/636.11 |
| 4,322,685 | A | 3/1982 | Frailing et al. | 324/429 |
| 4,351,405 | A | 9/1982 | Fields et al. | 180/65.2 |
| 4,352,067 | A | 9/1982 | Ottone | 324/434 |
| 4,360,780 | A | 11/1982 | Skutch, Jr. | 324/437 |
| 4,361,809 | A | 11/1982 | Bil et al. | 324/426 |
| 4,363,407 | A | 12/1982 | Buckler et al. | 209/3.3 |
| 4,369,407 | A | 1/1983 | Korbell | 324/416 |
| 4,379,989 | A | 4/1983 | Kurz et al. | 320/165 |
| 4,379,990 | A | 4/1983 | Sievers et al. | 322/99 |
| 4,385,269 | A | 5/1983 | Aspinwall et al. | 320/129 |
| 4,390,828 | A | 6/1983 | Converse et al. | 320/153 |
| 4,392,101 | A | 7/1983 | Saar et al. | 320/156 |
| 4,396,880 | A | 8/1983 | Windebank | 320/156 |
| 4,408,157 | A | 10/1983 | Beaubien | 324/712 |
| 4,412,169 | A | 10/1983 | Dell'Orto | 320/123 |
| 4,423,378 | A | 12/1983 | Marino et al. | 324/427 |
| 4,423,379 | A | 12/1983 | Jacobs et al. | 324/429 |
| 4,424,491 | A | 1/1984 | Bobbett et al. | 324/433 |
| 4,425,791 | A | 1/1984 | Kling | 73/116.02 |
| 4,441,359 | A | 4/1984 | Ezoe | 73/116.06 |
| 4,459,548 | A | 7/1984 | Lentz et al. | 324/472 |
| 4,484,140 | A | 11/1984 | Dieu | |
| 4,502,000 | A | 2/1985 | Mashikian | |
| 4,514,694 | A | 4/1985 | Finger | 324/429 |
| 4,520,353 | A | 5/1985 | McAuliffe | 340/636.16 |
| 4,521,498 | A | 6/1985 | Juergens | 429/59 |
| 4,544,312 | A | 10/1985 | Stencel | |
| 4,560,230 | A | 12/1985 | Inglis | 439/890 |
| 4,564,798 | A | 1/1986 | Young | 320/103 |
| 4,620,767 | A | 11/1986 | Woolf | 439/217 |
| 4,626,765 | A | 12/1986 | Tanaka | 320/127 |
| 4,633,418 | A | 12/1986 | Bishop | 702/63 |
| 4,637,359 | A | 1/1987 | Cook | 123/179 |
| 4,643,511 | A | 2/1987 | Gawlik | 439/755 |
| 4,659,977 | A | 4/1987 | Kissel et al. | 320/150 |
| 4,663,580 | A | 5/1987 | Wortman | 320/153 |
| 4,665,370 | A | 5/1987 | Holland | 324/429 |
| 4,667,143 | A | 5/1987 | Cooper et al. | 320/153 |
| 4,667,279 | A | 5/1987 | Maier | 363/46 |
| 4,678,998 | A | 7/1987 | Muramatsu | 324/427 |
| 4,679,000 | A | 7/1987 | Clark | 324/428 |
| 4,680,528 | A | 7/1987 | Mikami et al. | 320/165 |
| 4,686,442 | A | 8/1987 | Radomski | 320/123 |
| 4,697,134 | A | 9/1987 | Burkum et al. | 320/134 |
| 4,707,795 | A | 11/1987 | Alber et al. | 702/63 |
| 4,709,202 | A | 11/1987 | Koenck et al. | 320/112 |
| 4,710,861 | A | 12/1987 | Kanner | 363/46 |
| 4,719,428 | A | 1/1988 | Liebermann | 324/436 |
| 4,723,656 | A | 2/1988 | Kiernan et al. | 206/705 |
| 4,743,855 | A | 5/1988 | Randin et al. | 324/430 |
| 4,745,349 | A | 5/1988 | Palanisamy et al. | 320/125 |
| 4,773,011 | A | 9/1988 | VanHoose | 701/30 |
| 4,781,629 | A | 11/1988 | Mize | 439/822 |
| D299,909 | S | 2/1989 | Casey | D10/77 |
| 4,816,768 | A | 3/1989 | Champlin | 324/428 |
| 4,820,966 | A | 4/1989 | Fridman | 320/116 |
| 4,825,170 | A | 4/1989 | Champlin | 324/436 |
| 4,826,457 | A | 5/1989 | Varatta | 439/504 |
| 4,847,547 | A | 7/1989 | Eng, Jr. et al. | 320/153 |
| 4,849,700 | A | 7/1989 | Morioka et al. | 324/427 |
| 4,874,679 | A | 10/1989 | Miyagawa | 429/91 |
| 4,876,495 | A | 10/1989 | Palanisamy et al. | 320/106 |
| 4,881,038 | A | 11/1989 | Champlin | 324/426 |
| 4,885,523 | A | 12/1989 | Koench | 230/131 |
| 4,888,716 | A | 12/1989 | Ueno | 702/63 |
| 4,901,007 | A | 2/1990 | Sworm | 324/110 |
| 4,907,176 | A | 3/1990 | Bahnick et al. | 364/551.01 |
| 4,912,416 | A | 3/1990 | Champlin | 324/430 |
| 4,913,116 | A | 4/1990 | Katogi et al. | 123/406.32 |
| 4,926,330 | A | 5/1990 | Abe et al. | 701/33 |
| 4,929,931 | A | 5/1990 | McCuen | 340/636.15 |
| 4,931,738 | A | 6/1990 | MacIntyre et al. | 324/435 |
| 4,932,905 | A | 6/1990 | Richards | 439/822 |
| 4,933,845 | A | 6/1990 | Hayes | 710/104 |
| 4,934,957 | A | 6/1990 | Bellusci | 439/504 |
| 4,937,528 | A | 6/1990 | Palanisamy | 324/430 |
| 4,947,124 | A | 8/1990 | Hauser | 324/430 |
| 4,949,046 | A | 8/1990 | Seyfang | 324/427 |
| 4,956,597 | A | 9/1990 | Heavey et al. | 320/129 |
| 4,965,738 | A | 10/1990 | Bauer et al. | 320/136 |
| 4,968,941 | A | 11/1990 | Rogers | 324/428 |
| 4,968,942 | A | 11/1990 | Palanisamy | 324/430 |
| 4,969,834 | A | 11/1990 | Johnson | 439/141 |
| 4,983,086 | A | 1/1991 | Hatrock | 411/259 |
| 5,004,979 | A | 4/1991 | Marino et al. | 324/160 |
| 5,030,916 | A | 7/1991 | Bokitch | 324/503 |

(56) References Cited

U.S. PATENT DOCUMENTS 5,032,825 A 7/1991 Kuznicki ................ 340/636.15
5,034,893 A 7/1991 Fisher ................ 701/99
5,037,335 A 8/1991 Campbell ................ 439/217
5,037,778 A 8/1991 Stark et al. ................ 228/121
5,047,722 A 9/1991 Wurst et al. ................ 324/430
5,081,565 A 1/1992 Nabha et al. ................ 362/465
5,083,076 A 1/1992 Scott ................ 320/105
5,087,881 A 2/1992 Peacock ................ 324/378
5,095,223 A 3/1992 Thomas ................ 307/110
5,108,320 A 4/1992 Kimber ................ 439/883
5,109,213 A 4/1992 Williams ................ 340/447
5,126,675 A 6/1992 Yang ................ 324/435
5,130,658 A 7/1992 Bohmer ................ 324/435
5,140,269 A 8/1992 Champlin ................ 324/433
5,144,218 A 9/1992 Bosscha ................ 320/139
5,144,248 A 9/1992 Alexandres et al. ................ 324/428
D330,338 S 10/1992 Wang ................ D10/77
5,159,272 A 10/1992 Rao et al. ................ 324/429
5,160,881 A 11/1992 Schramm et al. ................ 322/7
5,164,653 A 11/1992 Reem
5,167,529 A 12/1992 Verge ................ 427/1
5,168,208 A 12/1992 Schultz et al. ................ 322/25
5,170,124 A 12/1992 Blair et al. ................ 324/434
5,179,335 A 1/1993 Nor ................ 320/159
5,187,382 A 2/1993 Kondo ................ 307/10.1
5,194,799 A 3/1993 Tomantschger ................ 320/103
5,202,617 A 4/1993 Nor
5,204,611 A 4/1993 Nor et al. ................ 320/145
5,214,370 A 5/1993 Harm et al. ................ 320/152
5,214,385 A 5/1993 Gabriel et al. ................ 324/434
5,223,747 A 6/1993 Tschulena ................ 257/713
5,241,275 A 8/1993 Fang ................ 324/430
5,254,952 A 10/1993 Salley et al. ................ 324/429
5,266,880 A 11/1993 Newland ................ 320/125
5,278,759 A 1/1994 Berra et al. ................ 701/1
5,281,919 A 1/1994 Palanisamy ................ 324/427
5,281,920 A 1/1994 Wurst ................ 324/430
5,295,078 A 3/1994 Stich et al. ................ 700/297
5,296,823 A 3/1994 Dietrich ................ 333/161
5,298,797 A 3/1994 Redl ................ 327/387
5,300,874 A 4/1994 Shimamoto et al. ................ 320/106
5,302,902 A 4/1994 Groehl ................ 324/434
5,309,052 A 5/1994 Kim ................ 174/350
5,313,152 A 5/1994 Wozniak et al. ................ 320/118
5,315,287 A 5/1994 Sol ................ 340/455
5,321,231 A 6/1994 Schmalzriedt et al.
5,321,626 A 6/1994 Palladino ................ 702/63
5,321,627 A 6/1994 Reher ................ 702/63
5,323,337 A 6/1994 Wilson et al. ................ 702/73
5,325,041 A 6/1994 Briggs ................ 320/149
5,331,268 A 7/1994 Patino et al. ................ 320/158
5,332,927 A 7/1994 Paul et al. ................ 307/66
5,336,993 A 8/1994 Thomas et al. ................ 324/158.1
5,338,515 A 8/1994 Dalla Betta et al. ................ 422/95
5,339,018 A 8/1994 Brokaw ................ 320/147
5,343,380 A 8/1994 Champlin ................ 363/46
5,345,384 A 9/1994 Przybyla et al. ................ 701/29.1
5,347,163 A 9/1994 Yoshimura ................ 307/66
5,349,535 A 9/1994 Gupta ................ 320/106
5,352,968 A 10/1994 Reni et al. ................ 320/136
5,357,519 A 10/1994 Martin et al. ................ 371/15.1
5,365,160 A 11/1994 Leppo et al. ................ 320/160
5,365,453 A 11/1994 Startup et al. ................ 702/36
5,369,364 A 11/1994 Renirie et al. ................ 324/430
5,381,096 A 1/1995 Hirzel ................ 324/427
5,384,540 A 1/1995 Dessel ................ 324/539
5,387,871 A 2/1995 Tsai ................ 324/429
5,394,093 A 2/1995 Cervas ................ 324/556
5,402,007 A 3/1995 Center et al. ................ 290/40 B
5,410,754 A 4/1995 Klotzbach et al. ................ 370/466
5,412,308 A 5/1995 Brown ................ 323/267
5,412,323 A 5/1995 Kato et al. ................ 324/429
5,425,041 A 6/1995 Seko et al. ................ 372/45.01
5,426,371 A 6/1995 Salley et al. ................ 324/429
5,426,416 A 6/1995 Jefferies et al. ................ 340/664
5,430,645 A 7/1995 Keller ................ 364/424.01
5,432,025 A 7/1995 Cox ................ 429/65
5,432,426 A 7/1995 Yoshida ................ 320/160
5,432,429 A 7/1995 Armstrong, II et al.
5,434,495 A 7/1995 Toko ................ 320/135
5,435,185 A 7/1995 Eagan ................ 73/587
5,442,274 A 8/1995 Tamai ................ 320/146
5,445,026 A 8/1995 Eagan ................ 73/591
5,449,996 A 9/1995 Matsumoto et al. ................ 320/148
5,449,997 A 9/1995 Gilmore et al. ................ 320/148
5,451,881 A 9/1995 Finger ................ 324/433
5,453,027 A 9/1995 Buell et al. ................ 439/433
5,457,377 A 10/1995 Jonsson ................ 324/430
5,459,660 A 10/1995 Berra ................ 701/33
5,462,439 A 10/1995 Keith ................ 180/279
5,469,043 A 11/1995 Cherng et al. ................ 320/161
5,485,090 A 1/1996 Stephens ................ 324/433
5,486,123 A 1/1996 Miyazaki ................ 439/825
5,488,300 A 1/1996 Jamieson ................ 324/432
5,504,674 A 4/1996 Chen et al. ................ 705/4
5,508,599 A 4/1996 Koenck ................ 320/138
5,519,383 A 5/1996 De La Rosa ................ 340/636.15
5,528,148 A 6/1996 Rogers ................ 320/137
5,537,967 A 7/1996 Tashiro et al. ................ 123/192.1
5,541,489 A 7/1996 Dunstan ................ 320/134
5,546,317 A 8/1996 Andrieu ................ 702/63
5,548,273 A 8/1996 Nicol et al. ................ 340/439
5,550,485 A 8/1996 Falk ................ 324/772
5,555,498 A 9/1996 Berra
5,561,380 A 10/1996 Sway-Tin et al. ................ 324/509
5,562,501 A 10/1996 Kinoshita et al. ................ 439/852
5,563,496 A 10/1996 McClure ................ 320/128
5,572,136 A 11/1996 Champlin ................ 324/426
5,573,611 A 11/1996 Koch et al. ................ 152/152.1
5,574,355 A 11/1996 McShane et al. ................ 320/161
5,578,915 A 11/1996 Crouch, Jr. et al. ................ 324/428
5,583,416 A 12/1996 Klang ................ 320/160
5,585,416 A 12/1996 Audett et al. ................ 522/35
5,585,728 A 12/1996 Champlin ................ 324/427
5,589,292 A 12/1996 Rozon
5,589,757 A 12/1996 Klang ................ 320/160
5,592,093 A 1/1997 Klingbiel ................ 324/426
5,592,094 A 1/1997 Ichikawa ................ 324/427
5,596,260 A 1/1997 Moravec et al. ................ 320/135
5,596,261 A 1/1997 Suyama ................ 320/152
5,598,098 A 1/1997 Champlin ................ 324/430
5,602,462 A 2/1997 Stich et al. ................ 323/258
5,606,242 A 2/1997 Hull et al. ................ 320/106
5,614,788 A 3/1997 Mullins et al. ................ 315/82
5,621,298 A 4/1997 Harvey ................ 320/134
5,631,536 A 5/1997 Tseng ................ 320/15
5,631,831 A 5/1997 Bird et al. ................ 701/34.4
5,633,985 A 5/1997 Severson et al. ................ 704/267
5,637,978 A 6/1997 Kellett et al. ................ 320/104
5,642,031 A 6/1997 Brotto ................ 320/156
5,644,212 A 7/1997 Takahashi ................ 320/134
5,650,937 A 7/1997 Bounaga ................ 702/65
5,652,501 A 7/1997 McClure et al. ................ 340/636.15
5,653,659 A 8/1997 Kunibe et al. ................ 477/111
5,654,623 A 8/1997 Shiga et al. ................ 320/106
5,656,920 A 8/1997 Cherng et al. ................ 324/431
5,661,368 A 8/1997 Deol et al. ................ 315/82
5,666,040 A 9/1997 Bourbeau ................ 320/118
5,675,234 A 10/1997 Greene ................ 340/636.11
5,677,077 A 10/1997 Faulk ................ 429/90
5,684,678 A 11/1997 Barrett ................ 363/17
5,685,734 A 11/1997 Kutz ................ 439/371
5,691,621 A 11/1997 Phuoc et al. ................ 320/134
5,699,050 A 12/1997 Kanazawa ................ 340/636.13
5,701,089 A 12/1997 Perkins ................ 324/772
5,705,929 A 1/1998 Caravello et al. ................ 324/430
5,707,015 A 1/1998 Guthrie ................ 241/120
5,710,503 A 1/1998 Sideris et al. ................ 320/116
5,711,648 A 1/1998 Hammerslag ................ 414/800
5,712,795 A 1/1998 Layman et al. ................ 700/297
5,717,336 A 2/1998 Basell et al. ................ 324/430
5,717,937 A 2/1998 Fritz ................ 713/300
5,721,688 A 2/1998 Bramwell ................ 324/426
5,732,074 A 3/1998 Spaur et al. ................ 370/313

(56) References Cited

U.S. PATENT DOCUMENTS

| | | | | |
|---|---|---|---|---|
| 5,739,667 | A | 4/1998 | Matsuda et al. | 320/128 |
| 5,744,962 | A | 4/1998 | Alber et al. | 324/426 |
| 5,745,044 | A | 4/1998 | Hyatt, Jr. et al. | 340/5.23 |
| 5,747,189 | A | 5/1998 | Perkins | 429/91 |
| 5,747,909 | A | 5/1998 | Syverson et al. | 310/156.56 |
| 5,747,967 | A | 5/1998 | Muljadi et al. | 320/148 |
| 5,754,417 | A | 5/1998 | Nicollini | 363/60 |
| 5,757,192 | A | 5/1998 | McShane et al. | 324/427 |
| 5,760,587 | A | 6/1998 | Harvey | 324/434 |
| 5,772,468 | A | 6/1998 | Kowalski et al. | 439/506 |
| 5,773,962 | A | 6/1998 | Nor | 320/134 |
| 5,773,978 | A | 6/1998 | Becker | 324/430 |
| 5,778,326 | A | 7/1998 | Moroto et al. | 701/22 |
| 5,780,974 | A | 7/1998 | Pabla et al. | 315/82 |
| 5,780,980 | A | 7/1998 | Naito | 318/139 |
| 5,789,899 | A | 8/1998 | van Phuoc et al. | 320/112 |
| 5,793,359 | A | 8/1998 | Ushikubo | 345/169 |
| 5,796,239 | A | 8/1998 | van Phuoc et al. | 320/107 |
| 5,808,469 | A | 9/1998 | Kopera | 324/434 |
| 5,811,979 | A | 9/1998 | Rhein | 324/718 |
| 5,818,201 | A | 10/1998 | Stockstad et al. | 320/119 |
| 5,818,234 | A | 10/1998 | McKinnon | 324/433 |
| 5,820,407 | A | 10/1998 | Morse et al. | 439/504 |
| 5,821,756 | A | 10/1998 | McShane et al. | 324/430 |
| 5,821,757 | A | 10/1998 | Alvarez et al. | 324/434 |
| 5,825,174 | A | 10/1998 | Parker | 324/106 |
| 5,826,467 | A | 10/1998 | Huang | |
| 5,831,435 | A | 11/1998 | Troy | 324/426 |
| 5,832,396 | A | 11/1998 | Moroto et al. | 701/22 |
| 5,850,113 | A | 12/1998 | Weimer et al. | 307/125 |
| 5,862,515 | A | 1/1999 | Kobayashi et al. | 702/63 |
| 5,865,638 | A | 2/1999 | Trafton | 439/288 |
| 5,869,951 | A | 2/1999 | Takahashi | 320/104 |
| 5,870,018 | A | 2/1999 | Person | 307/10.2 |
| 5,871,858 | A | 2/1999 | Thomsen et al. | 429/7 |
| 5,872,443 | A | 2/1999 | Williamson | 320/160 |
| 5,872,453 | A | 2/1999 | Shimoyama et al. | 324/431 |
| 5,883,306 | A | 3/1999 | Hwang | 73/146.8 |
| 5,884,202 | A | 3/1999 | Jomand | 701/31.4 |
| 5,894,222 | A | 4/1999 | Hibino | |
| 5,895,440 | A | 4/1999 | Proctor et al. | 702/63 |
| 5,903,154 | A | 5/1999 | Zhang et al. | 324/437 |
| 5,903,716 | A | 5/1999 | Kimber et al. | 395/114 |
| 5,912,534 | A | 6/1999 | Benedict | 315/82 |
| 5,914,605 | A | 6/1999 | Bertness | 324/430 |
| 5,916,287 | A | 6/1999 | Arjomand et al. | 701/33.2 |
| 5,927,938 | A | 7/1999 | Hammerslag | 414/809 |
| 5,929,609 | A | 7/1999 | Joy et al. | 322/25 |
| 5,935,180 | A | 8/1999 | Fieramosca et al. | 701/29.6 |
| 5,939,855 | A | 8/1999 | Proctor et al. | 320/104 |
| 5,939,861 | A | 8/1999 | Joko et al. | 320/122 |
| 5,945,829 | A | 8/1999 | Bertness | 324/430 |
| 5,946,605 | A | 8/1999 | Takahisa et al. | 455/68 |
| 5,950,144 | A | 9/1999 | Hall et al. | 702/108 |
| 5,951,229 | A | 9/1999 | Hammerslag | 414/398 |
| 5,953,322 | A | 9/1999 | Kimball | 370/328 |
| 5,955,951 | A | 9/1999 | Wischerop et al. | 340/572.8 |
| 5,961,561 | A | 10/1999 | Wakefield, II | 701/29 |
| 5,961,604 | A | 10/1999 | Anderson et al. | 709/229 |
| 5,963,012 | A | 10/1999 | Garcia et al. | 320/106 |
| 5,969,625 | A | 10/1999 | Russo | 340/636.19 |
| 5,973,598 | A | 10/1999 | Beigel | 340/572.1 |
| 5,978,805 | A | 11/1999 | Carson | 707/10 |
| 5,982,138 | A | 11/1999 | Krieger | 320/105 |
| 5,990,664 | A | 11/1999 | Rahman | 320/136 |
| 6,002,238 | A | 12/1999 | Champlin | 320/134 |
| 6,005,489 | A | 12/1999 | Siegle et al. | 340/825.69 |
| 6,005,759 | A | 12/1999 | Hart et al. | 361/66 |
| 6,008,652 | A | 12/1999 | Theofanopoulos et al. | 324/434 |
| 6,009,369 | A | 12/1999 | Boisvert et al. | 701/99 |
| 6,009,742 | A | 1/2000 | Balko | |
| 6,016,047 | A | 1/2000 | Notten et al. | 320/137 |
| 6,031,354 | A | 2/2000 | Wiley et al. | 320/116 |
| 6,031,368 | A | 2/2000 | Klippel et al. | 324/133 |
| 6,037,745 | A | 3/2000 | Koike et al. | 320/104 |

| | | | | |
|---|---|---|---|---|
| 6,037,749 | A | 3/2000 | Parsonage | 320/132 |
| 6,037,751 | A | 3/2000 | Klang | 320/160 |
| 6,037,777 | A | 3/2000 | Champlin | 324/430 |
| 6,037,778 | A | 3/2000 | Makhija | 324/433 |
| 6,046,514 | A | 4/2000 | Rouillard et al. | 307/77 |
| 6,051,976 | A | 4/2000 | Bertness | 324/426 |
| 6,055,468 | A | 4/2000 | Kaman et al. | 701/29 |
| 6,061,638 | A | 5/2000 | Joyce | 702/63 |
| 6,064,372 | A | 5/2000 | Kahkoska | 345/173 |
| 6,072,299 | A | 6/2000 | Kurle et al. | 320/112 |
| 6,072,300 | A | 6/2000 | Tsuji | 320/116 |
| 6,075,339 | A | 6/2000 | Reipur et al. | 320/110 |
| 6,076,018 | A | 6/2000 | La. | |
| 6,081,098 | A | 6/2000 | Bertness et al. | 320/134 |
| 6,081,109 | A | 6/2000 | Seymour et al. | 324/127 |
| 6,081,154 | A | 6/2000 | Ezell et al. | 327/540 |
| 6,087,815 | A | 7/2000 | Pfeifer et al. | 323/282 |
| 6,091,238 | A | 7/2000 | McDermott | 324/207.2 |
| 6,091,245 | A | 7/2000 | Bertness | 324/426 |
| 6,094,030 | A | 7/2000 | Gimthorpe et al. | |
| 6,094,033 | A | 7/2000 | Ding et al. | 320/132 |
| 6,097,193 | A | 8/2000 | Bramwell | 324/429 |
| 6,100,670 | A | 8/2000 | Levesque | 320/150 |
| 6,100,815 | A | 8/2000 | Pailthorp | 324/754.07 |
| 6,104,167 | A | 8/2000 | Bertness et al. | 320/132 |
| 6,113,262 | A | 9/2000 | Purola et al. | 374/45 |
| 6,114,834 | A | 9/2000 | Parise | 320/109 |
| 6,118,252 | A | 9/2000 | Richter | |
| 6,121,880 | A | 9/2000 | Scott et al. | 340/572.5 |
| 6,130,519 | A | 10/2000 | Whiting et al. | |
| 6,136,914 | A | 10/2000 | Hergenrother et al. | 524/495 |
| 6,137,261 | A | 10/2000 | Kurle et al. | |
| 6,137,269 | A | 10/2000 | Champlin | 320/150 |
| 6,140,797 | A | 10/2000 | Dunn | 320/105 |
| 6,141,608 | A | 10/2000 | Rother | 701/29.6 |
| 6,144,185 | A | 11/2000 | Dougherty et al. | 320/132 |
| 6,147,598 | A | 11/2000 | Murphy et al. | 340/426.19 |
| 6,149,653 | A | 11/2000 | Deslauriers | 606/232 |
| 6,150,793 | A | 11/2000 | Lesesky et al. | 320/104 |
| 6,158,000 | A | 12/2000 | Collins | 713/1 |
| 6,161,640 | A | 12/2000 | Yamaguchi | 180/65.8 |
| 6,163,156 | A | 12/2000 | Bertness | 324/426 |
| 6,164,063 | A | 12/2000 | Mendler | 60/274 |
| 6,167,349 | A | 12/2000 | Alvarez | 702/63 |
| 6,172,483 | B1 | 1/2001 | Champlin | 320/134 |
| 6,172,505 | B1 | 1/2001 | Bertness | 324/430 |
| 6,177,737 | B1 | 1/2001 | Palfey et al. | 307/64 |
| 6,177,878 | B1 | 1/2001 | Tamura | |
| 6,181,545 | B1 | 1/2001 | Amatucci et al. | 361/502 |
| 6,184,655 | B1 | 2/2001 | Malackowski | 320/116 |
| 6,184,656 | B1 | 2/2001 | Karunasiri et al. | 320/119 |
| 6,191,557 | B1 | 2/2001 | Gray et al. | 320/132 |
| 6,202,739 | B1 | 3/2001 | Pal et al. | 165/104.33 |
| 6,211,651 | B1 | 4/2001 | Nemoto | 320/133 |
| 6,211,653 | B1 | 4/2001 | Stasko | 320/132 |
| 6,215,275 | B1 | 4/2001 | Bean | 320/106 |
| 6,218,805 | B1 | 4/2001 | Melcher | 320/105 |
| 6,218,936 | B1 | 4/2001 | Imao | 340/447 |
| 6,222,342 | B1 | 4/2001 | Eggert et al. | 320/105 |
| 6,222,369 | B1 | 4/2001 | Champlin | 324/430 |
| D442,503 | S | 5/2001 | Lundbeck et al. | D10/77 |
| 6,225,808 | B1 | 5/2001 | Varghese et al. | 324/426 |
| 6,225,898 | B1 | 5/2001 | Kamiya et al. | 340/505 |
| 6,236,186 | B1 | 5/2001 | Helton et al. | 320/106 |
| 6,236,332 | B1 | 5/2001 | Conkright et al. | 340/3.1 |
| 6,236,949 | B1 | 5/2001 | Hart | 702/64 |
| 6,238,253 | B1 | 5/2001 | Qualls | 439/759 |
| 6,242,887 | B1 | 6/2001 | Burke | 320/104 |
| 6,242,921 | B1 | 6/2001 | Thibedeau et al. | 324/429 |
| 6,249,124 | B1 | 6/2001 | Bertness | 324/426 |
| 6,250,973 | B1 | 6/2001 | Lowery et al. | 439/763 |
| 6,252,942 | B1 | 6/2001 | Zoiss | 379/19 |
| 6,254,438 | B1 | 7/2001 | Gaunt | 439/755 |
| 6,255,826 | B1 | 7/2001 | Ohsawa | 320/116 |
| 6,259,170 | B1 | 7/2001 | Limoge et al. | 307/10.8 |
| 6,259,254 | B1 | 7/2001 | Klang | 324/427 |
| 6,262,563 | B1 | 7/2001 | Champlin | 320/134 |
| 6,262,692 | B1 | 7/2001 | Babb | 343/895 |
| 6,263,268 | B1 | 7/2001 | Nathanson | 701/29 |

(56) References Cited

U.S. PATENT DOCUMENTS 6,263,322 B1 7/2001 Kirkevold et al. ........... 705/400
6,271,643 B1 8/2001 Becker et al. ................ 320/112
6,271,748 B1 8/2001 Derbyshire et al. .......... 340/442
6,272,387 B1 8/2001 Yoon .............................. 700/83
6,275,008 B1 8/2001 Arai et al. .................... 320/132
6,285,191 B1 9/2001 Gollomp et al. ............. 324/427
6,294,896 B1 9/2001 Champlin ..................... 320/134
6,294,897 B1 9/2001 Champlin ..................... 320/153
6,304,087 B1 10/2001 Bertness ....................... 324/426
6,307,349 B1 10/2001 Koenck et al. ............... 320/112
6,310,481 B2 10/2001 Bertness ....................... 324/430
6,313,607 B1 11/2001 Champlin ..................... 320/132
6,313,608 B1 11/2001 Varghese et al. ............ 320/132
6,316,914 B1 11/2001 Bertness ....................... 320/134
6,320,385 B1 11/2001 Ng et al. ....................... 320/104
6,323,650 B1 11/2001 Bertness et al. ............. 324/426
6,324,042 B1 11/2001 Andrews ...................... 361/93.2
6,329,793 B1 12/2001 Bertness et al. ............. 320/132
6,331,762 B1 12/2001 Bertness ....................... 320/134
6,332,113 B1 12/2001 Bertness ......................... 702/63
6,346,795 B2 2/2002 Haraguchi et al. ........... 320/136
6,347,958 B1 2/2002 Tsai .............................. 439/488
6,351,102 B1 2/2002 Troy ............................. 320/139
6,356,042 B1 3/2002 Kahlon et al. ................ 318/138
6,356,083 B1 3/2002 Ling ............................. 324/426
6,359,441 B1 3/2002 Bertness ....................... 324/426
6,359,442 B1 3/2002 Henningson et al. ........ 324/426
6,363,303 B1 3/2002 Bertness ......................... 701/29
RE37,677 E 4/2002 Irie ................................. 315/83
6,377,031 B1 4/2002 Karuppana et al. .......... 323/220
6,384,608 B1 5/2002 Namaky ....................... 324/430
6,388,448 B1 5/2002 Cervas .......................... 324/426
6,389,337 B1 5/2002 Kolls ........................... 701/31.6
6,392,414 B2 5/2002 Bertness ....................... 324/429
6,396,278 B1 5/2002 Makhija ........................ 324/402
6,407,554 B1 6/2002 Godau et al. ................. 324/503
6,411,098 B1 6/2002 Laletin .......................... 324/436
6,417,669 B1 7/2002 Champlin ..................... 324/426
6,420,852 B1 7/2002 Sato .............................. 320/134
6,424,157 B1 7/2002 Gollomp et al. ............. 324/430
6,424,158 B2 7/2002 Klang ........................... 324/433
6,426,606 B1 7/2002 Purkey
6,433,512 B1 8/2002 Birkler et al. ................ 320/132
6,437,957 B1 8/2002 Karuppana et al. ............ 361/78
6,441,585 B1 8/2002 Bertness ....................... 320/132
6,445,158 B1 9/2002 Bertness et al. ............. 320/104
6,448,778 B1 9/2002 Rankin ......................... 324/503
6,449,726 B1 9/2002 Smith ........................... 713/340
6,456,036 B1 9/2002 Thandiwe ..................... 320/106
6,456,045 B1 9/2002 Troy et al. .................... 320/139
6,465,908 B1 10/2002 Karuppana et al. ............ 307/31
6,466,025 B1 10/2002 Klang ........................... 324/429
6,466,026 B1 10/2002 Champlin ..................... 324/430
6,469,511 B1 10/2002 Vonderhaar et al. ......... 324/425
6,473,659 B1 10/2002 Shah et al. ...................... 700/79
6,477,478 B1 11/2002 Jones et al. ................... 702/102
6,495,990 B2 12/2002 Champlin ..................... 320/132
6,497,209 B1 12/2002 Karuppana et al. ....... 123/179.3
6,500,025 B1 12/2002 Moenkhaus et al. ......... 439/502
6,501,243 B1 12/2002 Kaneko ......................... 318/139
6,505,507 B1 1/2003 Imao ........................... 73/146.5
6,507,196 B2 1/2003 Thomsen et al. ............. 324/436
6,526,361 B1 2/2003 Jones et al. ..................... 702/63
6,529,723 B1 3/2003 Bentley ......................... 455/405
6,531,847 B1 3/2003 Tsukamoto et al.
6,531,848 B1 3/2003 Chitsazan et al. ............ 320/153
6,532,425 B1 3/2003 Boost et al. .................... 702/63
6,533,316 B2 3/2003 Breed et al. .................. 280/735
6,534,992 B2 3/2003 Meissner et al. ............. 324/426
6,534,993 B2 3/2003 Bertness ....................... 324/433
6,536,536 B1 3/2003 Gass et al. ......................... 173/2
6,544,078 B2 4/2003 Palmisano et al. ........... 439/762
6,545,599 B2 4/2003 Derbyshire et al. .......... 340/442
6,556,019 B2 4/2003 Bertness ....................... 324/426
6,566,883 B1 5/2003 Vonderhaar et al. ......... 324/426
6,570,385 B1 5/2003 Roberts et al. ............... 324/378
6,573,685 B2 6/2003 Nakanishi et al.
6,577,107 B2 6/2003 Kechmire ..................... 320/139
6,586,941 B2 7/2003 Bertness et al. ............. 324/426
6,597,150 B1 7/2003 Bertness et al. ............. 320/104
6,599,243 B2 7/2003 Woltermann et al. ........ 600/300
6,600,815 B1 7/2003 Walding ..................... 379/93.07
6,611,740 B2 8/2003 Lowrey et al. ................. 701/29
6,614,349 B1 9/2003 Proctor et al. ............. 340/572.1
6,618,644 B2 9/2003 Bean ............................. 700/231
6,621,272 B2 9/2003 Champlin ..................... 324/426
6,623,314 B1 9/2003 Cox et al. ..................... 439/759
6,624,635 B1 9/2003 Lui ............................... 324/426
6,628,011 B2 9/2003 Droppo et al. ................. 307/43
6,629,054 B2 9/2003 Makhija et al. .............. 702/113
6,633,165 B2 10/2003 Bertness ....................... 324/426
6,635,974 B1 10/2003 Karuppana et al. .......... 307/140
6,636,790 B1 10/2003 Lightner et al. ............. 701/31.5
6,667,624 B1 12/2003 Raichle et al. ............... 324/522
6,679,212 B2 1/2004 Kelling .................... 123/179.28
6,686,542 B2 2/2004 Zhang ............................ 174/74
6,696,819 B2 2/2004 Bertness ....................... 320/134
6,707,303 B2 3/2004 Bertness et al. ............. 324/426
6,732,031 B1 5/2004 Lightner et al. ............. 701/31.4
6,736,941 B2 5/2004 Oku et al. ....................... 203/68
6,737,831 B2 5/2004 Champlin ..................... 320/132
6,738,697 B2 5/2004 Breed ............................. 701/29
6,740,990 B2 5/2004 Tozuka et al. ................. 307/9.1
6,744,149 B1 6/2004 Karuppana et al. ............ 307/31
6,745,153 B2 6/2004 White et al. .................. 702/184
6,759,849 B2 7/2004 Bertness ....................... 324/426
6,771,073 B2 8/2004 Henningson et al. ........ 324/426
6,777,945 B2 8/2004 Roberts et al. ............... 324/426
6,781,344 B1 8/2004 Hedegor et al. .............. 320/106
6,781,382 B2 8/2004 Johnson ........................ 324/426
6,784,635 B2 8/2004 Larson .......................... 320/104
6,784,637 B2 8/2004 Raichle et al. ............... 320/107
6,788,025 B2 9/2004 Bertness et al. ............. 320/104
6,795,782 B2 9/2004 Bertness et al. ................ 702/63
6,796,841 B1 9/2004 Cheng et al. .............. 439/620.3
6,805,090 B2 10/2004 Bertness et al. ............. 123/198
6,806,716 B2 10/2004 Bertness et al. ............. 324/426
6,825,669 B2 11/2004 Raichle et al. ............... 324/426
6,832,141 B2 12/2004 Skeen et al. ................. 701/31.4
6,842,707 B2 1/2005 Raichle et al. ................. 702/62
6,845,279 B1 1/2005 Gilmore et al. .............. 700/115
6,850,037 B2 2/2005 Bertness ....................... 320/132
6,856,162 B1 2/2005 Greatorex et al. ....... 324/764.01
6,856,972 B1 2/2005 Yun et al. ................... 705/36 R
6,871,151 B2 3/2005 Bertness ......................... 702/63
6,885,195 B2 4/2005 Bertness ....................... 324/426
6,888,468 B2 5/2005 Bertness .................. 340/636.15
6,891,378 B2 5/2005 Bertness et al. ............. 324/426
6,895,809 B2 5/2005 Raichle ........................... 73/119
6,904,796 B2 6/2005 Pacsai et al. ................ 73/146.8
6,906,522 B2 6/2005 Bertness et al. ............. 324/426
6,906,523 B2 6/2005 Bertness et al. ............. 324/426
6,906,624 B2 6/2005 Mcclelland et al. .......... 340/442
6,909,287 B2 6/2005 Bertness ....................... 324/427
6,909,356 B2 6/2005 Brown et al. .................. 340/3.2
6,911,825 B2 6/2005 Namaky ....................... 324/426
6,913,483 B2 7/2005 Restaino et al. .............. 439/504
6,914,413 B2 7/2005 Bertness et al. ............. 320/104
6,919,725 B2 7/2005 Bertness et al. ............. 324/433
6,930,485 B2 8/2005 Bertness et al. ............. 324/426
6,933,727 B2 8/2005 Bertness et al. ............. 324/426
6,941,234 B2 9/2005 Bertness et al. ................ 702/63
6,957,133 B1 10/2005 Hunt et al. .................. 701/32.4
6,961,445 B1 11/2005 Jensen et al.
6,967,484 B2 11/2005 Bertness ....................... 324/426
6,972,662 B1 12/2005 Ohkawa et al. ............. 340/10.1
6,983,212 B2 1/2006 Burns ............................. 702/63
6,988,053 B2 1/2006 Namaky ....................... 320/104
6,993,421 B2 1/2006 Pillar et al. .................. 701/29.4
6,998,847 B2 2/2006 Bertness et al. ............. 324/426
7,003,410 B2 2/2006 Bertness et al. ................ 702/63
7,003,411 B2 2/2006 Bertness ......................... 702/63
7,012,433 B2 3/2006 Smith et al. .................. 324/426
7,015,674 B2 3/2006 VonderHaar .................. 320/103

(56) References Cited

U.S. PATENT DOCUMENTS

| | | | | |
|---|---|---|---|---|
| 7,029,338 | B1 | 4/2006 | Orange et al. | 439/755 |
| 7,034,541 | B2 | 4/2006 | Bertness et al. | 324/426 |
| 7,039,533 | B2 | 5/2006 | Bertness et al. | 702/63 |
| 7,042,346 | B2 | 5/2006 | Paulsen | 340/438 |
| 7,049,822 | B2 | 5/2006 | Kung | 324/426 |
| 7,058,525 | B2 | 6/2006 | Bertness et al. | 702/63 |
| 7,069,979 | B2 | 7/2006 | Tobias | 165/104.33 |
| 7,081,755 | B2 | 7/2006 | Klang et al. | 324/426 |
| 7,089,127 | B2 | 8/2006 | Thibedeau et al. | 702/63 |
| 7,098,666 | B2 | 8/2006 | Patino | 324/433 |
| 7,102,556 | B2 | 9/2006 | White | 341/141 |
| 7,106,070 | B2 | 9/2006 | Bertness et al. | 324/538 |
| 7,116,109 | B2 | 10/2006 | Klang | 324/426 |
| 7,119,686 | B2 | 10/2006 | Bertness et al. | 340/572.1 |
| 7,120,488 | B2 | 10/2006 | Nova et al. | 600/2 |
| 7,126,341 | B2 | 10/2006 | Bertness et al. | 324/426 |
| 7,129,706 | B2 | 10/2006 | Kalley | 324/426 |
| 7,154,276 | B2 | 12/2006 | Bertness | 324/503 |
| 7,170,393 | B2 | 1/2007 | Martin | 340/10.1 |
| 7,173,182 | B2 | 2/2007 | Katsuyama | 174/36 |
| 7,177,925 | B2 | 2/2007 | Carcido et al. | 709/223 |
| 7,182,147 | B2 | 2/2007 | Cutler et al. | 173/1 |
| 7,184,866 | B2 | 2/2007 | Squires | 340/426.15 |
| 7,184,905 | B2 | 2/2007 | Stefan | 702/63 |
| 7,198,510 | B2 | 4/2007 | Bertness | 439/500 |
| 7,200,424 | B2 | 4/2007 | Tischer et al. | 455/567 |
| 7,202,636 | B2 | 4/2007 | Reynolds et al. | 320/166 |
| 7,208,914 | B2 | 4/2007 | Klang | 320/132 |
| 7,209,850 | B2 | 4/2007 | Brott et al. | 324/426 |
| 7,209,860 | B2 | 4/2007 | Trsar et al. | 702/183 |
| 7,212,887 | B2 | 5/2007 | Shah et al. | 700/276 |
| 7,212,911 | B2 | 5/2007 | Raichle et al. | 701/114 |
| 7,219,023 | B2 | 5/2007 | Banke et al. | 702/58 |
| 7,233,128 | B2 | 6/2007 | Brost et al. | 320/132 |
| 7,235,977 | B2 | 6/2007 | Koran et al. | 324/426 |
| 7,246,015 | B2 | 7/2007 | Bertness et al. | 702/63 |
| 7,251,551 | B2 | 7/2007 | Mitsueda | 700/2 |
| 7,272,519 | B2 | 9/2007 | Lesesky et al. | 702/63 |
| 7,287,001 | B1 | 10/2007 | Falls et al. | 705/22 |
| 7,295,936 | B2 | 11/2007 | Bertness et al. | 702/63 |
| 7,301,303 | B1 | 11/2007 | Hulden | 320/103 |
| 7,319,304 | B2 | 1/2008 | Veloo et al. | 320/134 |
| 7,339,477 | B2 | 3/2008 | Puzio et al. | 340/572.1 |
| 7,363,175 | B2 | 4/2008 | Bertness et al. | 702/63 |
| 7,376,497 | B2 | 5/2008 | Chen | 701/31.6 |
| 7,398,176 | B2 | 7/2008 | Bertness | 702/140 |
| 7,408,358 | B2 | 8/2008 | Knopf | 324/426 |
| 7,417,437 | B1 * | 8/2008 | Torres | B62B 1/10<br>324/426 |
| 7,425,833 | B2 | 9/2008 | Bertness et al. | 324/426 |
| 7,446,536 | B2 | 11/2008 | Bertness | 324/426 |
| 7,453,238 | B2 | 11/2008 | Melichar | 320/132 |
| 7,479,763 | B2 | 1/2009 | Bertness | 320/134 |
| 7,498,767 | B2 | 3/2009 | Brown et al. | 320/107 |
| 7,501,795 | B2 | 3/2009 | Bertness et al. | 320/134 |
| 7,504,830 | B2 | 3/2009 | Keuss | |
| 7,505,856 | B2 | 3/2009 | Restaino et al. | 702/63 |
| 7,538,571 | B2 | 5/2009 | Raichle et al. | 324/772 |
| 7,545,146 | B2 | 6/2009 | Klang et al. | 324/426 |
| 7,557,586 | B1 | 7/2009 | Vonderhaar et al. | 324/437 |
| 7,571,035 | B2 | 8/2009 | Raichle | |
| 7,590,476 | B2 | 9/2009 | Shumate | 701/31.6 |
| 7,592,776 | B2 | 9/2009 | Tsukamoto et al. | 320/136 |
| 7,595,643 | B2 | 9/2009 | Klang | 324/426 |
| 7,596,437 | B1 | 9/2009 | Hunt et al. | |
| 7,598,699 | B2 | 10/2009 | Restaino et al. | 320/105 |
| 7,598,743 | B2 | 10/2009 | Bertness | 324/426 |
| 7,598,744 | B2 | 10/2009 | Bertness et al. | 324/426 |
| 7,619,417 | B2 | 11/2009 | Klang | 324/427 |
| 7,642,786 | B2 | 1/2010 | Philbrook | 324/426 |
| 7,642,787 | B2 | 1/2010 | Bertness et al. | 324/426 |
| 7,656,162 | B2 | 2/2010 | Vonderhaar et al. | 324/426 |
| 7,657,386 | B2 | 2/2010 | Thibedeau et al. | 702/63 |
| 7,667,437 | B2 | 2/2010 | Johnson et al. | 320/150 |
| 7,679,325 | B2 | 3/2010 | Seo | 320/116 |
| 7,684,908 | B1 | 3/2010 | Ogilvie et al. | 701/29.6 |
| 7,688,074 | B2 | 3/2010 | Cox et al. | 324/426 |
| 7,690,573 | B2 | 4/2010 | Raichle et al. | 235/462 |
| 7,696,759 | B2 | 4/2010 | Raichle et al. | 324/538 |
| 7,698,179 | B2 | 4/2010 | Leung et al. | 705/28 |
| 7,705,602 | B2 | 4/2010 | Bertness | 324/426 |
| 7,706,991 | B2 | 4/2010 | Bertness et al. | 702/63 |
| 7,706,992 | B2 | 4/2010 | Ricci et al. | |
| 7,710,119 | B2 | 5/2010 | Bertness | 324/426 |
| 7,723,993 | B2 | 5/2010 | Klang | 324/431 |
| 7,728,556 | B2 | 6/2010 | Yano et al. | 320/134 |
| 7,728,597 | B2 | 6/2010 | Bertness | 324/426 |
| 7,729,880 | B1 | 6/2010 | Mashburn | 702/151 |
| 7,743,788 | B2 | 6/2010 | Schmitt | 137/554 |
| 7,751,953 | B2 | 7/2010 | Namaky | 701/33.2 |
| 7,772,850 | B2 | 8/2010 | Bertness | 324/426 |
| 7,774,130 | B2 | 8/2010 | Pepper | 340/439 |
| 7,774,151 | B2 | 8/2010 | Bertness | 702/63 |
| 7,777,612 | B2 | 8/2010 | Sampson et al. | 340/426.1 |
| 7,791,348 | B2 | 9/2010 | Brown et al. | 324/426 |
| 7,797,995 | B2 | 9/2010 | Schaefer | |
| 7,808,375 | B2 | 10/2010 | Bertness et al. | 340/455 |
| 7,848,857 | B2 | 12/2010 | Nasr et al. | 701/22 |
| 7,883,002 | B2 | 2/2011 | Jin et al. | 235/376 |
| 7,902,990 | B2 | 3/2011 | Delmonico et al. | 340/636.1 |
| 7,914,350 | B1 | 3/2011 | Bozich | 439/506 |
| 7,924,015 | B2 | 4/2011 | Bertness | 324/427 |
| 7,940,052 | B2 | 5/2011 | Vonderhaar | |
| 7,940,053 | B2 | 5/2011 | Brown et al. | 324/426 |
| 7,959,476 | B2 | 6/2011 | Smith et al. | |
| 7,977,914 | B2 | 7/2011 | Bertness | |
| D643,759 | S | 8/2011 | Bertness | |
| 7,990,155 | B2 | 8/2011 | Henningson | 324/429 |
| 7,999,505 | B2 | 8/2011 | Bertness | 320/104 |
| 8,024,083 | B2 | 9/2011 | Chenn | 701/2 |
| 8,047,868 | B1 | 11/2011 | Korcynski | 439/522 |
| 8,164,343 | B2 | 4/2012 | Bertness | 324/503 |
| 8,198,900 | B2 | 6/2012 | Bertness et al. | |
| 8,203,345 | B2 | 6/2012 | Bertness | |
| 8,222,868 | B2 | 7/2012 | Buckner | 320/136 |
| 8,226,008 | B2 | 7/2012 | Raichle et al. | 235/462.13 |
| 8,237,448 | B2 | 8/2012 | Bertness | |
| 8,306,690 | B2 | 11/2012 | Bertness | 701/34.4 |
| 8,310,271 | B2 | 11/2012 | Raichle et al. | 324/765.01 |
| 8,344,685 | B2 | 1/2013 | Bertness et al. | |
| 8,436,619 | B2 | 5/2013 | Bertness et al. | |
| 8,442,877 | B2 | 5/2013 | Bertness et al. | |
| 8,449,560 | B2 | 5/2013 | Roth | 227/175.1 |
| 8,493,022 | B2 | 7/2013 | Bertness | |
| D687,727 | S | 8/2013 | Kehoe et al. | |
| 8,509,212 | B2 | 8/2013 | Sanjeev | |
| 8,513,949 | B2 | 8/2013 | Bertness | |
| 8,594,957 | B2 | 11/2013 | Gauthier | 324/548 |
| 8,674,654 | B2 | 3/2014 | Bertness | |
| 8,674,711 | B2 | 3/2014 | Bertness | |
| 8,704,483 | B2 | 4/2014 | Bertness et al. | |
| 8,738,309 | B2 | 5/2014 | Bertness | |
| 8,754,653 | B2 | 6/2014 | Volderhaar et al. | |
| 8,810,200 | B2 | 8/2014 | Kondo | |
| 8,825,272 | B1 | 9/2014 | Chinnadurai | |
| 8,827,729 | B2 | 9/2014 | Gunreben | 439/188 |
| 8,872,516 | B2 | 10/2014 | Bertness | |
| 8,872,517 | B2 | 10/2014 | Philbrook et al. | |
| 8,901,888 | B1 | 12/2014 | Beckman | |
| 8,958,998 | B2 | 2/2015 | Bertness | |
| 8,963,550 | B2 | 2/2015 | Bertness et al. | |
| 9,018,958 | B2 | 4/2015 | Bertness | |
| 9,037,394 | B2 | 5/2015 | Fernandes | 701/400 |
| 9,052,366 | B2 | 6/2015 | Bertness | |
| 9,056,556 | B1 | 6/2015 | Hyde et al. | |
| 9,166,261 | B2 | 10/2015 | Ibi | |
| 9,201,120 | B2 | 12/2015 | Stukenburg | |
| 9,229,062 | B2 | 1/2016 | Stukenberg | |
| 9,244,100 | B2 | 1/2016 | Coleman et al. | |
| 9,255,955 | B2 | 2/2016 | Bertness | 324/503 |
| 9,274,157 | B2 | 3/2016 | Bertness | |
| 9,312,575 | B2 | 4/2016 | Stukenberg | |
| 9,335,362 | B2 | 5/2016 | Bertness | |
| 9,419,311 | B2 | 8/2016 | Bertness | |

(56) References Cited

U.S. PATENT DOCUMENTS

| | | | | |
|---|---|---|---|---|
| 9,425,487 | B2 | 8/2016 | Bertness | |
| 9,496,720 | B2 | 11/2016 | McShane | |
| 9,588,185 | B2 | 3/2017 | Champlin | |
| 9,639,899 | B1 | 5/2017 | Gersitz | |
| 9,923,289 | B2 | 3/2018 | Bertness | |
| 9,966,676 | B2 | 5/2018 | Salo, III et al. | |
| 10,046,649 | B2 | 8/2018 | Bertness | |
| 10,222,397 | B2 | 3/2019 | Salo et al. | |
| 10,317,468 | B2 | 6/2019 | Bertness | |
| 10,429,449 | B2 | 10/2019 | Arnoldus | |
| 10,473,555 | B2 | 11/2019 | Bertness | |
| 10,525,841 | B2 | 1/2020 | Zhou et al. | |
| 10,536,007 | B2 | 1/2020 | Beaston | |
| 10,608,353 | B2 | 3/2020 | Lipkin et al. | |
| 10,843,574 | B2 | 11/2020 | Palmisano et al. | |
| 11,054,480 | B2 | 7/2021 | Bertness | |
| 11,325,479 | B2 | 5/2022 | Bertness | |
| 11,474,153 | B2 | 10/2022 | Salo, III et al. | |
| 11,486,930 | B2 | 11/2022 | Salo, III et al. | |
| 11,513,160 | B2 | 11/2022 | Salo, III et al. | |
| 11,545,839 | B2 | 1/2023 | Sampson et al. | |
| 11,548,404 | B2 | 1/2023 | Bertness | |
| 11,566,972 | B2 | 1/2023 | Sampson et al. | |
| 11,650,259 | B2 | 5/2023 | Bertness | |
| 11,668,779 | B2 | 6/2023 | Bertness | |
| 11,740,294 | B2 | 8/2023 | Bertness | |
| 11,745,593 | B1 | 9/2023 | Awad Alla | |
| 11,926,224 | B2 | 3/2024 | Bertness | |
| 11,973,202 | B2 | 4/2024 | Bertness | |
| 12,070,847 | B1 | 8/2024 | Ebrahimi Afrouzi | |
| 12,148,938 | B1 * | 11/2024 | Carroll | H01M 50/20 |
| 12,196,813 | B2 | 1/2025 | Bertness | |
| 12,237,482 | B2 | 2/2025 | Bertness | |
| 12,296,713 | B2 | 5/2025 | Ropel | |
| 12,517,178 | B2 | 1/2026 | Bertness | |
| 2001/0012738 | A1 | 8/2001 | Duperret | 439/835 |
| 2001/0033169 | A1 | 10/2001 | Singh | 324/426 |
| 2001/0035737 | A1 | 11/2001 | Nakanishi et al. | 320/122 |
| 2001/0048215 | A1 | 12/2001 | Breed et al. | 280/728.1 |
| 2001/0048226 | A1 | 12/2001 | Nada | 290/40 |
| 2002/0003423 | A1 | 1/2002 | Bertness et al. | 324/426 |
| 2002/0004694 | A1 | 1/2002 | McLeod | 701/29 |
| 2002/0007237 | A1 | 1/2002 | Phung et al. | 701/33 |
| 2002/0010558 | A1 | 1/2002 | Bertness et al. | 702/63 |
| 2002/0018927 | A1 | 2/2002 | Thomsen et al. | |
| 2002/0021135 | A1 | 2/2002 | Li et al. | 324/677 |
| 2002/0027346 | A1 | 3/2002 | Breed et al. | 280/735 |
| 2002/0030495 | A1 | 3/2002 | Kechmire | 324/427 |
| 2002/0036504 | A1 | 3/2002 | Troy et al. | 324/430 |
| 2002/0041175 | A1 | 4/2002 | Lauper et al. | 320/106 |
| 2002/0044050 | A1 | 4/2002 | Derbyshire et al. | 340/442 |
| 2002/0047711 | A1 | 4/2002 | Bertness et al. | 324/426 |
| 2002/0050163 | A1 | 5/2002 | Makhija et al. | 73/116 |
| 2002/0065619 | A1 | 5/2002 | Bertness | 702/63 |
| 2002/0074398 | A1 | 6/2002 | Lancos et al. | 235/382 |
| 2002/0116140 | A1 | 8/2002 | Rider | 702/63 |
| 2002/0118111 | A1 | 8/2002 | Brown et al. | 340/573.1 |
| 2002/0121877 | A1 | 9/2002 | Smith et al. | |
| 2002/0121901 | A1 | 9/2002 | Hoffman | 324/426 |
| 2002/0128985 | A1 | 9/2002 | Greenwald | 705/400 |
| 2002/0130665 | A1 | 9/2002 | Bertness et al. | 324/426 |
| 2002/0152791 | A1 | 10/2002 | Cardinale | |
| 2002/0153864 | A1 | 10/2002 | Bertness | 320/132 |
| 2002/0171428 | A1 | 11/2002 | Bertness | 702/63 |
| 2002/0176010 | A1 | 11/2002 | Wallach et al. | |
| 2002/0193955 | A1 | 12/2002 | Bertness | 702/63 |
| 2003/0006779 | A1 | 1/2003 | Youval | 324/503 |
| 2003/0009270 | A1 | 1/2003 | Breed | 701/29 |
| 2003/0017753 | A1 | 1/2003 | Palmisano et al. | 439/762 |
| 2003/0025481 | A1 | 2/2003 | Bertness | 324/427 |
| 2003/0030442 | A1 | 2/2003 | Sugimoto | 324/429 |
| 2003/0036909 | A1 | 2/2003 | Kato | 704/275 |
| 2003/0038637 | A1 | 2/2003 | Bertness et al. | |
| 2003/0040873 | A1 | 2/2003 | Lesesky et al. | 702/57 |
| 2003/0060953 | A1 | 3/2003 | Chen | 701/33 |

| | | | | |
|---|---|---|---|---|
| 2003/0078743 | A1 | 4/2003 | Bertness et al. | 702/63 |
| 2003/0088375 | A1 | 5/2003 | Bertness et al. | 702/63 |
| 2003/0090272 | A1 | 5/2003 | Bertness | 324/426 |
| 2003/0114206 | A1 | 6/2003 | Timothy | 455/575.7 |
| 2003/0124417 | A1 | 7/2003 | Bertness et al. | 429/90 |
| 2003/0128011 | A1 | 7/2003 | Bertness et al. | |
| 2003/0128036 | A1 | 7/2003 | Henningson et al. | 324/426 |
| 2003/0137277 | A1 | 7/2003 | Mori et al. | 320/132 |
| 2003/0155930 | A1 | 8/2003 | Thomsen | |
| 2003/0164073 | A1 | 9/2003 | Chen | |
| 2003/0169018 | A1 | 9/2003 | Berels et al. | 320/132 |
| 2003/0169019 | A1 | 9/2003 | Oosaki | 320/132 |
| 2003/0171111 | A1 | 9/2003 | Clark | 455/414.1 |
| 2003/0173971 | A1 | 9/2003 | Bertness | 324/441 |
| 2003/0177417 | A1 | 9/2003 | Malhotra et al. | 714/42 |
| 2003/0184262 | A1 | 10/2003 | Makhija | 320/156 |
| 2003/0184264 | A1 | 10/2003 | Bertness | |
| 2003/0184306 | A1 | 10/2003 | Bertness et al. | 324/426 |
| 2003/0187556 | A1 | 10/2003 | Suzuki | 701/29 |
| 2003/0194672 | A1 | 10/2003 | Roberts et al. | 431/196 |
| 2003/0197512 | A1 | 10/2003 | Miller et al. | 324/426 |
| 2003/0212311 | A1 | 11/2003 | Nova et al. | 600/300 |
| 2003/0214395 | A1 | 11/2003 | Flowerday et al. | 340/445 |
| 2003/0224241 | A1 | 12/2003 | Takada et al. | 429/52 |
| 2003/0236656 | A1 | 12/2003 | Dougherty | 703/14 |
| 2004/0000590 | A1 | 1/2004 | Raichle et al. | 235/462.01 |
| 2004/0000891 | A1 | 1/2004 | Raichle et al. | 320/107 |
| 2004/0000893 | A1 | 1/2004 | Raichle et al. | 320/135 |
| 2004/0000913 | A1 | 1/2004 | Raichle et al. | 324/426 |
| 2004/0000915 | A1 | 1/2004 | Raichle et al. | 324/522 |
| 2004/0002824 | A1 | 1/2004 | Raichle et al. | 702/63 |
| 2004/0002825 | A1 | 1/2004 | Raichle et al. | 702/63 |
| 2004/0002836 | A1 | 1/2004 | Raichle et al. | 702/188 |
| 2004/0032264 | A1 | 2/2004 | Schoch | 324/426 |
| 2004/0036443 | A1 | 2/2004 | Bertness | 320/109 |
| 2004/0044452 | A1 | 3/2004 | Bauer et al. | 703/33 |
| 2004/0044454 | A1 | 3/2004 | Ross et al. | 701/33 |
| 2004/0046564 | A1 | 3/2004 | Klang | 324/426 |
| 2004/0049361 | A1 | 3/2004 | Hamdan et al. | 702/115 |
| 2004/0051532 | A1 | 3/2004 | Smith et al. | 324/426 |
| 2004/0051533 | A1 | 3/2004 | Namaky | 324/426 |
| 2004/0051534 | A1 | 3/2004 | Kobayashi et al. | 324/429 |
| 2004/0054503 | A1 | 3/2004 | Namaky | 702/182 |
| 2004/0064225 | A1 | 4/2004 | Jammu et al. | 701/29 |
| 2004/0065489 | A1 | 4/2004 | Aberle | 180/65.1 |
| 2004/0088087 | A1 | 5/2004 | Fukushima et al. | 701/32 |
| 2004/0090208 | A1 | 5/2004 | Almerich | |
| 2004/0104728 | A1 | 6/2004 | Bertness et al. | 324/429 |
| 2004/0108855 | A1 | 6/2004 | Raichle | 324/378 |
| 2004/0108856 | A1 | 6/2004 | Johnson | 324/426 |
| 2004/0113494 | A1 | 6/2004 | Karuppana et al. | |
| 2004/0113588 | A1 | 6/2004 | Mikuriya et al. | 320/128 |
| 2004/0145342 | A1 | 7/2004 | Lyon | 320/108 |
| 2004/0145371 | A1 | 7/2004 | Bertness | 324/426 |
| 2004/0150494 | A1 | 8/2004 | Yoshida | 333/243 |
| 2004/0157113 | A1 | 8/2004 | Klang | 429/50 |
| 2004/0164706 | A1 | 8/2004 | Osborne | 320/116 |
| 2004/0172177 | A1 | 9/2004 | Nagai et al. | 701/29 |
| 2004/0178185 | A1 | 9/2004 | Yoshikawa et al. | 219/270 |
| 2004/0189309 | A1 | 9/2004 | Bertness et al. | 324/426 |
| 2004/0199343 | A1 | 10/2004 | Cardinal et al. | 702/63 |
| 2004/0207367 | A1 | 10/2004 | Taniguchi et al. | 320/149 |
| 2004/0212350 | A1 | 10/2004 | Patino et al. | |
| 2004/0221641 | A1 | 11/2004 | Moritsugu | 73/23.31 |
| 2004/0227523 | A1 | 11/2004 | Namaky | 324/537 |
| 2004/0239332 | A1 | 12/2004 | Mackel et al. | 324/426 |
| 2004/0251876 | A1 | 12/2004 | Bertness et al. | 320/136 |
| 2004/0251907 | A1 | 12/2004 | Kalley | |
| 2004/0257084 | A1 | 12/2004 | Restaino | 324/400 |
| 2005/0007068 | A1 | 1/2005 | Johnson et al. | 320/110 |
| 2005/0009122 | A1 | 1/2005 | Whelan et al. | 435/7.32 |
| 2005/0017726 | A1 | 1/2005 | Koran et al. | 324/433 |
| 2005/0017952 | A1 | 1/2005 | His | 345/169 |
| 2005/0021197 | A1 | 1/2005 | Zimmerman | 701/31.4 |
| 2005/0021294 | A1 | 1/2005 | Trsar et al. | 702/183 |
| 2005/0021475 | A1 | 1/2005 | Bertness | 705/63 |
| 2005/0025299 | A1 | 2/2005 | Tischer et al. | 379/199 |
| 2005/0035752 | A1 | 2/2005 | Bertness | |
| 2005/0043868 | A1 | 2/2005 | Mitcham | 701/29 |

(56) References Cited

U.S. PATENT DOCUMENTS

2005/0057256 A1 3/2005 Bertness ........ 324/426
2005/0060070 A1 3/2005 Kapolka et al. ........ 701/29
2005/0073314 A1 4/2005 Bertness et al. ........ 324/433
2005/0076381 A1 4/2005 Gross ........ 725/107
2005/0077904 A1 4/2005 Bertness ........ 324/426
2005/0096809 A1 5/2005 Skeen et al. ........ 701/29
2005/0099185 A1 5/2005 Klang
2005/0102073 A1 5/2005 Ingram ........ 701/29
2005/0119809 A1 6/2005 Chen ........ 701/33.5
2005/0128083 A1 6/2005 Puzio et al. ........ 340/572.1
2005/0128902 A1 6/2005 Tsai ........ 369/44.32
2005/0133245 A1 6/2005 Katsuyama ........ 174/74 R
2005/0134282 A1 6/2005 Averbuch ........ 324/426
2005/0143882 A1 6/2005 Umezawa ........ 701/29
2005/0159847 A1 7/2005 Shah et al. ........ 700/276
2005/0162172 A1 7/2005 Bertness ........ 324/426
2005/0168226 A1 8/2005 Quint et al. ........ 324/426
2005/0173142 A1 8/2005 Cutler et al. ........ 173/181
2005/0182536 A1 8/2005 Doyle et al. ........ 701/29
2005/0184732 A1 8/2005 Restaino ........ 324/426
2005/0192045 A1 9/2005 Lowles
2005/0206346 A1 9/2005 Smith et al.
2005/0212521 A1 9/2005 Bertness et al. ........ 324/426
2005/0213874 A1 9/2005 Kline ........ 385/15
2005/0214144 A1 9/2005 Yoshida
2005/0218902 A1 10/2005 Restaino et al. ........ 324/433
2005/0231205 A1 10/2005 Bertness et al. ........ 324/426
2005/0254106 A9 11/2005 Silverbrook et al. ........ 358/539
2005/0256617 A1 11/2005 Cawthorne et al. ........ 701/22
2005/0258241 A1 11/2005 McNutt et al. ........ 235/385
2005/0264296 A1 12/2005 Philbrook ........ 324/433
2005/0269880 A1 12/2005 Konishi ........ 307/10.7
2005/0273218 A1 12/2005 Breed ........ 701/2
2006/0012330 A1 1/2006 Okumura et al. ........ 320/103
2006/0017447 A1 1/2006 Bertness ........ 324/538
2006/0026017 A1 2/2006 Walkder ........ 701/31.4
2006/0030980 A1 2/2006 St. Denis ........ 701/29
2006/0038572 A1 2/2006 Philbrook
2006/0043976 A1 3/2006 Gervais ........ 324/508
2006/0061469 A1 3/2006 Jaeger ........ 340/539.13
2006/0076923 A1 4/2006 Eaves ........ 320/112
2006/0079203 A1 4/2006 Nicolini ........ 455/411
2006/0089767 A1 4/2006 Sowa ........ 701/29
2006/0090554 A1 5/2006 Krampitz
2006/0090555 A1 5/2006 Krampitz
2006/0091597 A1 5/2006 Opsahl
2006/0092584 A1 5/2006 Raichle
2006/0095230 A1 5/2006 Grier et al. ........ 702/183
2006/0102397 A1 5/2006 Buck ........ 429/432
2006/0125482 A1 6/2006 Klang
2006/0136119 A1 6/2006 Raichle
2006/0139167 A1 6/2006 Davie
2006/0152224 A1 7/2006 Kim et al. ........ 324/430
2006/0155439 A1 7/2006 Slawinski ........ 701/33.4
2006/0161313 A1 7/2006 Rogers et al. ........ 701/1
2006/0161390 A1 7/2006 Namaky et al. ........ 702/183
2006/0217914 A1 9/2006 Bertness ........ 702/113
2006/0244456 A1 11/2006 Henningson
2006/0244457 A1 11/2006 Henningson et al. ........ 324/426
2006/0282227 A1 12/2006 Bertness
2006/0282323 A1 12/2006 Walker et al. ........ 705/14
2007/0005201 A1 1/2007 Chenn ........ 701/31.5
2007/0024460 A1 2/2007 Clark ........ 340/663
2007/0026916 A1 2/2007 Juds et al. ........ 463/1
2007/0046261 A1 3/2007 Porebski ........ 320/132
2007/0069734 A1 3/2007 Bertness
2007/0082652 A1 4/2007 Hartigan
2007/0088472 A1 4/2007 Ganzhorn et al. ........ 701/33
2007/0108942 A1 5/2007 Johnson et al. ........ 320/112
2007/0159177 A1 7/2007 Bertness et al. ........ 324/426
2007/0182576 A1 8/2007 Proska et al. ........ 340/636.1
2007/0194791 A1 8/2007 Huang ........ 324/430
2007/0194793 A1 8/2007 Bertness ........ 324/503
2007/0205752 A1 9/2007 Leigh ........ 324/500
2007/0205983 A1 9/2007 Naimo ........ 345/160
2007/0210801 A1 9/2007 Krampitz ........ 324/426
2007/0244660 A1 10/2007 Bertness
2007/0259256 A1 11/2007 Le Canut et al. ........ 429/90
2007/0279066 A1 12/2007 Chism ........ 324/437
2008/0023547 A1 1/2008 Raichle ........ 235/462.13
2008/0036421 A1 2/2008 Seo et al. ........ 320/132
2008/0053716 A1 3/2008 Scheucher ........ 180/2.1
2008/0059014 A1 3/2008 Nasr et al. ........ 701/22
2008/0064559 A1 3/2008 Cawthorne ........ 477/5
2008/0086246 A1 4/2008 Bolt et al. ........ 701/29
2008/0087479 A1 4/2008 Kang
2008/0094068 A1 4/2008 Scott ........ 324/426
2008/0103656 A1 5/2008 Lipscomb ........ 701/33.4
2008/0106267 A1 5/2008 Bertness ........ 320/112
2008/0169818 A1 7/2008 Lesesky et al. ........ 324/426
2008/0179122 A1 7/2008 Sugawara ........ 180/65.245
2008/0194984 A1 8/2008 Keefe ........ 600/559
2008/0238357 A1 10/2008 Bourilkov et al.
2008/0256815 A1 10/2008 Schafer
2008/0303528 A1 12/2008 Kim ........ 324/430
2008/0303529 A1 12/2008 Nakamura et al. ........ 324/433
2008/0315830 A1 12/2008 Bertness ........ 320/104
2009/0006476 A1 1/2009 Andreasen et al. ........ 707/104.1
2009/0011327 A1 1/2009 Okumura et al. ........ 429/99
2009/0013521 A1 1/2009 Okumura et al. ........ 29/730
2009/0024266 A1 1/2009 Bertness ........ 701/22
2009/0024419 A1 1/2009 Mcclellan ........ 705/4
2009/0085571 A1 4/2009 Bertness ........ 324/426
2009/0139781 A1 6/2009 Straubel
2009/0146610 A1 6/2009 Trigiani
2009/0146800 A1 6/2009 Grimlund et al. ........ 340/505
2009/0160395 A1 6/2009 Chen ........ 320/101
2009/0184165 A1 7/2009 Bertness et al.
2009/0198372 A1 8/2009 Hammerslag ........ 700/226
2009/0203247 A1 8/2009 Fifelski ........ 439/345
2009/0237029 A1 9/2009 Andelfinger ........ 320/108
2009/0237086 A1 9/2009 Andelfinger ........ 324/431
2009/0247020 A1 10/2009 Gathman et al. ........ 439/759
2009/0251151 A1 10/2009 Miyashita
2009/0259432 A1 10/2009 Liberty ........ 702/150
2009/0265121 A1 10/2009 Rocci ........ 702/57
2009/0273451 A1 11/2009 Soppera et al.
2009/0276115 A1 11/2009 Chen ........ 701/32
2009/0311919 A1 12/2009 Smith ........ 439/759
2010/0023198 A1 1/2010 Hamilton ........ 701/29
2010/0039065 A1 2/2010 Kinkade ........ 320/104
2010/0052193 A1 3/2010 Sylvester ........ 261/26
2010/0066283 A1 3/2010 Kitanaka ........ 318/400.02
2010/0088050 A1 4/2010 Keuss ........ 702/63
2010/0094496 A1 4/2010 Hershkovitz et al.
2010/0117603 A1 5/2010 Makhija ........ 320/162
2010/0145780 A1 6/2010 Nishikawa et al. ........ 705/14.11
2010/0161257 A1 6/2010 Cornett
2010/0214055 A1 8/2010 Fuji ........ 340/3.1
2010/0265131 A1 10/2010 Fabius
2010/0314950 A1 12/2010 Rutkowski et al. ........ 307/125
2011/0004427 A1 1/2011 Gorbold et al. ........ 702/63
2011/0015815 A1 1/2011 Bertness ........ 701/22
2011/0106280 A1 5/2011 Zeier ........ 700/90
2011/0127960 A1 6/2011 Plett
2011/0161025 A1 6/2011 Tomura ........ 702/63
2011/0215767 A1 9/2011 Johnson et al. ........ 320/136
2011/0218747 A1 9/2011 Bertness ........ 702/63
2011/0239445 A1 10/2011 Ibi
2011/0258112 A1 10/2011 Eder et al.
2011/0265025 A1 10/2011 Bertness
2011/0267067 A1 11/2011 Bertness et al.
2011/0273181 A1 11/2011 Park et al. ........ 324/429
2011/0294367 A1 12/2011 Moon ........ 439/878
2011/0300416 A1 12/2011 Bertness
2012/0041697 A1 2/2012 Stukenberg ........ 702/63
2012/0046807 A1 2/2012 Ruther ........ 701/2
2012/0046824 A1 2/2012 Ruther et al. ........ 701/31.5
2012/0062237 A1 3/2012 Robinson ........ 324/433
2012/0074904 A1 3/2012 Rutkowski et al. ........ 320/112
2012/0086399 A1 4/2012 Choi
2012/0091962 A1 4/2012 DeFrank et al.
2012/0116391 A1 5/2012 Houser ........ 606/41
2012/0182132 A1 7/2012 McShane

(56) References Cited

U.S. PATENT DOCUMENTS

2012/0249069 A1 10/2012 Ohtomo ........................ 320/109
2012/0256494 A1 10/2012 Kesler ........................... 307/104
2012/0256568 A1 10/2012 Lee ............................... 318/139
2012/0274331 A1 11/2012 Liu ............................... 324/426
2012/0293372 A1 11/2012 Amendolare ................. 342/451
2012/0303397 A1* 11/2012 Prosser ................... B60L 53/18
705/7.12
2013/0049678 A1 2/2013 Li
2013/0099747 A1 4/2013 Baba ............................. 310/118
2013/0106362 A1 5/2013 Mackintosh et al.
2013/0106596 A1 5/2013 Mouchet
2013/0115821 A1 5/2013 Golko ........................... 439/638
2013/0134926 A1 5/2013 Yoshida
2013/0158782 A1 6/2013 Bertness et al. ............. 701/34.4
2013/0172019 A1 7/2013 Youssef ..................... 455/456.6
2013/0200855 A1 8/2013 Christensen et al.
2013/0218781 A1 8/2013 Simon
2013/0288706 A1 10/2013 Yu .............................. 455/456.1
2013/0297247 A1 11/2013 Jardine
2013/0311124 A1 11/2013 Bremen ........................ 702/104
2013/0314041 A1 11/2013 Proebstle ...................... 320/109
2013/0325405 A1 12/2013 Miller
2014/0002021 A1 1/2014 Bertness
2014/0002094 A1 1/2014 Champlin ..................... 324/426
2014/0029308 A1 1/2014 Cojocaru ........................ 363/13
2014/0081527 A1 3/2014 Miller
2014/0091762 A1 4/2014 Kondo
2014/0099830 A1 4/2014 Byrne ........................... 439/638
2014/0117997 A1 5/2014 Bertness ....................... 324/426
2014/0132223 A1 5/2014 Kerfoot, Jr.
2014/0145670 A1 5/2014 van Zwam et al.
2014/0162497 A1 6/2014 Lim
2014/0194084 A1 7/2014 Noonan ..................... 455/404.1
2014/0225622 A1 8/2014 Kudo ............................ 324/433
2014/0239964 A1 8/2014 Gach ............................. 324/433
2014/0260577 A1 9/2014 Chinnadurai
2014/0266061 A1 9/2014 Wachal
2014/0278159 A1 9/2014 Chinnadurai
2014/0285209 A1 9/2014 Stichowski et al.
2014/0333313 A1 11/2014 Surampudi
2014/0354237 A1 12/2014 Cotton
2014/0368156 A1 12/2014 Aloe
2014/0374475 A1 12/2014 Kallfelz et al.
2015/0093922 A1 4/2015 Bosscher ........................ 439/39
2015/0115720 A1 4/2015 Hysell ............................. 307/65
2015/0166518 A1 6/2015 Boral et al.
2015/0168499 A1 6/2015 Palmisano
2015/0221135 A1 8/2015 Hill ............................... 345/633
2015/0239365 A1 8/2015 Hyde et al.
2015/0353192 A1 12/2015 Morrison
2016/0011271 A1 1/2016 Bertness
2016/0013523 A1 1/2016 Anzicek
2016/0091571 A1 3/2016 Salo, III
2016/0154044 A1 6/2016 Bertness
2016/0171799 A1 6/2016 Bertness
2016/0216335 A1 7/2016 Bertness
2016/0226280 A1 8/2016 Noor et al.
2016/0232736 A1 8/2016 Holtappels
2016/0238667 A1 8/2016 Palmisano et al.
2016/0253852 A1 9/2016 Bertness et al.
2016/0266212 A1 9/2016 Carlo
2016/0285284 A1 9/2016 Matlapudi et al.
2016/0321897 A1 11/2016 Lee
2016/0336623 A1 11/2016 Nayar
2016/0381542 A1 12/2016 Colby et al.
2017/0054317 A1 2/2017 Katsuki
2017/0093056 A1 3/2017 Salo, III et al.
2017/0146602 A1 5/2017 Samp
2017/0158058 A1 6/2017 Lee et al.
2017/0197514 A1 7/2017 Rivas et al.
2017/0253140 A1 9/2017 Chang
2017/0373410 A1 12/2017 Lipkin et al.
2018/0009328 A1 1/2018 Hinterberger et al.
2018/0113171 A1 4/2018 Bertness
2018/0301913 A1 10/2018 Irish et al.
2018/0306867 A1 10/2018 Bertness
2019/0033385 A1 1/2019 Karner
2019/0105998 A1 4/2019 Bertness
2019/0152332 A1 5/2019 Bertness
2019/0154763 A1 5/2019 Bertness
2019/0204392 A1 7/2019 Bertness
2020/0076129 A1 3/2020 Kitahara
2020/0086757 A1 3/2020 Vain et al.
2020/0161630 A1 5/2020 Zeng
2020/0174078 A1 6/2020 Salo, III et al.
2020/0274370 A1 8/2020 Krieg
2021/0048374 A1 2/2021 Sampson et al.
2021/0049480 A1 2/2021 Kale et al.
2021/0050631 A1 2/2021 Li
2021/0107152 A1 4/2021 Honkote
2021/0135462 A1 5/2021 Sampson et al.
2021/0141021 A1 5/2021 Salo, III et al.
2021/0141043 A1 5/2021 Bertness
2021/0203016 A1 7/2021 Bertness
2021/0226187 A1 7/2021 Karr
2021/0231737 A1 7/2021 Salo, III et al.
2021/0237607 A1 8/2021 Chen et al.
2021/0325471 A1 10/2021 Bertness
2022/0050142 A1 2/2022 Bertness
2022/0258619 A1 8/2022 Bertness
2022/0384858 A1 12/2022 Bertness
2023/0063349 A1 3/2023 Bertness et al.
2023/0069766 A1* 3/2023 Allag .................. H01M 10/425
2023/0087598 A1* 3/2023 Lamer ....................... H02J 3/32
320/135
2023/0155400 A1 5/2023 Wang
2023/0241990 A1 8/2023 Adams et al.
2023/0256829 A1 8/2023 Bertness
2023/0318321 A1 10/2023 Liu
2023/0333171 A1 10/2023 Bertness
2023/0339359 A1 10/2023 Numata
2023/0358818 A1 11/2023 Kolamkar et al.
2023/0387707 A1 11/2023 Bertness
2023/0391179 A1 12/2023 Sampson et al.
2024/0332651 A1 10/2024 Queren
2024/0416770 A1 12/2024 Roland et al.
2024/0429653 A1 12/2024 Dos Santos
2025/0130264 A1 4/2025 Bertness
2025/0141966 A1 5/2025 Petiwala
2025/0252789 A1 8/2025 Kovarik et al.
2025/0327713 A1 10/2025 Bertness
2025/0348092 A1 11/2025 Andrae
2025/0388088 A1 12/2025 Bertness

FOREIGN PATENT DOCUMENTS

CN 103091633 5/2013
CN 206658084 11/2017
CN 109683054 1/2019
CN 114156586 3/2022
CN 114520393 5/2022
DE 29 26 716 B1 1/1981
DE 40 07 883 9/1991
DE 196 38 324 9/1996
DE 601 12 502 T2 6/2006
DE 10 2009 013 857 10/2009
DE 10 2008 036 595 A1 2/2010
DE 10 2018 001885 9/2018
DE 10 2020 216599 7/2021
EP 0 022 450 A1 1/1981
EP 0 391 694 A2 4/1990
EP 0 476 405 A1 9/1991
EP 0 637 754 A1 2/1995
EP 0 772 056 A1 5/1997
EP 0 982 159 A2 3/2000
EP 1 810 869 A1 11/2004
EP 1 786 057 5/2007
EP 1 807 710 B1 7/2007
EP 1 807 710 1/2010
EP 2 302 724 3/2011
FR 2 749 397 12/1997
GB 154 016 11/1920
GB 2 029 586 3/1980
GB 2 088 159 A 6/1982

(56) References Cited

FOREIGN PATENT DOCUMENTS

| | | | |
|---|---|---|---|
| GB | 2 246 916 | A | 10/1990 |
| GB | 2 266 150 | | 10/1993 |
| GB | 2 275 783 | A | 7/1994 |
| GB | 2 353 367 | | 2/2001 |
| GB | 2 387 235 | A | 10/2003 |
| JP | 59-17892 | | 1/1984 |
| JP | 59-17893 | | 1/1984 |
| JP | 59017894 | | 1/1984 |
| JP | 59215674 | | 12/1984 |
| JP | 60225078 | | 11/1985 |
| JP | 62-180284 | | 8/1987 |
| JP | 63027776 | | 2/1988 |
| JP | 03274479 | | 12/1991 |
| JP | 03282276 | | 12/1991 |
| JP | 4-8636 | | 1/1992 |
| JP | 04095788 | | 3/1992 |
| JP | 04131779 | | 5/1992 |
| JP | 04372536 | | 12/1992 |
| JP | 05211724 | A | 8/1993 |
| JP | 5216550 | | 8/1993 |
| JP | 7-128414 | | 5/1995 |
| JP | 09061505 | | 3/1997 |
| JP | 10056744 | | 2/1998 |
| JP | 10232273 | | 9/1998 |
| JP | 11103503 | A | 4/1999 |
| JP | 11-150809 | | 6/1999 |
| JP | 11-271409 | | 10/1999 |
| JP | 2001-023037 | | 1/2001 |
| JP | 2001057711 | A | 2/2001 |
| JP | 2003-346909 | | 12/2003 |
| JP | 2005-238969 | | 9/2005 |
| JP | 2006/242674 | | 9/2006 |
| JP | 2006331976 | A | 12/2006 |
| JP | 2009-244166 | | 10/2009 |
| JP | 2009-261174 | | 11/2009 |
| JP | 2010-172122 | | 5/2010 |
| JP | 2010-172142 | | 8/2010 |
| JP | 2011-216328 | | 10/2011 |
| JP | 2013-110069 | | 6/2013 |
| JP | 2022-509101 | | 1/2022 |
| RU | 2089015 | C1 | 8/1997 |
| WO | WO 93/22666 | | 11/1993 |
| WO | WO 94/05069 | | 3/1994 |
| WO | WO 96/01456 | | 1/1996 |
| WO | WO 96/06747 | | 3/1996 |
| WO | WO 96/28846 | | 9/1996 |
| WO | WO 97/01103 | | 1/1997 |
| WO | WO 97/44652 | | 11/1997 |
| WO | WO 98/04910 | | 2/1998 |
| WO | WO 98/21132 | | 5/1998 |
| WO | WO 98/58270 | | 12/1998 |
| WO | WO 99/23738 | | 5/1999 |
| WO | WO 99/56121 | | 11/1999 |
| WO | WO 00/16083 | | 3/2000 |
| WO | WO 00/62049 | | 10/2000 |
| WO | WO 00/67359 | | 11/2000 |
| WO | WO 01/59443 | | 2/2001 |
| WO | WO 01/16614 | | 3/2001 |
| WO | WO 01/16615 | | 3/2001 |
| WO | WO 01/51947 | | 7/2001 |
| WO | WO 03/047064 | A3 | 6/2003 |
| WO | WO 03/076960 | A1 | 9/2003 |
| WO | WO 2004/047215 | A1 | 6/2004 |
| WO | WO 2007/059935 | | 5/2007 |
| WO | WO 2007/075403 | | 7/2007 |
| WO | WO 2009/004001 | | 1/2009 |
| WO | WO 2010/007681 | | 1/2010 |
| WO | WO 2010/035605 | | 4/2010 |
| WO | WO 2010/042517 | | 4/2010 |
| WO | WO 2011/153419 | | 12/2011 |
| WO | WO 2012/078921 | | 6/2012 |
| WO | WO 2013/070850 | | 5/2013 |
| WO | 2016176405 | | 11/2016 |
| WO | 2022/241800 | | 11/2022 |

OTHER PUBLICATIONS

Written Opinion for the Corresponding International Patent Application No. PCT/US2024/033558, dated Sep. 3, 2024, dated Jun. 12, 2024, 8 pages.

International Search Report and Written Opinion for corresponding International Application No. PCT/US2024/053504, dated Jan. 21, 2025, 15 pages.

Gehrmann Christian et al: "Bluetooth Security" Artech House Publishers, Jul. 5, 2004.

George Coulouris et al. "Distributed Systems: Concepts and Design (5th edition)", Addison-Wesley, May 7, 2011.

Owen C. Duffy et al. "Fundamentals of Medium/Heavy Duty Commercial Vehicle Systems," Jones & Bartlett Learning, Jul. 27, 2015.

Wikipedia: "List of Bluetooth profiles," Internet Article, Oct. 6, 2023.

Nick Hunn et al. "Essentials of Short-Range Wireless," Cambridge University Press, Aug. 23, 2010.

International Search Report and Written Opinion for corresponding International Application No. PCT/US2024/051765, dated Jan. 16, 2025, 15 pages.

US Application for U.S. Appl. No. 18/740,030, filed Jun. 11, 2024.

US Application for U.S. Appl. No. 18/616,458, filed Mar. 26, 2024.

US Application for U.S. Appl. No. 18/609,344, filed Mar. 19, 2024.

"Electrochemical Impedance Spectroscopy in Battery Development and Testing", Batteries International, Apr. 1997, pp. 59 and 62-63.

"Battery Impedance", by E. Willihnganz et al., Electrical Engineering, Sep. 1959, pp. 922-925.

"Determining The End of Battery Life", by S. DeBardelaben, IEEE, 1986, pp. 365-368.

"A Look at the Impedance of a Cell", by S. Debardelaben, IEEE, 1988, pp. 394-397.

"The Impedance of Electrical Storage Cells", by N.A. Hampson et al., *Journal of Applied Electrochemistry*, 1980, pp. 3-11.

"A Package for Impedance/Admittance Data Analysis", by B. Boukamp, *Solid State Ionics*, 1986, pp. 136-140.

"Precision of Impedance Spectroscopy Estimates of Bulk, Reaction Rate, and Diffusion Parameters", by J. Macdonald et al., *J. Electroanal, Chem.*, 1991, pp. 1-11.

Internal Resistance: Harbinger of Capacity Loss in Starved Electrolyte Sealed Lead Acid Batteries, by Vaccaro, F.J et al., *AT&T Bell Laboratories*, 1987 IEEE, Ch. 2477, pp. 128,131.

IEEE Recommended Practice For Maintenance, Testings, and Replacement of Large Lead Storage Batteries for Generating Stations and Substations, *The Institute of Electrical and Electronics Engineers, Inc., ANSI/IEEE Std.* 450-1987, Mar. 9, 1987, pp. 7-15.

"Field and Laboratory Studies to Assess the State of Health of Valve-Regulated Lead Acid Batteries: Part I Conductance/Capacity Correlation Studies", by D. Feder et al., *IEEE*, Aug. 1992, pp. 218-233.

"JIS Japanese Industrial Standard-Lead Acid Batteries for Automobiles", *Japanese Standards Association UDC*, 621.355.2:629.113.006, Nov. 1995.

"Performance of Dry Cells", by C. Hambuechen, Preprint of *Am. Electrochem. Soc.*, Apr. 18-20, 1912, paper No. 19, pp. 1-5.

"A Bridge for Measuring Storage Battery Resistance", by E. Willihncanz, *The Electrochemical Society*, preprint 79-20, Apr. 1941, pp. 253-258.

National Semiconductor Corporation, "High Q Notch Filter", 3/69, Linear Brief 5, Mar. 1969.

Burr-Brown Corporation, "Design A 60 Hz Notch Filter with the UAF42", 1/94, AB-071, 1994.

National Semiconductor Corporation, "LMF90-4$^{th}$-Order Elliptic Notch Filter", 12/94, RRD-B30M115, Dec. 1994.

"Alligator Clips with Wire Penetrators" *J.S. Popper, Inc.* product information, downloaded from http://www.jspopper.com/, prior to Oct. 1, 2002.

"#12: LM78S40 Simple Switcher DC to DC Converter", *ITM e-Catalog*, downloaded from http://www.pcbcafe.com, prior to Oct. 1, 2002.

(56) References Cited

OTHER PUBLICATIONS

"Simple DC-DC Converts Allows Use of Single Battery", *Electronix Express*, downloaded from http://www.elezp.com/t_dc-dc.htm, prior to Oct. 1, 2002.
"DC-DC Converter Basics", *Power Designers*, downloaded from http://www.powerdesigns.com/InforWeb.design_center/articles/DC-DC/converter.shtm, prior to Oct. 1, 2002.
"Notification of Transmittal of The International Search Report or the Declaration", PCT/US02/29461, filed Sep. 17, 2002 and mailed Jan. 3, 2003.
"Notification of Transmittal of The International Search Report or the Declaration", PCT/US03/07546, filed Mar. 13, 2003 and mailed Jul. 4, 2001.
"Notification of Transmittal of The International Search Report or the Declaration", PCT/US03/06577, filed Mar. 5, 2003 and mailed Jul. 24, 2003.
"Notification of Transmittal of The International Search Report or the Declaration", PCT/US03/07837, filed Mar. 14, 2003 and mailed Jul. 4, 2003.
"Improved Impedance Spectroscopy Technique For Status Determination of Production Li/$SO_2$ Batteries" Terrill Atwater et al., pp. 10-113, (1992).
"Notification of Transmittal of The International Search Report or the Declaration", PCT/US03/41561; Search Report completed Apr. 13, 2004, mailed May 6, 2004.
"Notification of Transmittal of The International Search Report or the Declaration", PCT/US03/27696, filed Sep. 4, 2003 and mailed Apr. 15, 2004.
"Programming Training Course, 62-000 Series Smart Engine Analyzer", Testproducts Division, Kalamazoo, Michigan, pp. 1-207, (1984).
"Operators Manual, Modular Computer Analyzer Model MCA 3000", Sun Electric Corporation, Crystal Lake, Illinois, pp. 1-1-14-13, (1991).
Supplementary European Search Report Communication for Appl. No. 99917402.2; Sep. 7, 2004.
"Dynamic modelling of lead/acid batteries using impedance spectroscopy for parameter identification", Journal of Power Sources, pp. 69-84, (1997).
Notification of Transmittal of the International Search Report for PCT/US03/30707, filed Sep. 30, 2003 and mailed Nov. 24, 2004.
"A review of impedance measurements for determination of the state-of-charge or state-of-health of secondary batteries", Journal of Power Sources, pp. 59-69, (1998).
"Search Report Under Section 17" for Great Britain Application No. GB0421447. 4, date of search Jan. 27, 2005, date of document Jan. 28, 2005.
"Results of Discrete Frequency Immittance Spectroscopy (DFIS) Measurements of Lead Acid Batteries", by K.S. Champlin et al., *Proceedings of 23rd International Teleco Conference* (*INTELEC*), published Oct. 2001, IEE, pp. 433-440.
"Examination Report" from the UK Patent Office for App. No. 0417678.0; Jan. 24, 2005.
Wikipedia Online Encyclopedia, Inductance, 2005, http://en.wikipedia.org/wiki/inductance, pp. 1-5, mutual Inductance, pp. 3, 4.
"Professional BCS System Analyzer Battery-Charger-Starting", pp. 2-8, (2001).
Young Illustrated Encyclopedia Dictionary of Electronics, 1981, Parker Publishing Company, Inc., pp. 318-319.
"DSP Applications in Hybrid Electric Vehicle Powertrain", Miller et al., Proceedings of the American Control Conference, San Diego, CA, Jun. 1999; 2 ppg.
"Notification of Transmittal of the International Search Report and the Written Opinion of the International Searching Authority, or the Declaration" for PCT/US2008/008702 filed Jul. 2008; 15 pages.
"A Microprocessor-Based Control System for a Near-Term Electric Vehicle", Bimal K. Bose; IEEE Transactions on Industry Applications, vol. IA-17, No. 6, Nov./Dec. 1981; 0093-9994/81/1100-0626$00.75 © 1981 IEEE, 6 pages.
Notification of Transmittal of the International Search Report and the Written Opinion of the International Searching Authority, or the Declaration for PCT/US2011/038279 filed May 27, 2011, date of mailing Sep. 16, 2011, 12 pages.
U.S. Appl. No. 60/387,912, filed Jun. 13, 2002 which is related to U.S. Pat. No. 7,089,127.
"Conductance Testing Compared to Traditional Methods of Evaluating the Capacity of Valve-Regulated Lead-Acid Batteries and Predicting State-of-Health", by D. Feder et al., May 1992, pp. 1-8; (13 total pgs.).
"Field and Laboratory Studies to Assess the State of Health of Valve-Regulated Lead Acid Batteries: Part I—Conductance/Capacity Correlation Studies", by D. Feder at al., Oct. 1992, pp. 1-15; (19 total pgs.).
"Field Application of Conductance Measurements Use to Ascertain Cell/Battery and Inter-Cell Connection State-of-Health in Electric Power Utility Applications", by M. Hlavec et al., Apr. 1993, pp. 1-14; (19 total pgs.).
"Conductance Testing of Standby Batteries in Signaling and Communications Application for the Purpose of Evaluating Battery State-of-Health", by S. McShane, Apr. 1993, pp. 1-9; (14 total pgs.).
"Conductance Monitoring of Recombination Lead Acid Batteries", by B. Jones, May 1993, pp. 1-6; (11 total pgs.).
"Evaluating the State-of-Health of Lead Acid Flooded and Valve-Regulated Batteries: A Comparison of Conductance Testing vs. Traditional Methods", by M. Hlavac et al., Jun. 1993, pp. 1-15; (20 total pgs.).
"Updated State of Conductance/Capacity Correlation Studies to Determine the State-of-Health of Automotive SLI and Stanby Lead Acid Batteries", by D. Feder et al., Sep. 1993, pp. 1-17; (22 total pgs.).
"Field and Laboratory Studies to Access the State-of-Health of Valve-Regulated Lead-Acid Battery Technologies Using Conductance Testing Part II—Further Conductance/Capacity Correlation Studies", by M. Hlavac et al., Sep. 1993, pp. 1-9; (14 total pgs.).
"Field Experience of Testing VRLA Batteries by Measuring Conductance", by M.W. Kniveton, May 1994, pp. 1-4; (9 total pgs.).
"Reducing the Cost of Maintaining VRLA Batteries in Telecom Applications", by M.W. Kniveton, Sep. 1994, pp. 1-5; (10 total pgs.).
"Analysis and Interpretation of Conductance Measurements used to Access the State-of-Health of Valve Regulated Lead Acid Batteries Part III: Analytical Techniques", by M. Hlavac, Nov. 1994, 9 pgs; (13 total pgs.).
"Testing 24 Volt Aircraft Batteries Using Midtronics Conductance Technology", by M. Hlavac et al., Jan. 1995, 9 pgs; (13 total pgs.).
"VRLA Battery Monitoring Using Conductance Technology Part IV: On-Line State-of-Health Monitoring and Thermal Runaway Detection/Prevention", by M. Hlavac et al., Oct. 1995, 9 pgs; (13 total pgs.).
"VRLA Battery Conductance Monitoring Part V: Strategies for VRLA Battery Testing and Monitoring in Telecom Operating Environments", by M. Hlavac et al., Oct. 1996, 9 pgs; (13 total pgs.).
"Midpoint Conductance Technology Used In Telecommunication Stationary Standby Battery Applications Part VI: Considerations for Deployment of Midpoint Conductance in Telecommunications Power Applications", by M. Troy et al., Oct. 1997, 9 pgs; (13 total pgs. ).
"Impedance/Conductance Measurements as an Aid to Determining Replacement Strategies", M. Kniveton, Sep. 1998, pp. 297-301; (9 total p. ).
"A Fundamentally New Approach to Battery Performance Analysis Using DFRA™M/DTIS™ Technology", by K. Champlin et al., Sep. 2000, 8 pgs; (12 total pgs. ).
"Battery State of Health Monitoring, Combining Conductance Technology With Other Measurement Parameters for Real-Time Battery Performance Analysis", by D. Cox et al., Mar. 2000, 6 pgs; (10 total pgs.).
Search Report and Written Opinion from PCT Application No. PCT/US2011/026608, dated Aug. 29, 2011, 9 pgs.
Examination Report under section 18(3) for corresponding Great Britain Application No. GB1000773.0, dated Feb. 6, 2012, 2 pages.
Communication from GB1216105.5, dated Sep. 21, 2012.

(56) References Cited

OTHER PUBLICATIONS

Notification of Transmittal of the International Search Report and Written Opinion from PCT/US2011/039043, dated Jul. 26, 2012.
Notification of Transmittal of the International Search Report and Written Opinion from PCT/US2011/053886, dated Jul. 27, 2012.
"Field Evaluation of Honda's EV Plus Battery Packs", by A. Paryani, *IEEE AES Systems Magazine*, Nov. 2000, pp. 21-24.
Search Report from PCT/US2011/047354, dated Nov. 11, 2011.
Written Opinion from PCT/US2011/047354, dated Nov. 11, 2011.
First Office Action (Notification of Reasons for Rejections) dated Dec. 3, 2013 in related Japanese patent application No. 2013-513370, 9 pgs. Including English Translation.
Official Action dated Jan. 22, 2014 in Korean patent application No. 10-2012-7033020, 2 pgs including English Translation.
Official Action dated Feb. 20, 2014 in Korean patent application No. 10-2013-7004814, 6 pgs including English Translation.
First Office Action for Chinese Patent Application No. 201180011597.4, dated May 6, 2014, 20 pages.
Office Action from Korean Application No. 10/2012-7033020, dated Jul. 29, 2014.
Office Action for Chinese Patent Application No. 201180038844.X, dated Jul. 1, 2014.
Office Action for Chinese Patent Application No. 201180030045.8, dated Jul. 21, 2014.
Office Action for German Patent Application No. 1120111020643 dated Aug. 28, 2014.
Office Action from Japanese Patent Application No. 2013-513370, dated Aug. 5, 2014.
Office Action from Japanese Patent Application No. 2013-531839, dated Jul. 8, 2014.
Office Action for German Patent Application No. 103 32 625.1, dated Nov. 7, 2014, 14 pages.
Office Action from Chinese Patent Application No. 201180038844.X, dated Dec. 8, 2014.
Office Action from CN Application No. 201180011597.4, dated Jan. 6, 2015.
Office Action for Chinese Patent Application No. 201180030045.8, dated Mar. 24, 2015.
Office Action for Japanese Patent Application No. 2013-531839, dated Mar. 31, 2015.
Notification of Transmittal of the International Search Report and Written Opinion from PCT/US2014/069661, dated Mar. 26, 2015.
Office Action for Chinese Patent Application No. 201180038844.X, dated Jun. 8, 2015.
Office Action from Chinese Patent Application No. 201180011597.4 dated Jun. 3, 2015.
European Search Report from European Application No. EP 15151426.2, dated Jun. 1, 2015.
Notification of Transmittal of the International Search Report and the Written Opinion from PCT/US2016/014867, dated Jun. 3, 2016.
Office Action from Japanese Patent Application No. 2015-014002, dated Jul. 19, 2016.
Notification of Transmittal of the International Search Report and the Written Opinion of the International Searching Authority from PCT/US2016/029696, dated Aug. 24, 2016.
Office Action from German Patent Application No. 10393251.8, dated Nov. 4, 2016, including English translation.
Office Action from European Patent Application No. 15 151 426.2-1801, dated Aug. 28, 2017, 2 pages.
Office Action from German Patent Application No. 112011101892.4, dated Sep. 7, 2017.
Office Action from Japanese Patent Application No. 2017-026740, dated Jan. 9, 2018.
Office Action from Chinese Patent Application No. 201480066251.8, dated May 29, 2018.
Brochure: "Sensors Intelligent Battery Sensors, Measuring Battery Capacity and Ageing", by Hella, 6 pgs.
Office Action from Japanese Patent Application No. 2017-026740, dated May 8, 2018.
U.S. Appl. No. 12/697,485, filed Feb. 1, 2010, 36 pgs.
Office Action from Chinese Patent Application No. 201480066251.8, dated Dec. 13, 2018.
Notification of Transmittal of the International Search Report and the Written Opinion of the International Searching Authority, or the Declaration for PCT/US2019/014487, dated Apr. 11, 2019.
Notification of Transmittal of the International Search Report and the Written Opinion of the International Searching Authority, or the Declaration for PCT/US2019/014494, dated Apr. 24, 2019.
Office Action from German Patent Application No. 11 2011 101 892.4, dated Oct. 1, 2020, and translation using Google Translate.
Wikipedia Online Encyclopedia, https: // de.wikipedia.org/w/index.php?title= four-wire measurement & oldid=67143514-4 (Retrieved Sep. 15, 2020) along with Google Translation.
Notification of Transmittal of the International Search Report and the Written Opinion of the International Searching Authority, or the Declaration for PCT/US2020/059015, dated Jan. 22, 2021.
Application from U.S. Appl. No. 17/504,897, filed Oct. 19, 2021.
Notification of Transmittal of the International Search Report and the Written Opinion of the International Searching Authority, or the Declaration for PCT/US2021/040313 dated Oct. 25, 2021; 14 pages.
U.S. Appl. No. 17/893,412, filed Aug. 23, 2022.
U.S. Appl. No. 18/166,702, filed Feb. 9, 2023.
U.S. Appl. No. 18/314,266, filed May 9, 2023.
U.S. Appl. No. 18/324,382, filed May 26, 2023.
U.S. Appl. No. 18/328,827, filed Jun. 5, 2023.
International Search Report and Written Opinion for corresponding International Application No. PCT/US2025/034321, dated Oct. 17, 2025, 14 pages.

* cited by examiner

STACKABLE BATTERY MAINTENANCE SYSTEM

CROSS-REFERENCE TO RELATED APPLICATION

The present application is based on and claims the benefit of U.S. provisional patent application Ser. No. 63/347,407, filed May 31, 2022, the content of which is hereby incorporated by reference in its entirety.

BACKGROUND

The disclosure described herein relates to a battery maintenance system. More specifically, the disclosure relates to an assembly of different battery maintenance devices into a battery maintenance system.

Traditionally, automotive vehicles have used internal combustion engines as their power source. Automotive vehicles of this type may include a storage battery for operating electronics in the vehicle and for using an electric starter to start the vehicle engine. A battery charging system in these types of vehicles includes an alternator which is coupled to the engine and is powered by the engine when the vehicle is running. The charging system is used to charge the storage battery when the vehicle is operating. Battery testers are battery maintenance devices that may be used to test and provide all types of battery and electrical system service needs in automotive vehicles.

Vehicles which are electrically powered are finding widespread use. Such a vehicle can provide increased fuel efficiency and can be operated using alternative energy sources. Some types of electric vehicles are completely powered using electric motors and electricity. Other types of electric vehicles include an internal combustion engine. The internal combustion engine can be used to generate electricity and supplement the power delivered by the electric motor. These types of vehicles are known as "hybrid" electric vehicles.

Operation of an electric vehicle requires a power source capable of providing large amounts of electricity. Typically, electric vehicles store electricity in large battery packs which consist of a plurality of batteries. These batteries may be formed by a number of individual cells, or may themselves be individual cells, depending on the configuration of the battery and battery pack and also are in need of maintenance. Another maintenance requirement of batteries in electric vehicles may be to discharge the battery down to a fixed state of charge, say 30%, for safe transport. It is desired to perform this work as quickly as possible and as safely as possible.

SUMMARY

A battery maintenance system includes a first unit comprising a battery maintenance device, a second unit comprising a battery maintenance device, a third unit having a power supply and voltage input-output circuitry configured to couple to a battery and a fourth unit having an operator interface. Each of the first, second, third and fourth units are encased in a housing and include physical connectors that allow the first unit, the second unit, the third unit and the fourth unit to be coupled together in a stacked configuration in a user selectable order.

A battery maintenance system includes a plurality of separable units coupled together and including a first battery maintenance device having a first set of physical connectors each located at a corner of a housing of the first battery maintenance device and a second battery maintenance device including a second set of physical connectors each located at a corner of a housing of the second battery maintenance device. Each physical connector of the first set of physical connectors aligns with one of the physical connectors of the second set of physical connectors. Each physical connector of the first battery maintenance device and each physical connector of the second battery maintenance device includes a vertical member having a first end and an opposing second end and an extension protruding from the first end. The second end of each of the vertical members of the physical connectors on the second battery maintenance devices are mounted to one of the extensions of the physical connectors on the first battery maintenance device.

A battery maintenance system includes a plurality of separable units each enclosed in a housing and coupled to each other, The plurality of separable units include at least first and second units having battery maintenance devices. A third unit has a base unit that provides a power supply, voltage input-output circuitry configured to couple to a battery and at least one digital communication module for the battery maintenance system. A fourth unit includes a top unit having an operator input/output interface for the battery maintenance system. At least the first and second units are located between the third unit and the fourth unit.

DETAILED DESCRIPTION OF ILLUSTRATIVE EMBODIMENTS

Various battery vehicle maintenance devices are discussed herein and may be configured for rack mounting. Various types of rack mounts typically comprise a standardized frame into which rack mountable components or devices are inserted. One problem with such mounting systems is that as components or devices are added, a larger mounting rack must be used. Alternatively, an oversized mounting rack can be used initially so that there is sufficient room to add additional components or devices. However, neither case is particularly desirable. In some instances, rack mounting space is purchased which is not needed. Alternatively, components or devices must be removed from a rack, a new rack purchased and the components or devices from the rack along with the new components or devices are mounted in a new rack. Neither case is efficient.

Figure 1:
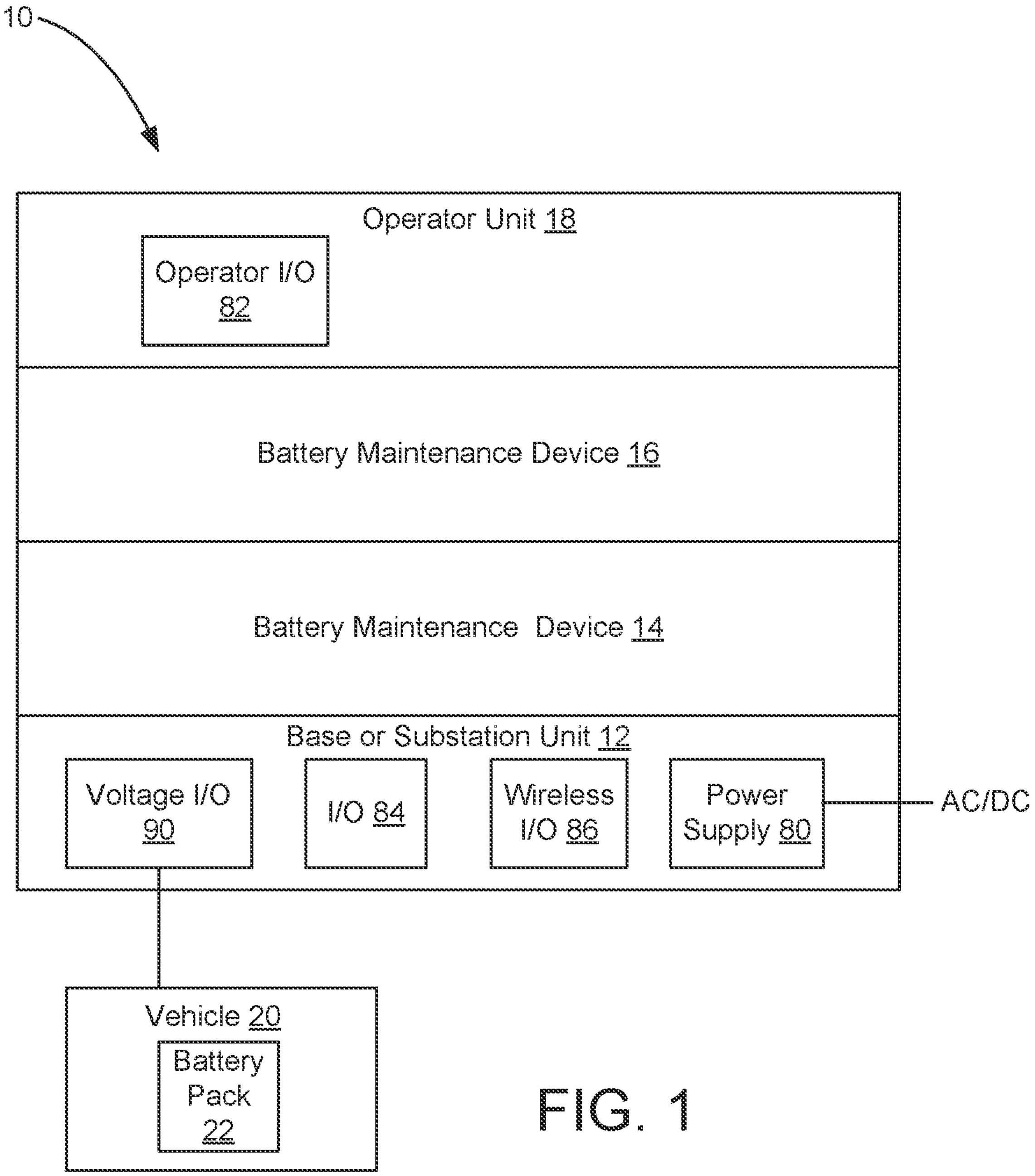
FIG. 1 is a block diagram of a battery maintenance system according to an embodiment.

FIG. 1 is a block diagram of a battery maintenance system 10 according to one embodiment. Battery maintenance system 10 includes a plurality of separable units coupled together including at least a first unit 14, a second unit 16, a third unit 12 and a fourth unit 18. First and second units 14 and 16 each comprise a battery maintenance device. While system 10 illustrated in FIG. 1 shows two battery maintenance devices 14 and 16, it should be realized that any number of battery maintenance devices may be included in system 10.

Third unit 12 configures first and second units or battery maintenance devices 14 and 16 with the correct voltage, controls digital communication with a battery or battery pack and contains all of the connections needed for system 10 to communicate in a battery maintenance environment. For example, third unit or base or substation unit 12 includes a power supply 80 used to provide power to battery maintenance system 10. The power supply 80 may be coupled to an AC power source, such as a wall outlet or other high power source, for use in charging the battery pack of a vehicle. Additionally, the power supply 80 may be coupled to a DC power source, such as a 12 Volt battery, if the battery maintenance system 10 includes a battery maintenance device for discharging the vehicle battery pack 22. For example, in addition to the battery pack 22, many electric vehicles also include a standard 12 Volt automotive battery. This 12 Volt automotive battery can be used to power devices of battery maintenance system 10. Other input/output circuitry 84 is provided for use in physically connecting to a data communication link such as an RS232, USB connection, Ethernet, etc. An optional wireless I/O circuit 86 is also provided for use in communicating in accordance with wireless technologies such as WiFi techniques, Bluetooth®, Zigbee®, etc. Voltage input/output circuitry 90 is provided for use in communicating with the databus of the vehicle 20, the databus of the battery pack 22, or receiving other inputs or providing outputs to the vehicle 20. Examples include the CAN communication protocol, OBDII, etc. Additionally, contact closures or other voltage inputs or outputs can be applied to the vehicle using voltage I/O circuitry 90. In addition, voltage input/output circuitry 90 is used to configure and supply the correct voltage, such as using parallel or series configurations, to battery maintenance devices 14 and 16 of battery maintenance system 10.

Fourth unit 18 includes an operator interface that is configured to allow a user to interact with the battery maintenance devices of first and second units 14 and 16. Fourth unit or operator unit 18 includes an operator input/output 82 to which a user communicates with battery maintenance devices 14 and 16. For example, the user uses operator I/O 82 to input information to microprocessors related to battery maintenance devices 14 and 16. In another example embodiment, the user may input information which identifies the type of vehicle or battery on which maintenance is being performed. This information can be input by an operator using the operator I/O 82, or through some other means such as by communicating with the databus of the vehicle, scanning a barcode or other type of input, etc. Based upon this information, battery maintenance devices 14 and 16 may provide an output to the operator using operator I/O 82 which informs the operator which type of interconnect cable should be used to couple to the vehicle and/or battery pack.

The operator I/O 82 may include a display along with a keypad input or touchscreen. The input may take various formats, for example, a menu driven format in which an operator moves through a series of menus selecting various options and configurations. Similarly, the operator I/O 82 can be used to step the operator through a maintenance procedure. In one configuration, a user identification, which identifies the operator using the equipment, can be input, for example, through operator I/O 82 and allows information related to the maintenance being performed to be associated with information which identifies a particular operator. Additional information that can be associated with the maintenance data include tests performed on the vehicle and/or battery, logging information, steps performed in accordance with the maintenance, date and time information, geographical location information, environmental information including temperature, test conditions, etc., along with any other desired information. This information can be stored in a memory for concurrent or subsequent transmission to any of battery maintenance devices 14 and 16 or another device or location for further analysis. A memory can also store program instructions, battery parameters, vehicle parameters, testing or maintenance information or procedures, as well as other information. These programming instructions can be updated, for example, using I/O 84 or 86, through an USB flash drive, SD card or other memory device, or through some other means as desired. This allows the battery maintenance system 10 to be modified, for example, if new types of vehicles or battery pack configurations are released, if new testing or maintenance procedures are desired, etc.

Figure 2:
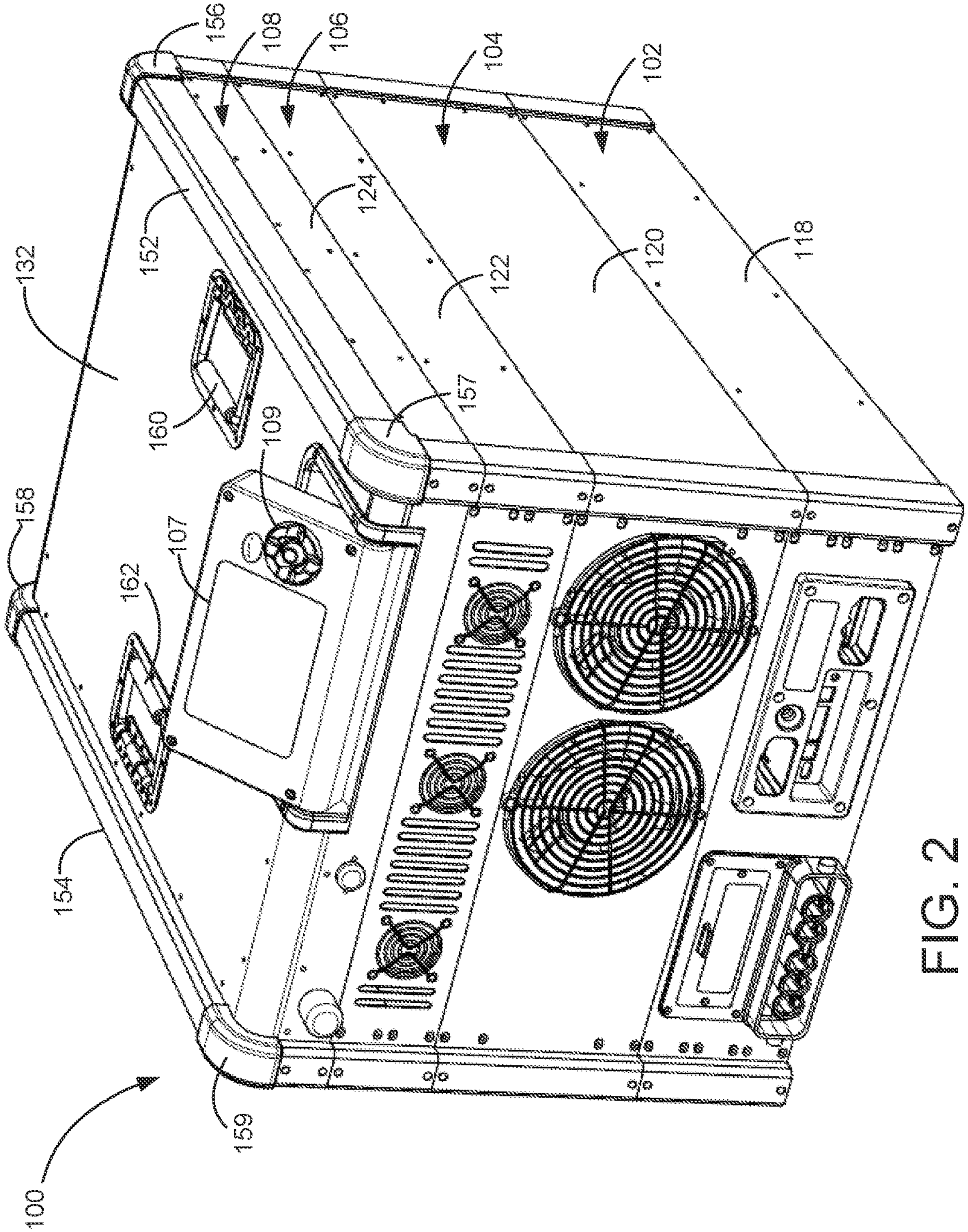
FIG. 2 is a perspective view of an exemplary assembled battery maintenance system including a plurality of battery vehicle maintenance devices under one embodiment.
Figure 3:
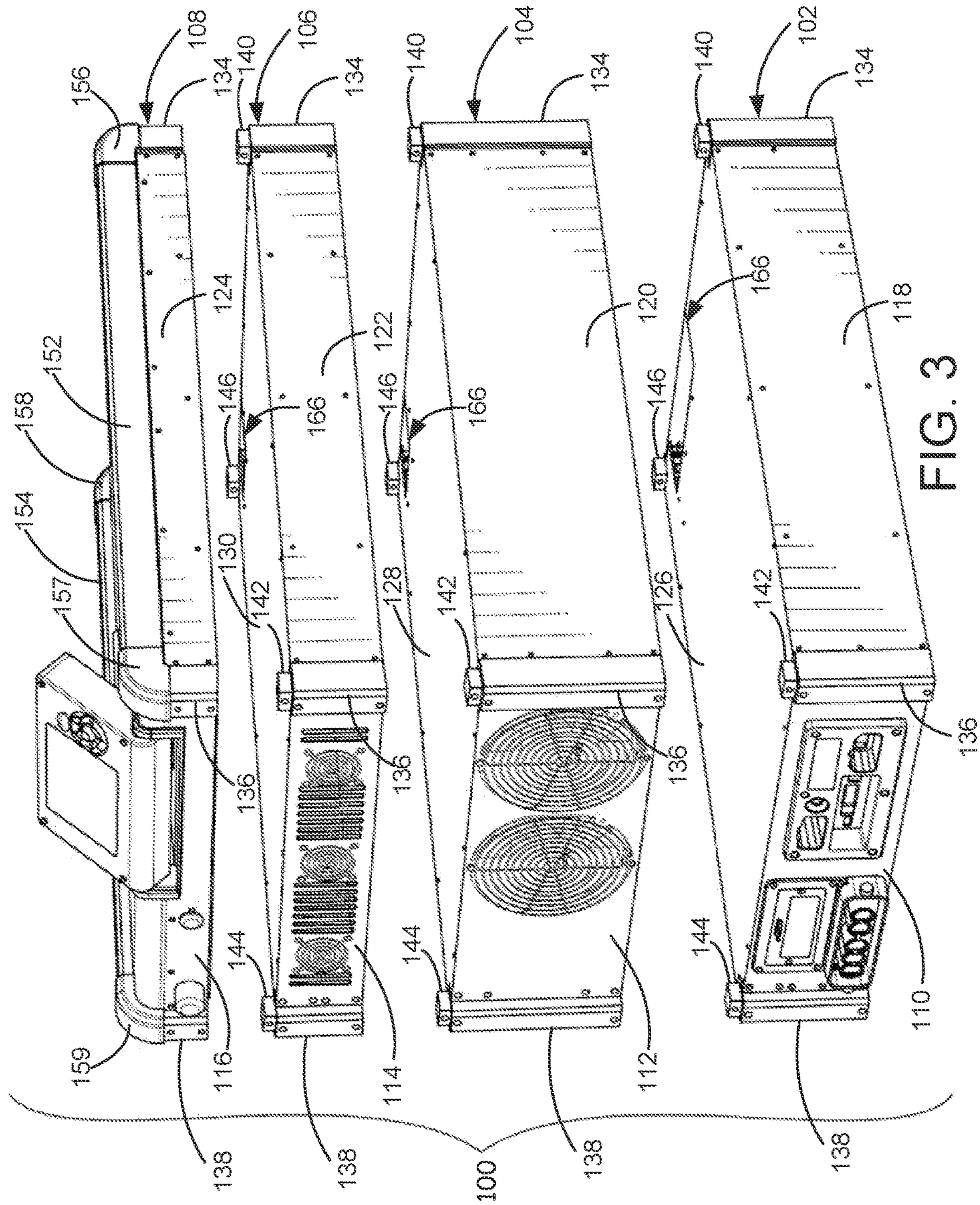
FIG. 3 is an exploded view of the battery maintenance system illustrated in FIG. 2.

FIG. 2 is a perspective view of an exemplary assembled battery maintenance system 100 including a plurality of battery vehicle maintenance devices under one embodiment. FIG. 3 is an exploded view of battery maintenance system 100. Battery maintenance system 100 includes first and second units or first and second battery maintenance devices 104 and 106, a third unit or base or substation unit 102, and a fourth unit or operator unit 108. Each of the first, second, third and fourth units 104, 106, 102, and 108 are encased in a housing and include physical connectors that allow the first, the second, the third and the fourth units to be coupled together in a stacked configuration or arrangement. It should be realized that battery maintenance system 100 can have any number of stackable units or devices or housings and that the physical connectors have features capable of adding and subtracting units or devices or housings in an ongoing basis and be arranged in any user selectable order.

Units 104 and 106 may be any number of battery or vehicle maintenance devices to be stacked as desired. For example, battery maintenance device 104 may be a discharging maintenance device and battery maintenance device 106 may be a charging maintenance device. Additional devices may be added as needed. For example, a discharging device for discharging storage batteries may need additional electrical loads to be added to the stack. Other devices such as battery testers, cooling fans, and diagnostic equipment can be added as desired. Such exemplary devices will be discussed below.

Base unit 102 configures units 104 and 106 with the correct voltage, controls digital communication with a battery or battery pack and contains all of the connections needed for system 100 to communicate in a battery maintenance environment. For example, base unit 102 may include a power supply, such as power supply 80 of FIG. 1 to provide power to battery maintenance system 10. Base unit 102 may include other input/output circuitry, such as input/output circuitry 84 of FIG. 1 to physically connect to a data communication link. In addition, base unit 102 may include voltage input/output circuitry, such as voltage input/output circuitry 90, to configure and supply the correct voltage, such as using parallel or series configurations, to battery maintenance devices 104 and 106. Operator or top unit 108 includes an operator interface, such as operator I/O 82 in FIG. 1, capable of interacting with the user. For example, top unit 108 may include a display screen 107 and user controls 109.

The housings of each unit 102, 104, 106 and 108 include a plurality of panels having a front panel 110, 112, 114, 116, a back panel (hidden from view), a right side panel 118, 120, 122, 124, a left side panel (hidden from view), a top panel 126, 128, 130, 132 and a bottom panel (hidden from view in FIGS. 1 and 2). However, it should be understood that top panels 126, 128, 130 and 132 and the bottom panels are optionally part of the housing of each unit 102, 104, 106 and 108 and are not required to be stackable in battery maintenance system 100.

Figure 4:
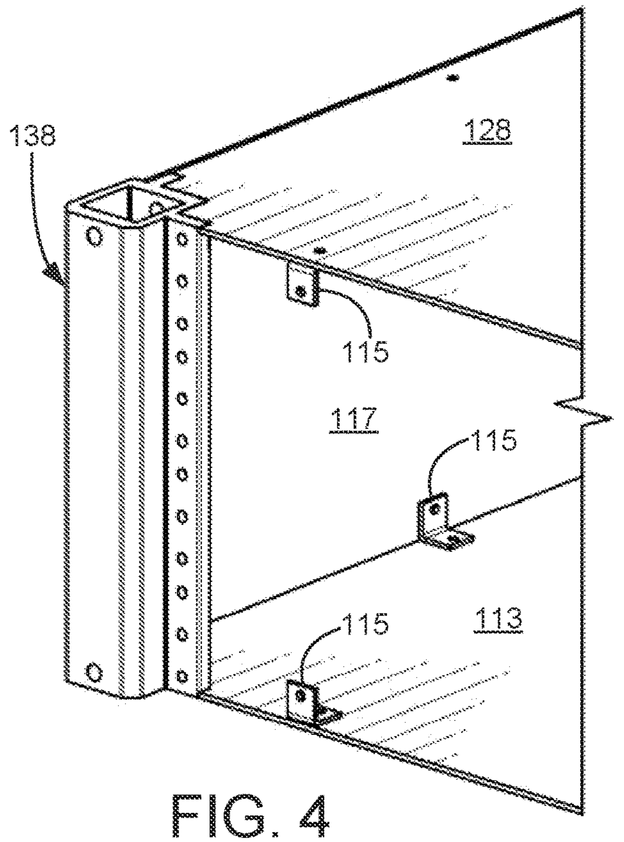
FIG. 4 is an enlarged view of an exemplary way of coupling panels of each battery maintenance device together under one embodiment.
Figure 5:
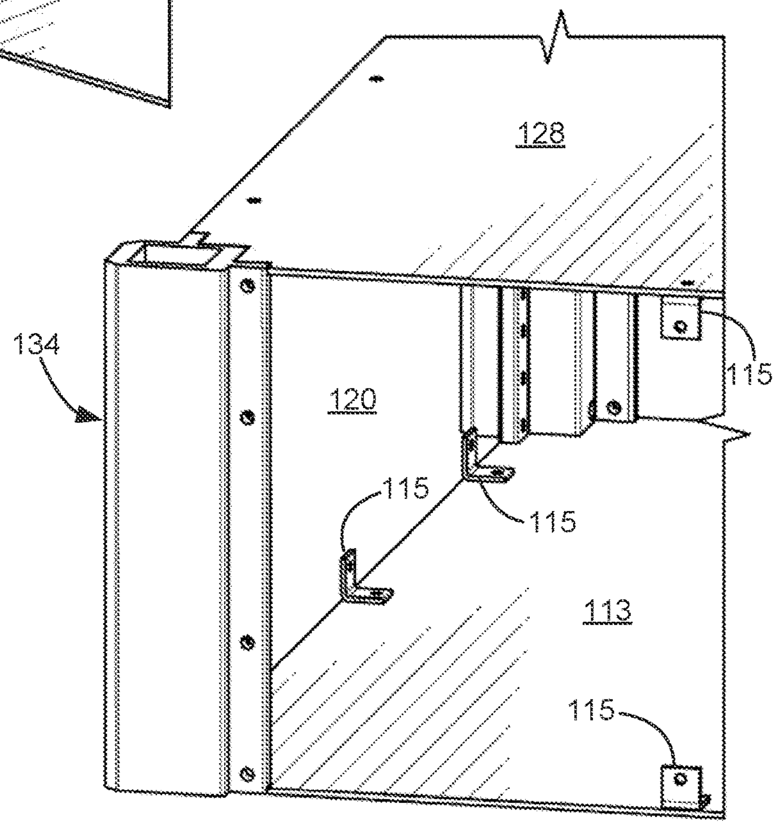
FIG. 5 is an enlarged view of an exemplary way of coupling panels of each battery maintenance device together under one embodiment.

FIGS. 4 and 5 illustrate enlarged views of exemplary ways of coupling panels of each unit 102, 104, 106 and 108 together to form housings. In FIG. 4, a front panel, for example, front panel 112 of device 104, is shown removed for purposes of illustration and may be coupled to a bottom panel 113 and top panel 128 and coupled to left side panel 117 by angle brackets 115. In FIG. 4, a back panel is shown removed for purposes of illustration and may be coupled to bottom panel 113 and top panel 128 and coupled to right side panel 120 by angle brackets 115.

Each housing of each unit 102, 104, 106 and 108 includes four physical connectors 134, 136, 138 (the fourth is hidden from view) that extend from the bottom panel of each unit to top panel 126, 128, 130 and 132. As illustrated in the FIGS. 2 and 3, each physical connector 134, 136, 138 is located at each of the four corners of each housing unit 102, 104, 106 and 108 and are aligned such that the corners of each housing unit may be coupled together using the physical connectors. In particular, first unit or first battery maintenance device 104 includes a first set of physical connectors 134, 136 and 138 each located at a corner of the housing of first unit 104, second unit or second battery maintenance device 106 includes a second set of physical connectors 134, 136 and 138 each located at a corner of the housing of the second unit 106, third unit 102 includes a third set of physical connectors 134, 136 and 138 each located at a corner of the housing of the third unit 102 and fourth unit 108 includes a fourth set of physical connectors 134, 136 and 138 each located at a corner of the housing of the fourth unit 108. As illustrated in FIGS. 2-5, each physical connector 134, 136 and 138 of each unit includes a vertical member having a first end and an opposing second end. Under one embodiment and as illustrated in FIGS. 4 and 5, each vertical member may be a hollow vertical member.

Under one embodiment, each physical connector 134, 136 and 138 further includes an extension 140, 142, 144, 146 that protrudes from the first end of each vertical member, while the opposing second end of each vertical member is configured to receive an extension of a physical connector on another housing unit. As illustrated in FIGS. 2 and 3, first set of physical connectors 134, 136 and 138 of first unit 104 and second set of physical connectors 134, 136 and 138 of second unit 106 are aligned and are coupled together. In other words, the second ends of the vertical members of the second set of physical connectors 134, 136 and 138 of second unit 106 are mounted to the extensions 140, 142 and 144 of the first set of physical connectors 134, 136 and 138 of first unit 104. As also illustrated in FIGS. 2 and 3, third set of physical connectors 134, 136 and 138 of third unit 102 and first set of physical connectors 134, 136 and 138 of first unit 104 are aligned and are coupled together. In other words, the second ends of the vertical members of the first set of physical connectors 134, 136 and 138 of first unit 104 are mounted to the extensions 140, 142, and 144 of the third set of physical connectors 134, 136 and 138 of third unit 102. As also illustrated in FIGS. 2 and 3, fourth set of physical connectors 134, 136 and 138 of fourth unit 108 and second set of physical connectors 134, 136 and 138 of second unit 106 are aligned and are coupled together. In other words, the second ends of the vertical members of the fourth set of physical connectors 134, 136 and 138 of fourth unit 108 are mounted to the extensions 140, 142, and 144 of the second set of physical connectors 134, 136 and 138 of second unit 106. As illustrated, first unit 104 and second unit 106 are sandwiched between third unit 102 and fourth unit 108 so that third unit 102 is located below first and second units 104 and 106 and fourth unit 108 is located above first and second units 104 and 106.

Figure 6:
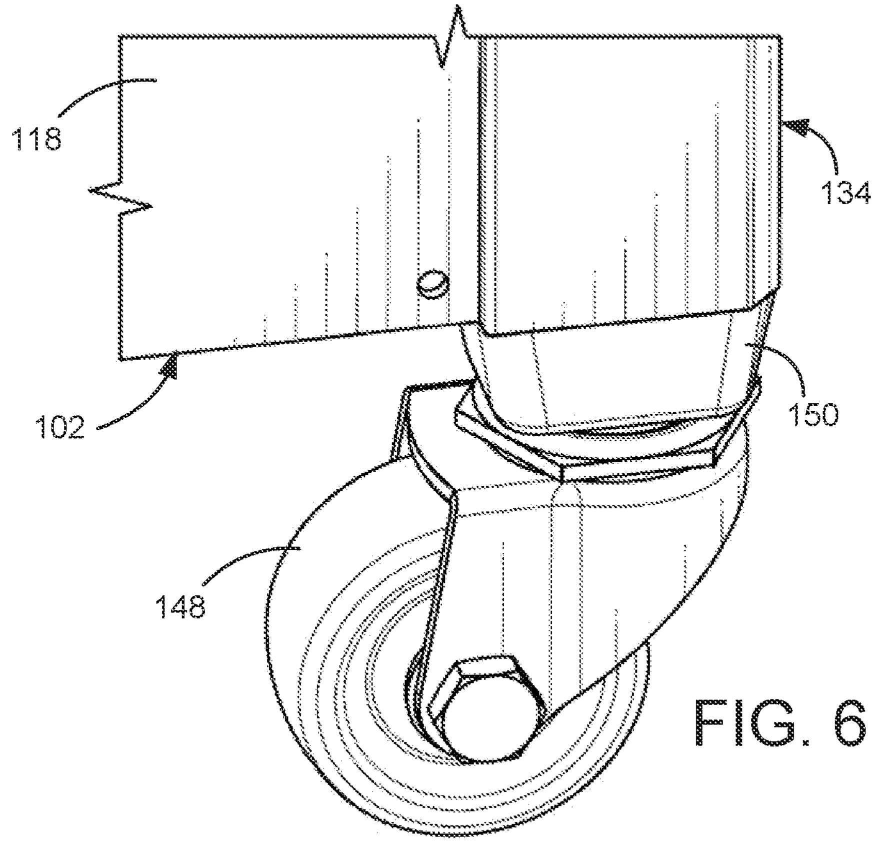
FIG. 6 is an enlarged view of an exemplary wheel or caster coupled to s battery maintenance system under one embodiment.

While the second ends of each vertical member on each housing unit 102, 104, 106 and 108 are configured to receive an extension of another housing unit, the second ends of each vertical member of each physical connector 124, 136, 138 and 140 may also be configured to couple to additional desirable components such as wheels or base pads for placing the assembled battery maintenance system 100 on a floor. FIG. 6 illustrates an enlarged view of an exemplary wheel or caster 148 coupled to a receiving second end of a hollow vertical member of a physical connector, such as physical connector 134, of base unit 102. In particular, the second end of the hollow vertical member of physical connector 134 is in receipt of a rubber stem 150 coupled to wheel or caster 148.

Similarly, and with reference back to FIGS. 2 and 3, a pair of rail members 152 and 154 and associated corner members 156, 157, 158 and 159 may be mounted to extensions of the vertical members of the connectors of fourth or top unit 108 of the assembled system 100. As illustrated in FIGS. 2 and 3, corner members 156 and 157 are coupled to opposing ends of rail member 152 and coupled to extensions that are protruding from first ends of vertical members of connectors 134 and 136. As also illustrated in FIGS. 2 and 3, corner members 158 and 159 are coupled to opposing ends of rail member 154 and coupled to extensions that are protruding from first end of the vertical member of the connector 138 and another connector hidden from view. Rail members 152 and 154 and associated corner members 156, 157, 158 and 159 protect the user from sharp panel edges on fourth or top unit 108. In addition, fourth or top unit 108 may include handles 160 and 162 on its top panel 132 for lifting the assembled system 100.

Figure 7:
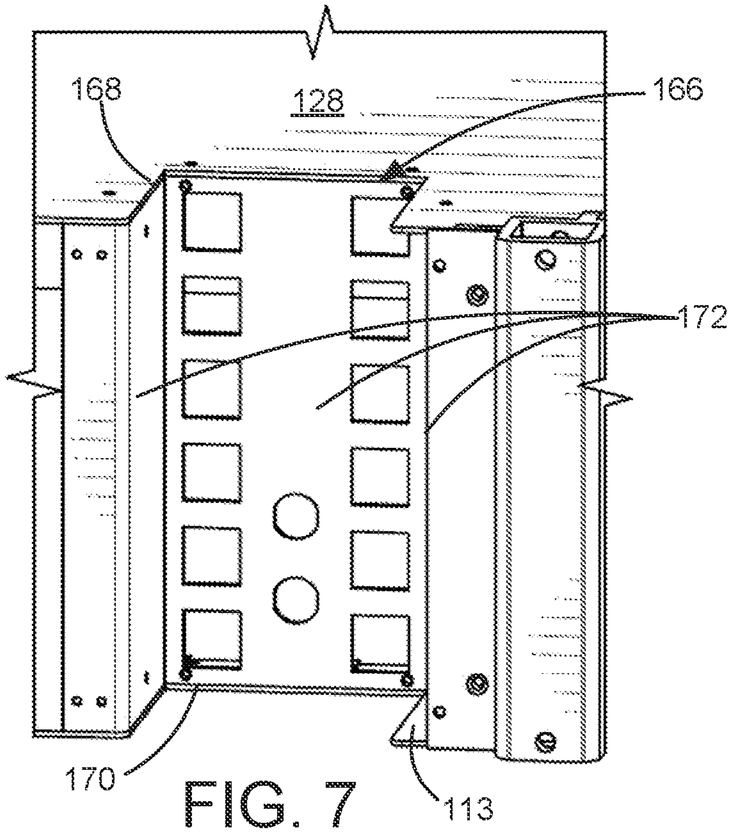
FIG. 7 is an enlarged view of a tunnel or channel in a battery maintenance device under one embodiment.
Figure 8:
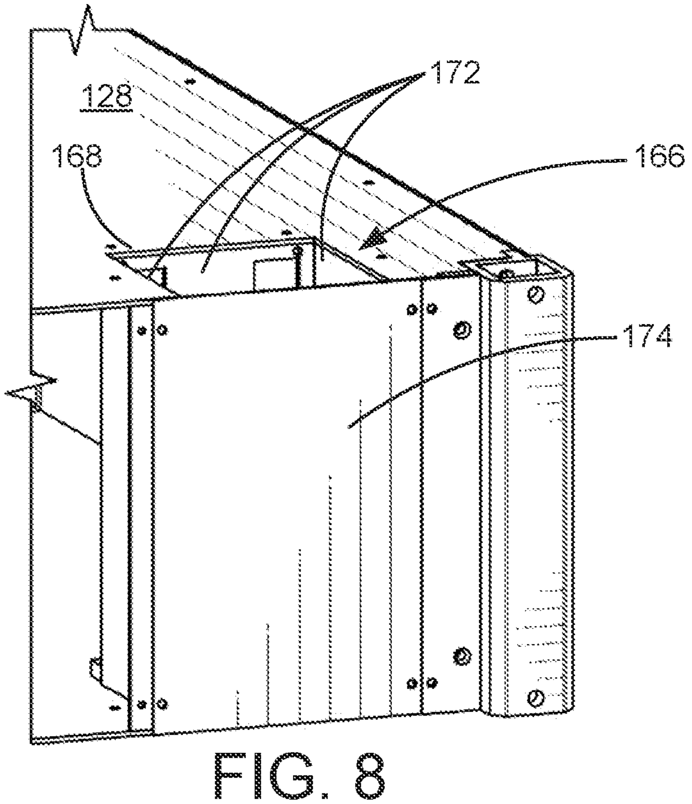
FIG. 8 is an enlarged view of the tunnel or channel illustrated in FIG. 7 covered with a cover under one embodiment.
Figure 9:
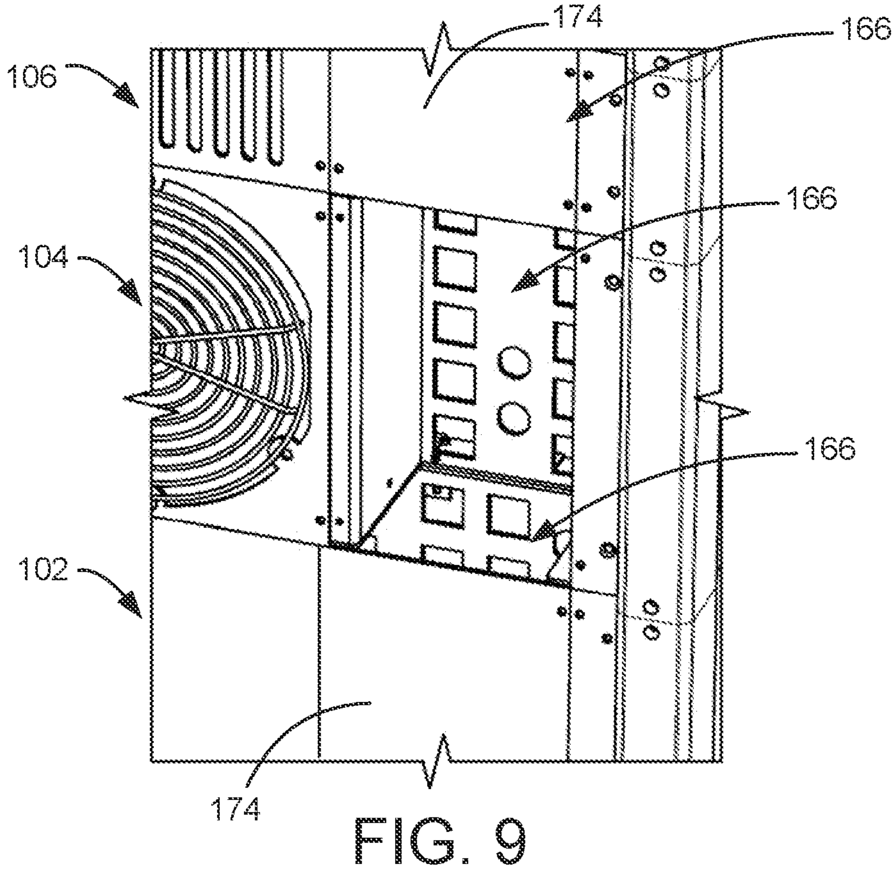
FIG. 9 is an enlarged view of a plurality of tunnels or channels in a plurality of battery maintenance devices intersecting to form a single tunnel or channel under one embodiment.

FIG. 7 is an enlarged view of a tunnel or channel 166 in the housing of a unit of the plurality of separable units under one embodiment. With reference back to FIG. 3, each unit or device 102, 104, 106 and 108 may include a tunnel or channel 166. Channel 166, as illustrated in FIG. 7 is defined by a cut out 168 in top panel 128 and a cut out 170 in bottom panel 113. Cut outs 168 and 170 are connected by channel walls 172. Channels 166 in unit or device are configured to allow cables to run between the separable units or devices that are coupled or stacked together. Each channel 166 may optionally be covered with a cover, such as cover 174 illustrated in FIG. 8. FIG. 9 illustrates a plurality of channels 166 in a plurality of units or devices intersecting to form a single tunnel or channel for allowing cable to run between each of the units or devices. In FIG. 9, the top tunnel or channel 166 of device 106 is covered by cover 174, the middle tunnel or channel of device 104 is not covered by a cover and the bottom tunnel or channel 166 of base unit 102 is covered by cover 174.

Figure 10:
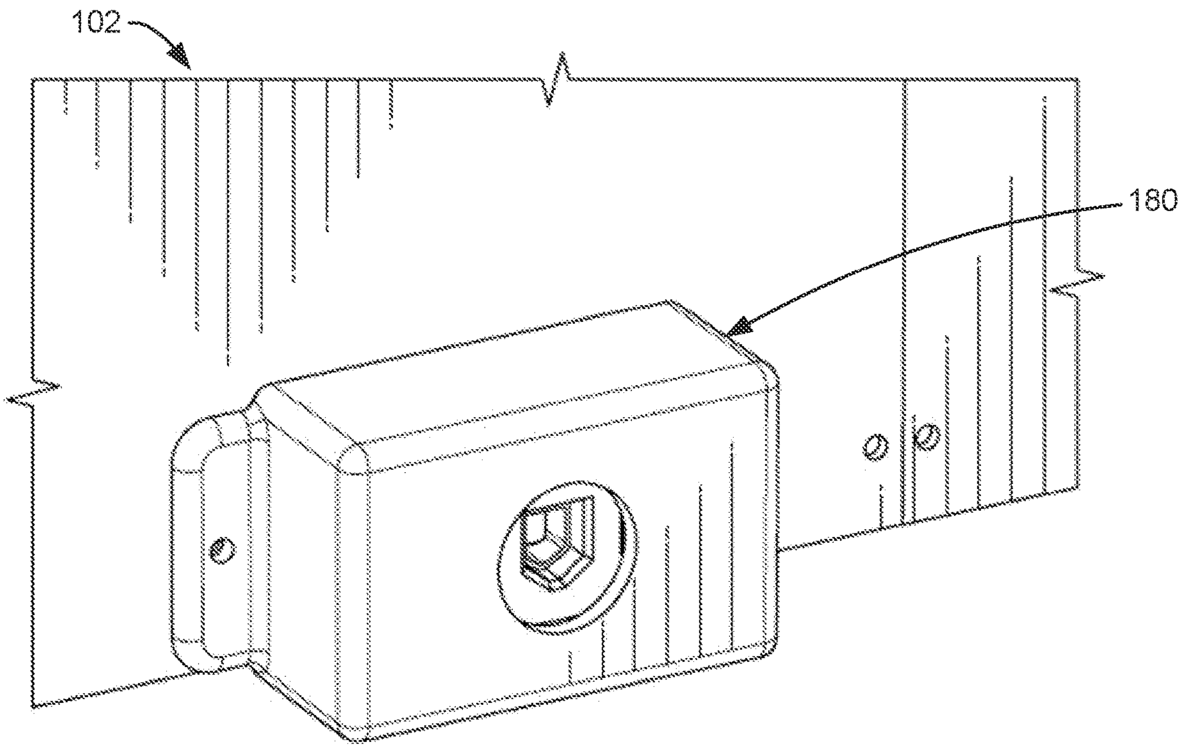
FIG. 10 is an enlarged view of an AC cover on a battery maintenance device under one embodiment.
Figure 11:
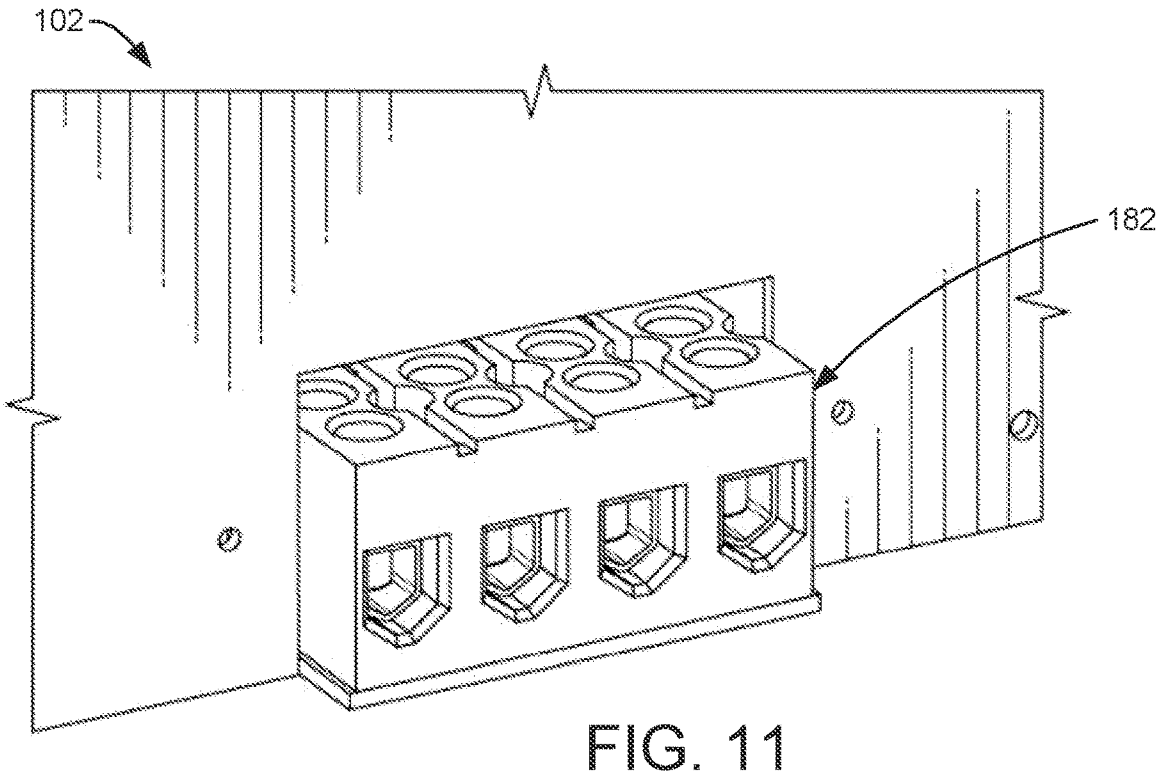
FIG. 11 is an enlarged view of an AC entrance block on a battery maintenance device under one embodiment.

FIG. 10 is an enlarged view of an AC cover 180 on base or substation 102 under one embodiment. With reference back to FIGS. 2-3, base or substation unit 102 may include AC cover 180. In FIG. 10, AC cover 180 is a three-phase AC cover that is configured to allow the connection of a power supply, such as power supply 80, of battery maintenance system 100 to an AC power source. FIG. 11 is an enlarged view of an AC entrance block 182 on base or substation 102 under one embodiment. In FIG. 11, AC entrance block 182 is configured to allow the connection of a power supply, such as power supply 80, of battery maintenance system 100 to a plurality of AC power sources.

As previously discussed, while only two units that are battery maintenance devices, such as units 104 and 106, are shown in FIGS. 1-3, system 10 and 100 may include any number of units that are battery or vehicle maintenance devices and may be stacked as desired. For example, unit 104 may be a discharging maintenance device, unit 106 may be a charging maintenance device and additional units acting as maintenance devices may be added as needed. A discharging device for discharging storage batteries may need additional electrical loads to be added to the stack by using additional physical connectors. Other maintenance devices such as battery testers, cooling fans, and diagnostic equipment may also be added as desired. Such exemplary devices will be discussed below.

Figure 12:
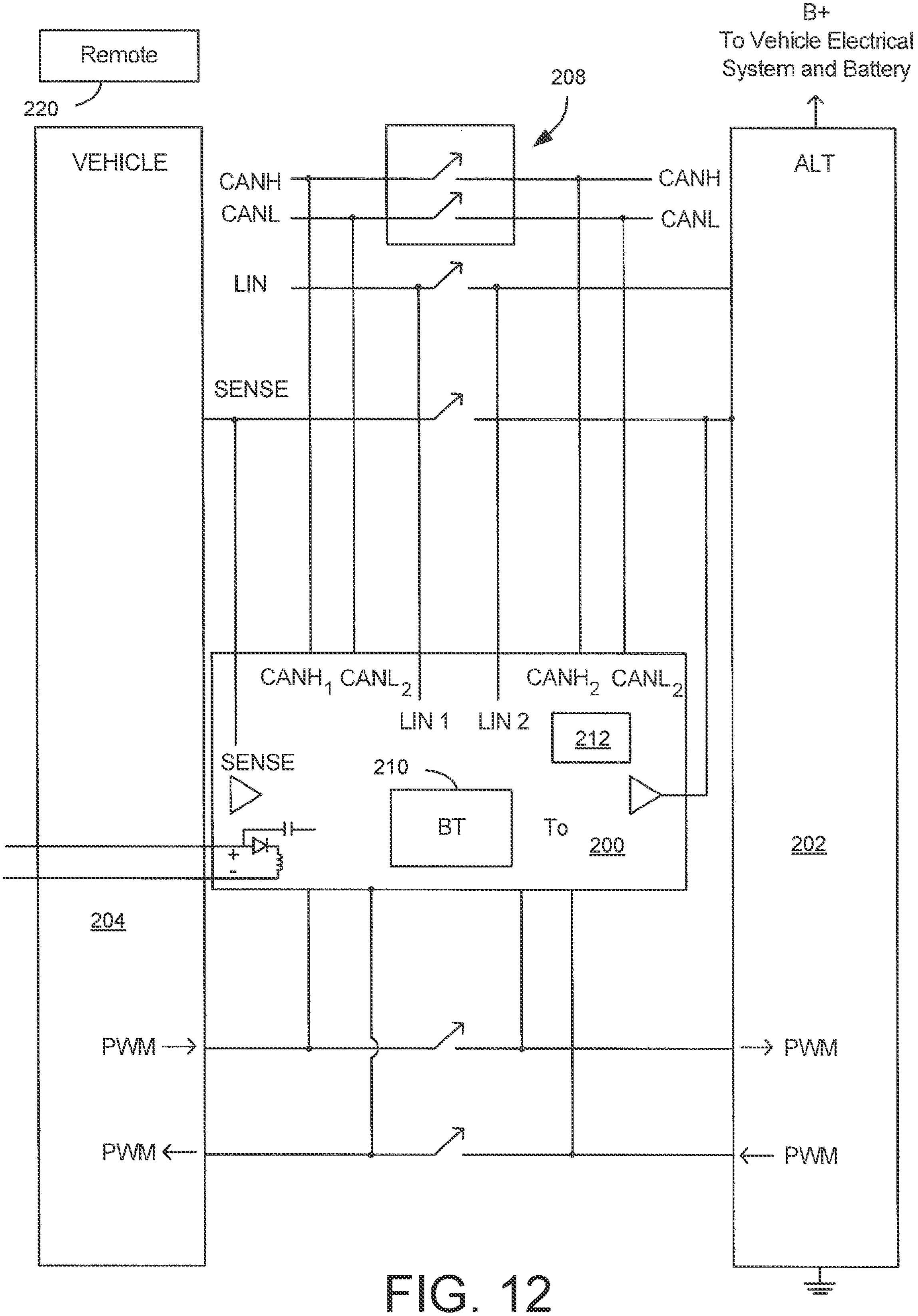
FIG. 12 is a simplified block diagram of an exemplary battery maintenance device in accordance with one example embodiment.

FIG. 12 is a simplified block diagram of one embodiment of a battery maintenance device that may be arranged in a stack of battery maintenance devices, such as any of devices 104 and 106, to form battery maintenance system 100. In particular, the battery maintenance device illustrated in FIG. 12 includes an alternator or starter motor tester 200. In FIG. 12, alternator or starter motor tester 200 is illustrated as being connected by an adapter cable 208 between an alternator 202 and a vehicle 204. As previously discussed, any connections between the battery maintenance environment and a battery maintenance system, such as system 10 or 100, is provided by base or substation unit 12 or 102.

A vehicle charging system generally includes the battery, an alternator, a regulator and an alternator drive belt. The role of the charging system is twofold. First, the alternator provides charging current for the battery. This charging current ensures that the battery remains charged while the vehicle is being driven and therefore will have sufficient capacity to subsequently start the engine. Second, the alternator provides an output current to power all of the vehicle electrical loads. In general, the alternator output, the battery capacity, the starter draw and the vehicle electrical load requirements are matched to each other for optimal performance. In a properly functioning charging system, the alternator will be capable of outputting enough current to drive the vehicle electrical loads while simultaneously charging the battery. Typically, alternators range in size from 60 to 120 amps.

Alternator tester 200 illustrated in FIG. 12 includes alternator test circuitry which is electrically coupled between alternator 202 and other components of an automotive vehicle 204. An optional clamp on amp meter (amp clamp) or other current sensor can be configured to electrically couple to an alternator output B+ cable. The clamp on amp meter can communicate wirelessly, for example through a Bluetooth® connection, to other equipment. Further, tester 200 can be configured to work with an alternator or starter motor that has been removed from a vehicle.

Alternators are used in automotive vehicles to provide power to the electrical system of the vehicle as well as charge a battery of the vehicle. There are many types of alternator configurations and they vary between vehicles as well as manufacturers. In general, an alternator has at least two outputs, a ground and a powered output which is sometimes referred to as the B+ connection. The alternator acts as an electrical generator and is typically rotated by an internal combustion engine in the vehicle. Other typical connections to an alternator include a connection to an ignition switch as well as connections for an external voltage regulator. Additionally, some alternators include an internal voltage regulator and/or diodes for rectifying an AC charge signal generated by the alternator. Further still, some more complex alternators may include internal sensors for use in diagnostics as well as a databus connection for coupling to a databus of a vehicle. Some alternators also include connections for connecting to external sensors such as a voltage or current sensor located proximate the vehicle battery. Similarly, starter motors in vehicles vary greatly in their configuration. A typical starter motor has at least two electrical connections, one to electrical ground and a switchable power connection used to power an electrical motor of the alternator and thereby crank the internal combustion engine of the vehicle. The power connection is typically controlled by an electrical relay connected to the key switch of the vehicle. Closing this relay completes an electrical circuit with the vehicle battery. Some starter motors include additional connections including connections to external sensors, connecting to internal sensors of the starter motor, and may even include a connection for coupling to a databus of the vehicle. The variability between various alternator and starter motor configurations makes it difficult to test the performance of more than one specific configuration.

A universal connector system may be implemented which includes one or more specific adapter cables that are configured to be plugged into particular vehicle types and/or alternator types. This allows the alternator test circuitry to be placed between the vehicle and the alternator to thereby monitor signals which are exchanged therebetween as well as send commands or other information over this connection. The cable can also be used to control and monitor operation of the alternator for bench (out of vehicle) testing.

The communication may occur using any appropriate technique including communicating with vehicle circuitry over an OBDII module. This allows the device to query the VIN number as well as other information from the vehicle including determining specifics vehicle type, control, RPM, particular loads of the vehicle, etc.

The alternator tester may also communicate with other equipment including other battery maintenance devices in the stack of devices in system 10 or 100, such as a battery tester, in accordance with the various techniques set forth herein as well as a charger which can monitor battery voltage, apply loads, etc. The communication with the OBDII system may be directly or also may also be routed through the tester, etc.

In FIG. 12, adapter cable 208 is connected between alternator 202 and vehicle 204. For example, the alternator and vehicle may be coupled together through electrical plugs or other connectors. These connections can be separated and the alternator tester plugged therebetween. This allows communication and control over the system through the various connectors including a sense connector, a pulse width modulated (PWM) connection, CAN, LIN, etc. The various physical connectors and communication protocols are chosen for a specific vehicle and alternator under test. Alternator 202 also includes a B+ connection which provides a charging output to the battery of the vehicle. A current sensor (not shown in FIG. 1) such as an amp clamp or other type of sensor, may be coupled to the B+ output or electrical ground and used to monitor the amount of current provided by the alternator 202 as well as the waveform of this current. Additionally, voltage sensors may also be employed.

In operation, a technician electrically couples the amp clamp to the alternator 202 B+ cable. The electrical connections/cables which extend between the alternator and the vehicle are unplugged and the technician plugs the adapter cable 208 of the alternator 204 into these connections. The alternator test circuitry 100 may than monitor a communication that occurs between the vehicle 204 and the alternator 202 and simply pass signals therebetween. Such information and communication could include commands sent from the vehicle 204, particular responses or commands from the alternator 202, responses of the vehicle 204 to particular events or communications from the alternator 202, loading of the electrical system, changes in the RPM of a motor of the vehicle 204, etc. When used during bench testing, the cable 108 can be used to control operation of the alternator 202 as well as monitor its operation.

After observing communication between the alternator 202 and the vehicle 204 during normal operation, the test circuitry 200 may than break the electrical connection and insert itself into the communication. This allows the test circuitry 200 to operate as if it was the vehicle sending commands to the alternator and observing responses including changes in the charge signal from the alternator 202. Similarly, the test circuitry 200 may operate as if it was the alternator 202 sending and receiving commands and information from the vehicle 204 and observing such operation.

This allows a determination to be made as to the root cause of a problem. The cause of a charging problem may be isolated as between a problem within an alternator 202 itself, a problem related to the vehicle 204 including engine control or commands or other information communicated with the alternator 202, electrical wiring, sensed leads, etc. The use of an optional battery test may also be implemented to further isolate problems in the electrical system.

If Bluetooth® or other communication circuitry 210 is provided, a technician may be able to remotely monitor the test circuitry 200 or communicate with cable 208, including communicating with the adapter cable 208 while the technician operates the vehicle 204. The technician can communicate with the adapter cable using remote unit 220. The test circuitry and/or adapter cable 208 may also include a local input or output including a display or command buttons for use by the technician. Further, data collected during monitoring or testing may be logged in a memory 212 of the cable adapter 208 for subsequent examination.

The cable adapter 208 may include other communication circuitry as well as other sensors or sense circuitry as appropriate for the various vehicles 204 and/or alternators 202 which may be tested. An optional internal power supply may be used or the device may be powered with power received from the vehicle itself. A remote wireless display and/or input or other control 220 may be used to allow the operator to monitor and control the cable adapter 208 or the test circuitry 200. Collected information including test results, type of vehicle, VIN number, type of alternator, etc. may also be collected and communicated to a remote location such as a remote database, a manufacturer or warranty service location, etc.

The databus connections to the cable 210 can also be used to provide additional functionality. For example, a microprocessor or other logic may be added to the cable 208 by a user, for example in the field. This allows additional features or upgrades to be provided to the cable 208 after an initial sale or installation. In such a configuration, a module containing the additional functionality is coupled to the cable 208 and interfaced to the databus. This module may be powered internally, or may receive power from the cable 108 itself, including, for example, through a connection to the vehicle 204. Further, additional relay logic or other functionality including additional sensors, connectors for additional communications, etc. may be provided.

The alternator tester 200 discussed herein may also be configured to function and test an alternator which has been removed from a vehicle. In such a configuration, the alternator tester 200 may include a motor or other actuator to rotate the alternator causing the alternator to function. In such a configuration, the vehicle interface discussed above is not required. The alternator tester may include a storage battery or a load configured to simulate a storage battery for performing diagnostics. In such a configuration, the battery itself may also be tested using the techniques discussed herein.

A universal drive system may be provided in which a groove/V-belt is configured to couple to the alternator and cause the alternator to be rotated. An arrangement is provided in which an alternator is mounted in a test fixture, a belt connected to the alternator, and the belt tension so that the alternator is caused to rotate by movement of the belt. This configuration can be held in place on the pulley of a motor by belt tensioners or the like. The alternator can be placed in a linear actuator that can be configured to lift or otherwise move the alternator with respect to the motor pulley on the drive belt to thereby tension the drive belt. A strap or other attachment mechanism can be used to fasten the alternator to the linear actuator on a temporary basis. A lifting lever or the like applies compression against the cost rate spring to the linear actuator to thereby take up slack and provide belt tension. Variations in travel due to different sized alternators can then be absorbed by the springs.

The alternator, belt and drive pulley can be enclosed in an enclosure for safety purposes. The enclosure may include safety cover with a window and include mechanical interlocks that can be pulled over the device. The safety cover can also latch the lifting lever into place to thereby ensure belt tension during testing. Optional lifting mechanisms may be employed to accommodate different alternator configurations.

A selectable electrical load can be applied to the alternator during testing. For example, 5, 10, 15 and 20 amp load currents can be drawn from the alternator and using resistive loads that are digitally actuated and combined in various combinations to achieve loads which draw from between 5 amps up to 50 amps. A motor can be powered by standard wall current for example, 115 VAC such as a 1.5 hp motor, which is used to power the alternator up to its maximum output. The motor can include a start capacitor for assisting in startup. The amp clamp discussed above can be used with a B+ output from the alternator passing through a wire and to the load. The amp clamp can be placed around the wire to monitor current flow. In one configuration, the B+ and grounding cables are implemented with low cost weld connectors. Wireless communication may also be implemented. The alternator tester 200 may also provide other communication techniques including WiFi, Ethernet, Bluetooth™, cellular, etc. Specific cables may be employed for specific types of alternators and may include identification information stored either visually and/or using other techniques such as RFID or NFC tags or using other storage techniques. Similarly, a memory or the like may be used to store information in the cable connector, including resistors which can be programmed as desired. The alternator tester may include an optional output such as a video display screen to show connection diagrams, instructions videos, test results, etc. The information may be stored in memory or provided live from an external source such as the internet, data cloud, etc.

Figure 13:
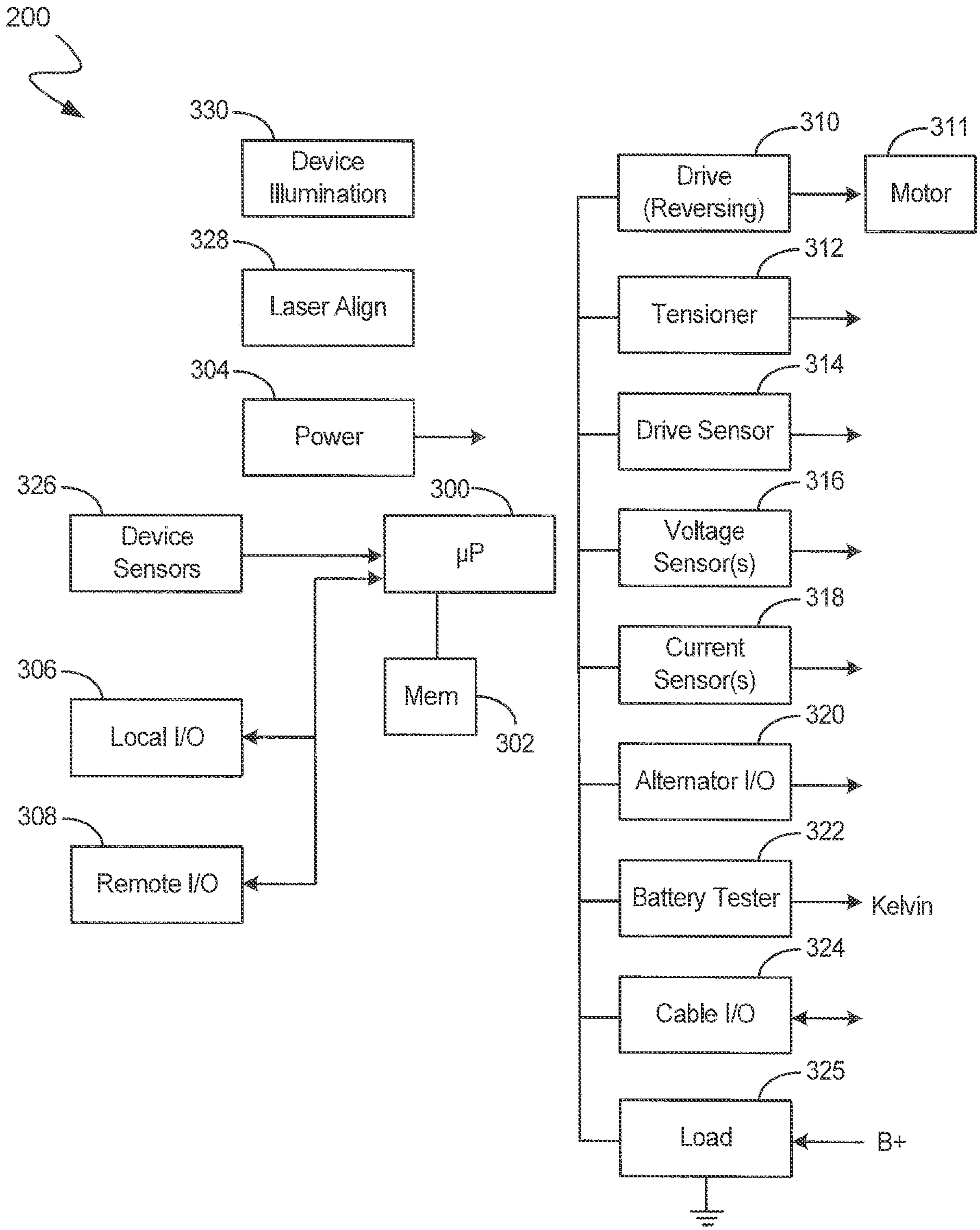
FIG. 13 is a simplified block diagram of an exemplary alternator tester in accordance with one example embodiment.

FIG. 13 is a simplified block diagram of alternator tester 200 showing various components of the system. Alternator tester 200 includes a microprocessor 300 or other controller which operates in accordance with instructions stored in a memory 302. Memory 302 can also be used to store other information including information regarding the alternator under test, test criteria, test rules, test measurements, test results, information related to an operator or a location, instructions which may be provided to an operator, etc. As previously discussed, power supply 304 used to power the various components of the device, I/O 306, such as a display as well as a user input such as a keyboard, touchpad, touchscreen, etc., are provided by system 10 or 100 via base or substation unit 12 or 102 and top unit 18 or 108. The I/O may also include other types of input/output circuitry including a barcode scanner, local Bluetooth® communication circuitry, RF communication circuitry, etc. Remote I/O circuitry 304 is also provided as a way to communicate with the remote location using wireless or wired communication protocols including, for example, WiFi, Ethernet, cellular technologies, etc. as well as the remote user interface 220 shown in FIG. 12.

The system 200 includes any number modules for sensing and/or controlling various aspects of the testing procedure. A drive circuit 310 is used to drive a motor 311 which turns a drive wheel. The motor 311 can be a capacitor start/capacitor run motor in order to provide for maximum horsepower using power from a standard AC outlet. The drive wheel may be driven at different speeds as well as optionally reversed in accordance with some alternator configurations, such as clutched alternators. A tensioner actuator 312 is provided. A drive sensor 314 can be used to sense the amount of resistance applied by the drive motor 311. This can be used as feedback for tensioning the drive belt using tensioner actuator 312 as well as use to identify problems with a particular alternator such as a failing bearing. Voltage sensors 316 are used for connecting to various voltage points in the alternator such as the B+ connection, ground connection, control connections, etc. Current sensors 318 may also be provided and may include the amp clamp discussed herein. The current sensors may be Hall Effect sensors, amp clamp sensors, as well as shunt based sensors or other configurations. Alternator I/O circuitry 320 is provided for use in sending control signals to the alternator 202 as well as sensing output data provided by the alternator. An optional battery tester 322 may be provided for connecting to a battery of the vehicle. The battery tester 322 may include Kelvin connections for use in measuring a dynamic parameter of the battery or other components of the vehicle. A cable I/O module 324 may be provided to communicate with a cable, such as cable 208 shown in FIG. 12. The cable is used to provide the data and sensor connections to the alternator. Various different cables may be employed and the cable I/O module 324 is used to interrogate the cables to identify the particular cable which is in use as well as any information stored in the cable. Additionally, information may be sent to a memory in the cable for storage and subsequent use. Various modules illustrated in FIG. 13 may be embodied in cable 208. Further, the modules may be used in interface with an alternator and a vehicle while the alternator is in the vehicle, and may also be used in configurations in which the alternator is removed from the vehicle for bench testing.

Further, using the drive sensor 314, the motor 311 current and/or voltage may be monitored and used as a feedback mechanism. The current applied to motor 311 may be monitored and used as feedback mechanism to control the tensioning. A load 325 may be connected to the current output from the alternator 202, for example, between the B+ and ground connections, in order to load the alternator. The load may be controlled by microprocessor and may be variable whereby different loads may be applied to the alternator 202 and performance of the alternator monitored.

The memory 212 of cable 208 may store various types of information related to the cable itself. For example, the information may indicate a type of cable, a serial number of the cable, a date the cable was placed into service, the number of tests performed using the cable, statistics related to tests performed using the particular cable such as pass, fail, etc., or other information. A cable may be identified using data stored in a memory such as an EEPROM, a RFID chip or other type of communication device, a flash memory, a mechanical switch which may be set, programmable resistors, etc. Further, the cable can be left connected to a vehicle so that data can be collected during normal operation. Additionally, circuitry within the cable 208 can be used to perform soft diagnostics. For example, dual leads may be used to for an in vehicle testing configuration of the cable 208. In such a configuration, the normal communication between the vehicle and the alternator can be monitored as-is, or can be interrupted for detailed diagnostics. In the as-is mode, the tester can observe the command and response as provided by the vehicle. In the interrupted mode, the tester can pretend to be the alternator performing in different modes, and observing the vehicle response to verify correct operation. Alternatively, the tester can pretend to be the vehicle operating in different modes, and observe the alternator response to verify correct operation. With a single lead version, biased terminals can be provided for connector and alternator since it can be automatically detected if the correct loading is placed on the electrical terminals when the connector is fitted to the alternator. The various data buses provided by cable 208 illustrated in FIG. 12 may be used to add an additional microprocessor or providing additional functionality at a future date. Similarly, relay logic may be implemented.

During a bench test, an operator may mount alternator 202 in a test fixture. Voltage sense connections are coupled to the B+ ground, or other connections to the alternator 202. Current sensors are used to sense the current generated by alternator 202 and control connections are provided for use in controlling operation of alternator 202. The alternator 202 is rotated using motor 311 and the output current and voltage are monitored. Various electrical loads are applied using load 325. The rate of rotation can be controlled as desired. A determination is made as to the condition of the alternator based upon the speed of rotation, the measured voltage and/or current, and the specifications of the alternation under test. These specifications may be input manually, stored in a database and selected based up on information received to identify the type of alternator under test or received using some other means. Data may also be received through a connection to a databus of the vehicle, for example using OBDII or some other technique. For example, when a certain resistive load is connected to alternator 202, and the alternator rotated at a particular RPM, the alternator 202 may be specified to output a minimum current and/or or voltage level. Further, the waveform of the current and/or voltage can be monitored, including monitoring under various speeds or loads, to ensure that there are no ambiguities such as excessive ripple. The torque required to rotate the alternator can also be measured to ensure that there are no mechanical problems with the alternator. Electrical parameters of the alternator 202 can also be measured, for example resistance, inductance, capacitance, or others, using the connections, including using the Kelvin connections provided by the batter tester module 322 or some other sensor. Based upon the measurements, a diagnostic output is provided, for example to an operator. The output can provide absolute measurements as well qualitative results such as pass, fail, or impending failure. The information may also be sent to a remote location using the techniques discussed herein.

During an in-vehicle test, the cable 208 is coupled between the vehicle 204 and the alternator 202 as illustrated in FIG. 12. Using the connections to the alternator, current and/or voltage generated by the alternator can be measured. Information related to alternator RPM can be retrieved from the vehicle databus. Further, the vehicle databus can be used to control loads applied to the alternator through the vehicle electrical system. The remote 220 can be used by an operator to communicate with the cable 208, including receiving data collected by the cable 208 and controlling the vehicle using a connection to the vehicle databus. The diagnostics and modules discussed above can be implemented in the cable. In another configuration, memory 212 in the cable 208 is used to store collected information for subsequent use in performing diagnostics. These may be performed using a computer, or other device such as tester 200. Further, if the cable can communicate information to a remote location, for example using a cellular data connection.

This configuration can also be used to test starters. For example, a starter can be mounted to a lift mechanism and a power supply used to provide energy to the starter motor. Further, if the power supply used to power the starter is sufficiently filtered, any ripple measured on the starter motor can be identified as being due to the starter itself and not from an external source.

The remote I/O circuitry 308, which is included in base or substation unit 12 or 102 can be used for wireless communication. For example, a wireless diagnostic interface can be provided using remote 220 shown in FIG. 12 for in-vehicle testing. In such a configuration, an operator can connect the device to the alternator (or starter) and enter the vehicle to operate the vehicle. Monitoring of the device 200 can be provided using the remote 220. Such a configuration can also be used when bench testing.

In one configuration, different types of cables 208 are stored within the tester 200 for use in connecting to different types of alternators. The system can identify particular cables for use by an operator by illuminating that cable (or compartment) as desired. An interior cabinet light may also be provided for operator convenience.

In one configuration, I/O 306 provides a communication interface for an OBDII interface for interfacing with a vehicle under test. Such an interface can be used to monitor engine RPM, control the speed of the vehicle engine, monitoring an optional clearing diagnostic trouble codes (DTC), registering or identifying a particular alternator or starter motor in the vehicle, as well as vehicle identification. By identifying a particular vehicle, information related to the service requirements for that vehicle may be identified as well as relevant testing parameters or other information.

Although element 202 has been described above as an alternator, in one configuration element 202 is a starter motor of a vehicle whereby the test circuitry can be used to operation of the starter motor. In such a configuration, the test may be performed in-vehicle without removing the starter as well as out of vehicle. As used herein, the term “alternator connector” refers to one or more of the electrical connections to an alternator including the connections which are used to provide an electrical output from the alternator as well as other connections including control connections and databus connections. Similarly, a starter motor connector includes one or more of the electrical connections used to power a starter motor, control a starter motor, or communicate with a starter motor. A capacitor start/capacitor run motor configuration for use in rotating the alternator ensures that maximum horse power is available on a standard AC outlet. Further, the term “alternator test connector” or “alternator test adapter” refers to the cable discussed herein. In one configuration, the same remote control unit can be used for performing bench testing as well as for in-vehicle testing. This allows for a consistent/uniform testing protocol to be applied in various settings for more consistent test results. Further diagnostics can be performed by connecting the adapter cable to a loop back connection ensuring that a voltage is detected or that there is continuity therebetween. In a single lead configuration, the lead can be biased, for example to six volts and connected to an alternator. Depending upon the connection, the six volt bias will be pulled high or low (for example to 12 volts or to electrical ground) when connected to the alternator thereby indicating continuity.

Maintenance of automotive vehicles with internal combustion engines is a well-known art. Procedures are known for servicing the internal combustion engine of the vehicles, the drive train, the battery (which is generally used to start the vehicle and operate the electrical devices within the vehicle), and the fuel storage and distribution system. In contrast, widespread use of electrical vehicles is a relatively new phenomenon and there is an ongoing need for improved procedures for performing maintenance on the batteries of such vehicles. For example, when a traditional vehicle with an internal combustion engine is involved in an accident, it is typical to drain the gasoline or other fuel from the vehicle for safety purposes. In contrast, when an electrical vehicle is involved in an accident, the battery pack of the vehicle may contain a relatively large amount of energy, and may even be in a fully charged state. It is not at all apparent how the battery pack can be discharged as there are many different types of battery pack, as well as various techniques used to access the packs. Further, after an accident, systems of the vehicle may not be functioning properly and may prevent maintenance from being performed on the battery pack whereby the battery pack cannot be discharged using normal procedures. In one aspect, the present invention provides an apparatus and method for safely accessing the battery pack of an electrical vehicle and discharges the battery pack. However, the present invention is not limited to this configuration and may be used generally to perform maintenance on the battery pack of an electric vehicle.

The device of the present invention can be used to "de-power" the battery pack of an electric vehicle or provide other maintenance on the battery pack including charging the battery pack. In general, this activity can be problematic for a number of reasons. First, different types of electric vehicles use different types of battery packs. The configuration, voltages, and connection to such packs vary greatly. Further, the vehicle itself typically includes "intelligence" to control the charging and discharging, as well as monitoring the status of the battery pack. Further still, some battery packs themselves include "intelligence" to control the charging and discharging of the battery pack as well as monitor the status of the battery pack. The device of the present invention is capable of interfacing with a databus of the vehicle and/or a databus of the battery pack in order to control and monitor operation of the battery pack. Again, the connection to these databuses varies greatly between vehicles. Further still, the data format and specific data varies between vehicles. The problem of performing maintenance on a battery pack is exacerbated when a vehicle has been in an accident. The battery pack may be physically difficult to access and it may be difficult to obtain electrical connections to the battery pack and/or vehicle for discharging the battery as well as for communicating over the vehicle or battery pack databus. Depending on the damage which occurs during an accident, the battery pack may be isolated for safety reasons. This isolation presents another challenge in accessing the battery pack. Further, the circuitry of the maintenance device must be capable of operating with the relatively high DC voltages, for example 400 Volts, which are present in electrical vehicle battery packs. These high voltages must be isolated from the logic and control circuitry of the device as well as the operator. Additionally, in one aspect, the device also includes a charger function for use in charging some or all of the cells of a battery pack in order to place the battery pack into service.

Figure 14:
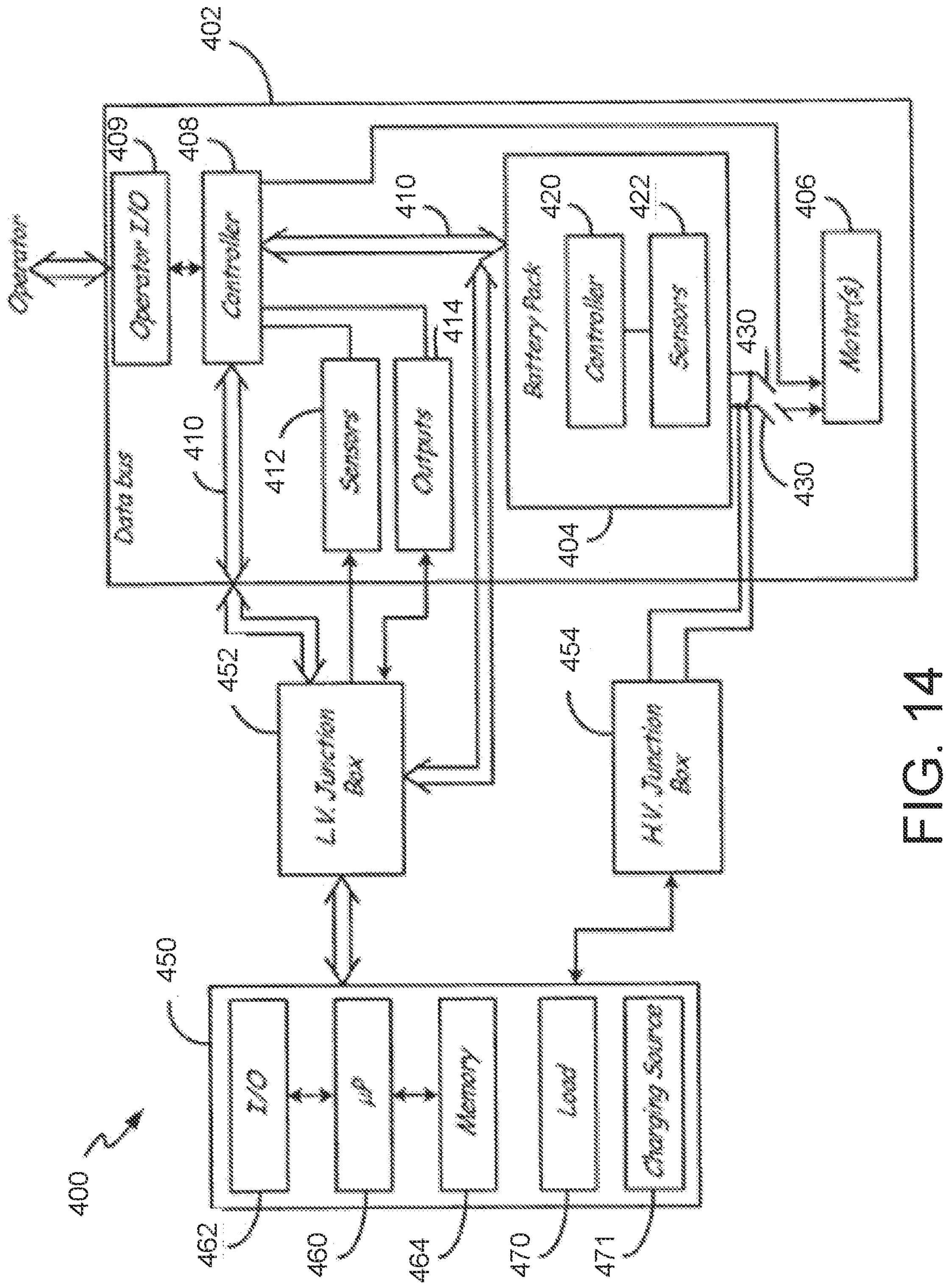
FIG. 14 is a simplified block diagram of an exemplary battery maintenance device coupled to an electric vehicle under one embodiment.

FIG. 14 is a simplified block diagram showing battery pack maintenance device 400 coupled to an electric vehicle 402 under one embodiment. Electric vehicles typically includes "contactors" which are electrically operated relays (switches) used to selectively couple the high voltage from the battery pack to the powerful electric motors used in the drive train of the vehicle. In order to access the battery pack from a location on the vehicle, it is necessary for these contactors to be closed to complete the electrical circuit. However, in an accident, the controlling electronics of the vehicle and/or battery pack will typically disconnect (open) the contactors for safety purposes in order to isolate the battery pack from the vehicle. Thus, in one embodiment, the controller communicates with the electrical vehicle or battery pack, or directly with the contactors, to cause the contactors to close and thereby provide access to the high voltage of the battery pack. When communicating with the control system of the vehicle, the device of the present invention can provide information to the vehicle system indicating that it is appropriate for the contactors to close. Thus, failure indications or other errors, including errors associated with a vehicle being in an accident, must be suppressed. Instead, information is provided to the vehicle system by the battery pack maintenance device which indicates that it is appropriate for the contactors to be closed.

The vehicle 402 is illustrated in a simple block diagram and includes a battery pack 404 used to power the vehicle 402 including providing power to motor(s) 406 of the vehicle. The vehicle 402 includes a vehicle controller 408 coupled to a databus 410 of the vehicle. The controller 408 receives information regarding operation of the vehicle through sensors 412 and controls operation of the vehicle through outputs 414. Further, the battery pack 404 is illustrated as including its own optional controller 420 which monitors operation of the battery pack 404 using battery pack sensors 422.

During operation, the electric vehicle 402 is controlled by the controller 408, for example, based upon input from a driver through operator I/O 409. Operator I/O 409 can comprise, for example, a foot accelerator input, a brake input, an input indicating an position of a steering wheel, information related to a desired gearing ratio for a drive train, outputs related to operation of the vehicle such as speed, charging information, amount of energy which remains in the battery pack 404, diagnostic information, etc. The controller 408 can control operation of the electric motors 406 to propel the vehicle, as well as monitor and control other systems of the vehicle 402. The controller 420 of battery pack 404 can be used to monitor the operation of the battery pack 404. For example, the sensors 422 may include temperature sensors configured to disconnect the batteries of the battery pack if a threshold temperature is exceeded. Other example sensors include current or voltage sensors, which can be used to monitor charge of the battery pack 404. FIG. 11 also illustrates contactor relays 430 of the vehicle 402 which are used to selectively decouple the battery pack 404 from systems of the vehicle 402 as discussed above. For example, the controller 408 can provide a signal to cause the contactors 430 to close thereby connecting the battery pack 404 to electrical systems of the vehicle 402.

Battery pack maintenance device 400 includes a main unit 450 which couples to the vehicle through a low voltage junction box 452 and a high voltage junction box 454. These junction boxes 452, 454 are optional and other techniques may be used for coupling the maintenance device 400 to the vehicle 402. Maintenance device 400 includes a microprocessor 460, I/O circuitry 462 and memory 464 which contains, for example, programming instructions for use by microprocessor 460. The I/O circuitry 462 can be used to both user input, output, remote input, output as well as input and output with vehicle 402. The maintenance device 400 includes a controllable load 470 for use in discharging the battery pack 404. An optional charging source 471 is also provided and can be used in situations in which it is desirable to charge the battery pack 404, for example, to perform maintenance on the battery pack 404. The high voltage junction box 454 is used to provide an electrical connection between terminals of the battery pack 404 and the maintenance device main unit 450. Using this connection, batteries within the battery pack 404 can be discharged using the load 470 or charged using the charging source 471. Similarly, low voltage junction box 452 is used by battery pack maintenance device 400 to couple to low voltage systems of the electric vehicle 402. Such systems include the databus 410 of the vehicle, sensors 412, outputs 414, etc. Through this connection, as discussed above, the maintenance device 400 can gather information regarding the condition of systems within the vehicle 402 including the battery pack 404, and can control operation of systems within the vehicle 402. Similarly, through this connection, the outputs from sensors 412 can be changed or altered whereby altered sensor outputs can be provided to controller 408. This can be used, for example, to cause controller 408 to receive information indicating that the vehicle 402 or battery pack 404 is in a condition which is different than from what the sensors 412 are actually sensing. For example, this connection can be used to cause the contactors 430 to close to thereby provide an electrical connection to the battery pack 404. Further, the low voltage junction box 452 can be used to couple to the controller 420 and/or sensors 422 of the battery pack 404. The junction boxes 452, 454 couple to vehicle 402 through the use of an appropriate connector. The particular connector which is used can be selected based upon the specific type of vehicle 402 and the type of connections which are available to an operator. For example, OBD II connection can be used to couple to the databus 410 of the vehicle. Other plugs or adapters may be used to couple to sensors 412 or outputs 414. A particularly style plug may be available for coupling the high voltage junction box 454 to the battery pack 404. If there are no contactors which are available or if they cannot be accessed or are unresponsive, in one configuration clips or other types of clamp on or selectively connectable contactors can be used to perform the coupling.

Figure 15:
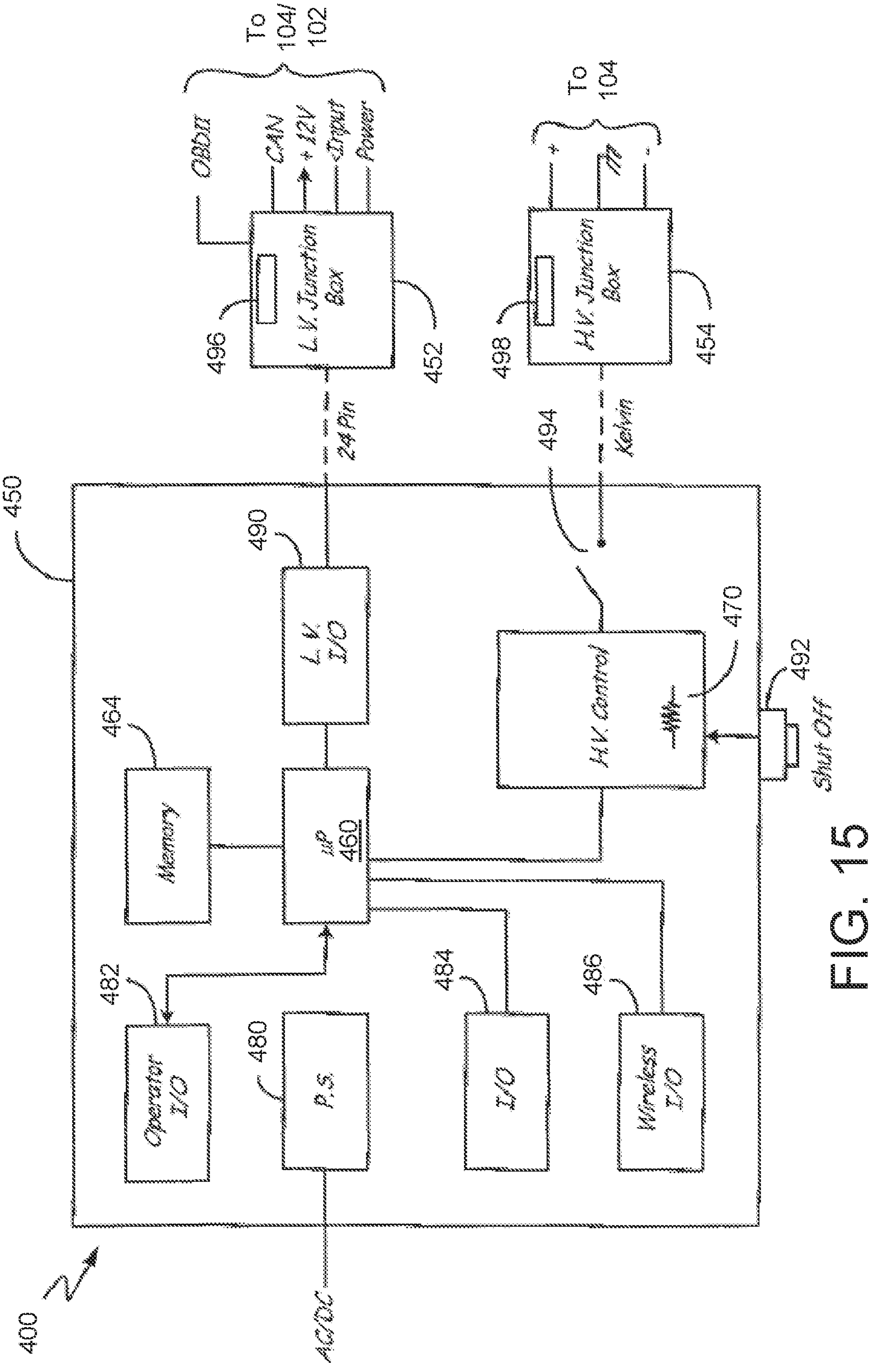
FIG. 15 is a more detailed block diagram of the exemplary battery maintenance device of FIG. 14.

FIG. 15 is a simplified block diagram of battery pack maintenance device 400 in accordance with an embodiment. The device includes microprocessor 460 which operates in accordance with instructions stored in a memory 464. While a power supply 480 is used to provide power to the device and can be coupled to an AC power source, such as a wall outlet or other high power source, for use in charging the battery pack 404 of the vehicle 402, base or substation unit 12 or 102 of FIGS. 1-3 provides this functionality.

Low voltage input/output circuitry 490 is provided for use in communicating with the databus of the vehicle 408, the databus of the battery pack 404, or receiving other inputs or providing outputs to the vehicle 402. Examples include the CAN communication protocol, OBDII, etc. Additionally, contact closures or other voltage inputs or outputs can be applied to the vehicle using the low voltage I/O circuitry 490. FIG. 12 also illustrates an operator shut off switch 492 which can be activated to immediately disconnect the high voltage control 470 from the battery 404 using disconnect switch 494. Other circuit configurations can be used to implement this shut off capability. This configuration allows an operator to perform an emergency shut off or otherwise immediately disconnect the device 400 from the battery if desired.

The low voltage junction box 452 also provides an optional power output. This power can be used, for example, to power components of the vehicle 402 if the vehicle 402 has lost power. This can be useful, for example, to provide power to the controller 408 of the vehicle 402 such that information may be gathered from the vehicle and various components of the vehicle can be controlled such as the contactors 430.

In one configuration, the connection between the high voltage control circuitry 470 and the high voltage junction box 454 is through Kelvin type connectors. This can be used to eliminate the voltage drop which occurs when large currents are drawn through wiring thereby provide more accurate voltage measurements. The actual connection between the junction box 454 and the battery pack 404 need not be through a Kelvin connection if the distance between the junction box 454 and the battery pack 404 is sufficiently short for the voltage drop across the connection leads to be negligible. Isolation circuitry such as fuses may be provided in the junction box 454 to prevent the application of a high voltage or current to the maintenance device 400 and thereby protect circuitry in the device. Similarly, the low voltage junction box 452 and/or the low voltage I/O 490 may include isolation circuitry such as optical isolators, inductors to provide inductive coupling, or other techniques. The low voltage junction box 452 may also include an optional user output and/or input 496. For example, this may be a display which can be observed by an operator. An example display includes an LED display, or individual LEDs, which provides an indication to the operator regarding the functioning of the low voltage junction box, the vehicle, or the battery pack. This can be used to visually inform an operator regarding the various functions being performed by the low voltage junction box, voltages detected by the low voltage junction box. A visual output and/or input 498 can be provided on the high voltage junction box 454.

The appropriate high voltage junction box 454 and low voltage junction box 452 can be selected based upon the particular vehicle 402 or battery pack 404 being inspected. Similarly, the junction boxes 452, 454 can be selected based upon the types of connections which are available in a particular situation. For example, if the vehicle his damaged, it may be impossible to couple to the battery pack 404 through available connectors. Instead, a junction box 454 can be employed which includes connection probes which can be coupled directly to the battery pack 404. Further still, if such a connection is not available or is damaged, connectors can be provided for coupling to individual cells or batteries within the battery pack 404.

The use of the low voltage and high voltage junction boxes 452, 454 are advantageous for a number of reasons. The junction boxes can be used to provide a standardized connection to the circuitry of the maintenance device 400. From a junction box 452, 454, specialized connectors can be provided for use with different types of vehicles and/or battery packs. Similarly, different types of junction boxes 452, 454 can be utilized for different vehicles and/or battery packs. The junction boxes 452, 454 allow a single set cable connection to extend between the device 400 and a remote location. This provides better cable management, ease of use, and increased accuracy.

In addition to use as a load for discharging the battery, the high voltage control circuitry may also optionally include a charging for use in charging the battery.

Figure 16:
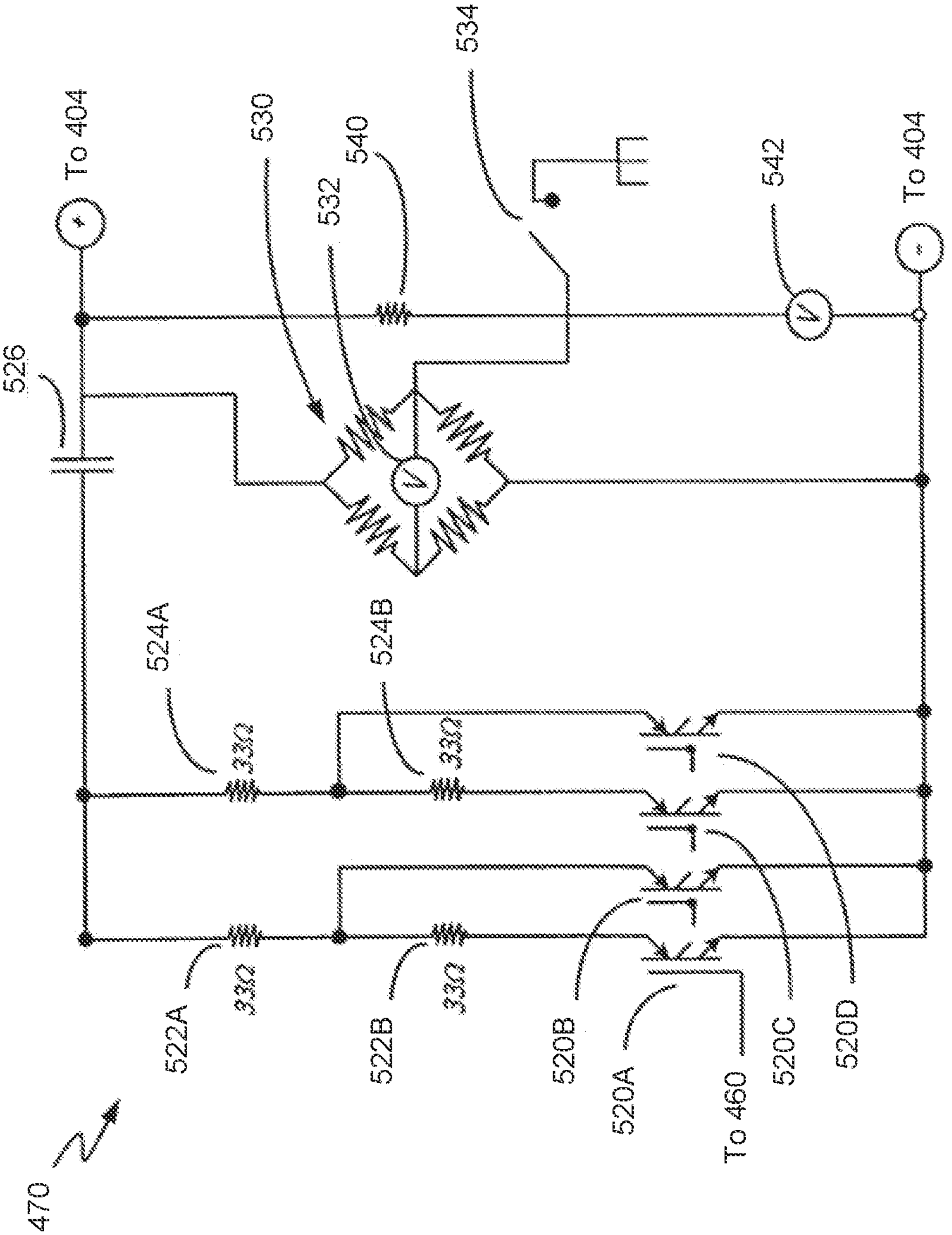
FIG. 16 is an electrical schematic diagram of a controllable load for use in the exemplary battery maintenance device of FIG. 15.

FIG. 16 is a schematic diagram of a controllable load 470. In FIG. 16, a number of isolated gate bipolar transistors (IGBT) 520A, 520B, 520C, and 520D are shown and controlled by a gate connection to microprocessor 460. The IGBTs 520A-D connect to load resistors 522A, 522B, 524A, and 524B. As illustrated in FIG. 16, the four load resistors are 33 OHM resistors. Using the transistors 520A-D, the resistors 522A, B and 524A, B can be coupled in various series-parallel configurations in order to apply different loads to the battery pack 404. In this way, the load applied to the battery pack 404 is controllable by microprocessor 460. In one aspect, the present invention includes isolated gate bipolar transistors (IGBT) to selectively couple loads to the battery pack 404 for discharging the pack. An IGBT is a transistor configured with four semiconducting layers arranged as PNPN. A metal oxide semiconductor is arranged to provide a gate. The configuration provides a transistor which is controlled easily in a manner similar to a field effect transistor but which is also capable of switching large currents like a bipolar transistor.

When the device 400 is coupled to a vehicle 402 which has been in an accident, the device can perform various tests on the vehicle 402 to determine the condition of the vehicle and the battery. For example, in one aspect, the device 400 detects a leakage between the positive and negative terminals of the battery pack 402 and the ground or chassis of the vehicle 402. For example, a wheat stone bridge circuit 530 can be used between the positive and negative terminals of the battery pack 404 with one of the legs of the bridge connected to ground.

During discharging of the vehicle battery pack 404, data can be collected from the battery pack. For example, battery packs typically include sensors 422 such as voltage, current and temperature sensors arranged to collect data from various locations within the battery pack. This information can be obtained by the maintenance device 400 via the coupling to the databus 410. During discharge, any abnormal parameters measured by the sensors can be used to control the discharge. For example, if the battery pack 404 is experiencing excessive heating, the discharge rate can be reduced until the battery temperature returns to an acceptable level. If any of the internal temperature sensors of the battery pack are not functioning, an external battery pack temperature sensor can be used to detect the temperature of the battery pack. Similarly, if cells within the pack are experiencing an abnormally high current discharge, the discharge rate can be reduced. Further still, if such data cannot be obtained because the sensors are damages or the databus is damaged or inaccessible, the maintenance device 400 can automatically enter a slow/safe discharge state to ensure that the battery is not damaged.

When placing a battery pack 404 into service, the maintenance device 400 can identify individual cells or batteries within the pack 404 which are more or less charged than other cells. Thus, the individual cells or batteries within a pack can be balanced whereby they all have substantially the same charge capacity and/or state of charge as the other cells or batteries within the pack.

In another aspect of the present invention, the maintenance device 400 is capable of providing a "jump start" to a hybrid electric vehicle 402. For example, if the internal combustion engine of a hybrid electric vehicle is started using power directly from the battery pack and if the charge of the battery pack 404 is too low, there is insufficient energy available to start the engine. The maintenance device 400 of the present invention can be used to provide sufficient power to a starter motor of the internal combustion engine for starting the engine. Once the internal combustion engine is running, the engine itself is used to charge the battery pack 404.

In FIG. 16, a voltage sensor 532 is connected across the wheat stone bridge 530. Further, the bridge is optionally connected to electrical ground through switch 534. Any voltage detected by voltage sensor 532 across the bridge 530 is an indication that there is a current leak between the positive and/or negative terminals of the battery pack 404 and the electrical ground or chassis of the vehicle 402. The voltage sensor 532 can provide an output to microprocessor 430 and used to alert an operator of a potentially dangerous situation and indicate that the battery pack 404 must be disconnected from the vehicle 402 before further maintenance is performed.

FIG. 16 also illustrates a relay 526 which is used to isolate the load resistances 522/524 from the battery pack until a discharge is commanded by the microprocessor 460. The voltage across the battery pack 404 can be measured using a voltage sensor 542 connected in series with a resistance 540. The output from sensor 542 is provided to microprocessor 460 for use in performing maintenance in the battery pack 404.

Figure 17:
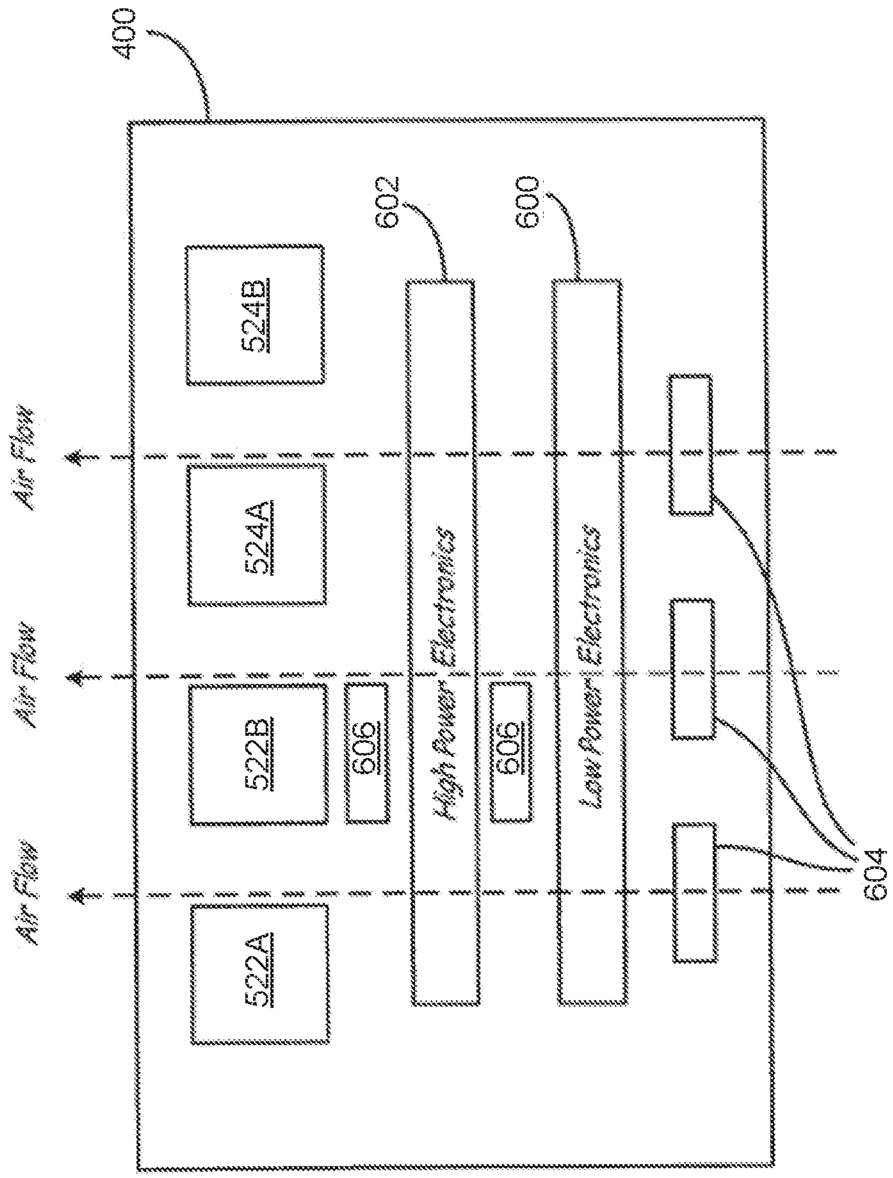
FIG. 17 is a diagram which illustrates one example arrangement of components within an exemplary battery maintenance device to promote cooling of such components.

During operation, the components of the device 400 may experience a great deal of heating. An air flow cooling system can be used to dissipate the heat. FIG. 17 shows one such configuration. As illustrated in FIG. 17, the air flow moves from the low power electronics 600, passed the high power electronics 602 and over the load resistors 522A, B and 524A, B. The air flow then leaves the housing of the device 400. In FIG. 17, the air flow is controlled by fans 604. The fans 604 can be controlled using microprocessor 460 whereby their speed can be adjusted as needed based upon measurements from temperature sensors 606 which can be placed at various locations within the housing of device 400. In this configuration, hot air generated by the load resistance is immediately blown out of the housing rather than past any components.

Some electrical vehicles include what is referred to as a "pre-charge contactor." The pre-charge contactor can be used to charge capacitances of the vehicle at a slow and controlled rate prior to switching in the main contactor 430 shown in FIG. 14. This prevents excessive current discharge from the battery pack when the main contactor is activated and the pack is directly coupled to the loads of the vehicle including the traction module of the vehicle which is used to control electric motors of the vehicle.

In another aspect, some or all of the information obtained during testing and discharge of a battery pack 404 is retrieved and stored, for example in the memory 464 shown in FIG. 15, for subsequent access. This information can be offloaded to another device, for example a USB drive or the like, or transmitted over a network connection. This can be particularly useful to examine information retrieved after a vehicle has experienced an accident. The information can be information which is downloaded from the controller 408 of the vehicle 402 and may also be information related to how the vehicle battery pack 404 was discharged and removed of service.

In another aspect, more than one maintenance device 400 can be coupled to a battery pack 404 and the multiple devices can be configured to work in tandem. More specifically, the devices 400 can be coupled using the input/output circuitry 484 shown in FIG. 15 whereby one of the devices 400 operates as a master and one or more other devices 400 operate as slaves under the control of the master device. This arrangement can be used to increase the rate at which a battery pack 404 is discharged. In such a configuration, a bridgeable power supply may also be employed.

Figure 18:
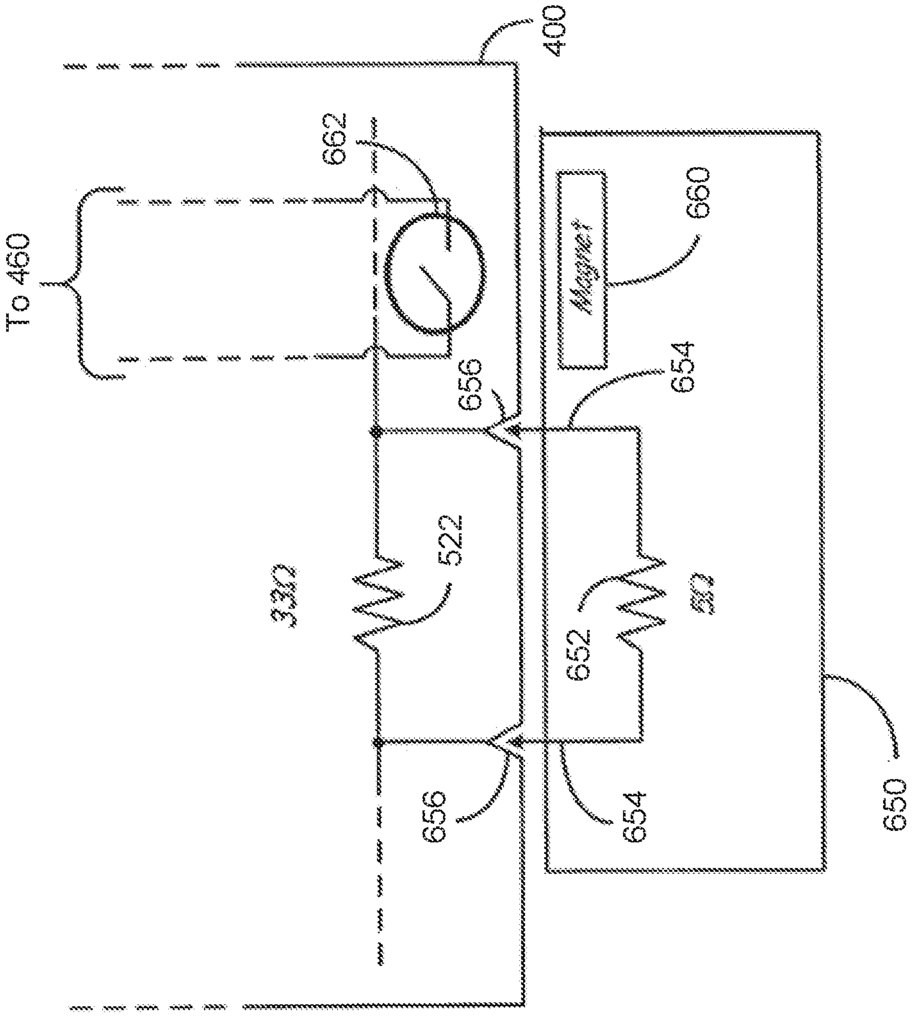
FIG. 18 is a diagram of a plug having an additional load resistance.

FIG. 18 is a simplified diagram showing a removable plug 650 which can be selectively coupled to battery pack maintenance device 400. Removable plug 650 includes a 5 OHM resistor 652 configured to connect in parallel through connectors 654 and 656. Removable plug 650 includes a magnet 660 configured to actuate a reed switch 662. Reed switch 662 connects to microprocessor 460 whereby microprocessor 460 can sense the presence of the plug 650. When plug 650 is coupled to device 400, the resistance of one or more of the 33 OHM resistors 522A,B and 524 A,B can be changed because the resistor is in series with the 5 OHM resistor yielding a resistance of about 4.3 OHMs. However, any configuration desired can be provided. This allows the device 400 to apply a smaller resistance to the battery pack 404 thereby increasing the discharge rate if desired. For example, a particular battery pack may be of a sufficiently low voltage to allow for an increased current draw to thereby increase the rate at which the battery pack 404 is discharged. Using reed switch 662, the microprocessor 460 is able to detect the presence of the plug 650 whereby calculations which rely on the value of applied load resistance can be compensated appropriately. Although only a single resistor 652 is shown, the plug 650 may include any number of resistors to be placed in parallel with load resistances in the device 400. Preferably plug 650 includes a cooling mechanism to reduce the heating of resistor 652. For example, the plug 650 may include metal or other heat conducting fins or the like. A fan may also be employed. The fan may be the same cooling fan used in device 400 or, plug 650 may optionally include its own fan. In another embodiment, the alternative resistance values are located within the main unit, and are switched into circuit using the removable plug.

Figure 19:
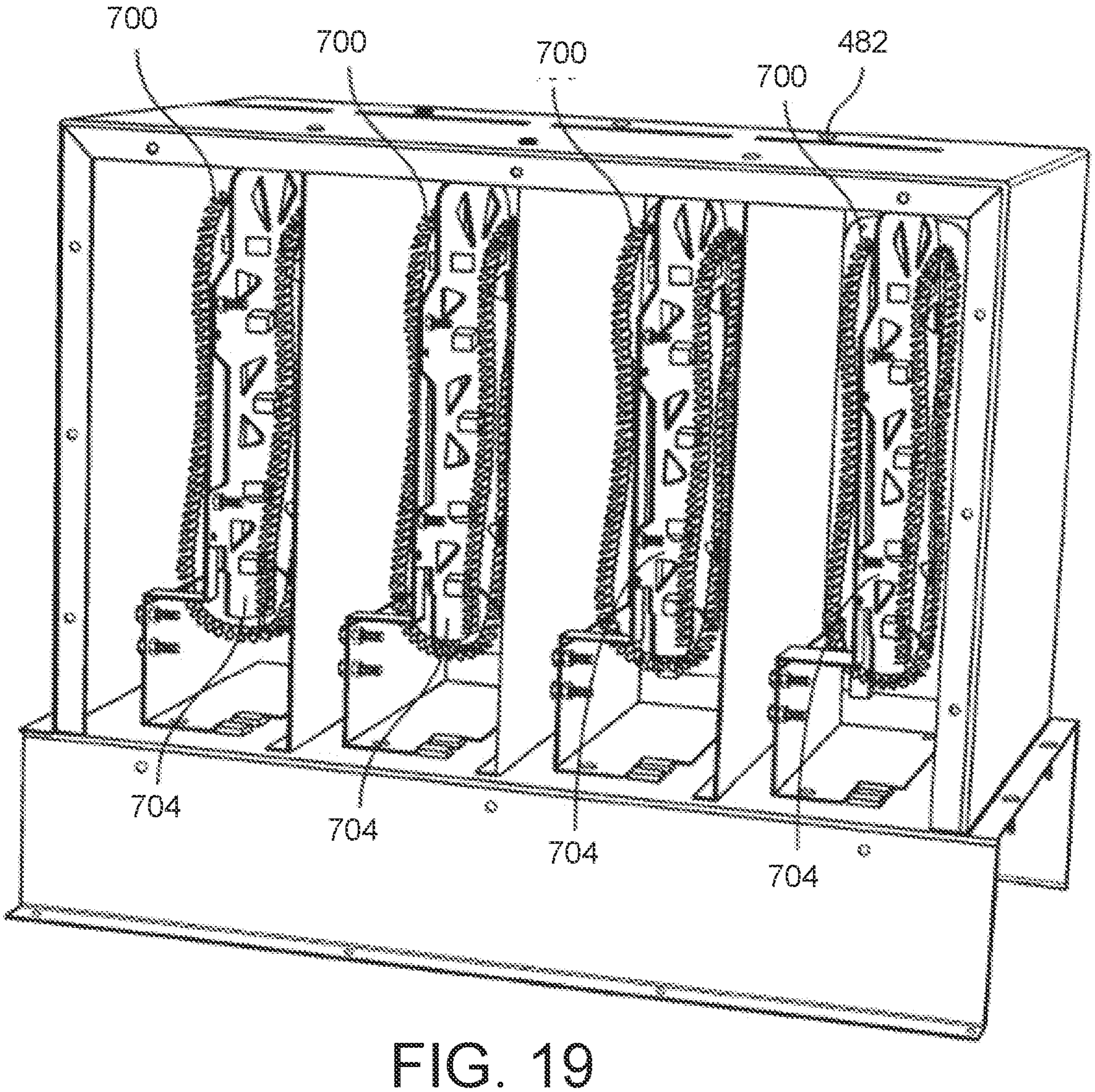
FIG. 19 is a perspective view of a housing having resistive loading coils in accordance with one embodiment.

FIG. 19 is a perspective view of another example embodiment of a controllable load 470 illustrated in a housing. In the configuration of FIG. 19, resistive elements are provided using a number of resistive coils 700. In one example embodiment, these resistive coils can be the type of coils used in consumer applications such as electric clothing dryers. For example, one such coil is rated at approximately 5.3 KW at 240 volts. Note that if the rated voltage is exceeded, the coil will melt and become an open circuit. Further, it is also preferable that the coils 700 have resistances which are similar. The coils 700 are carried on supports 704 preferably made of an electric insulator capable of handling high temperatures. To assist in heat dissipation, an air flow can be provided across the coils 700 as shown in FIG. 19.

Figure 20:
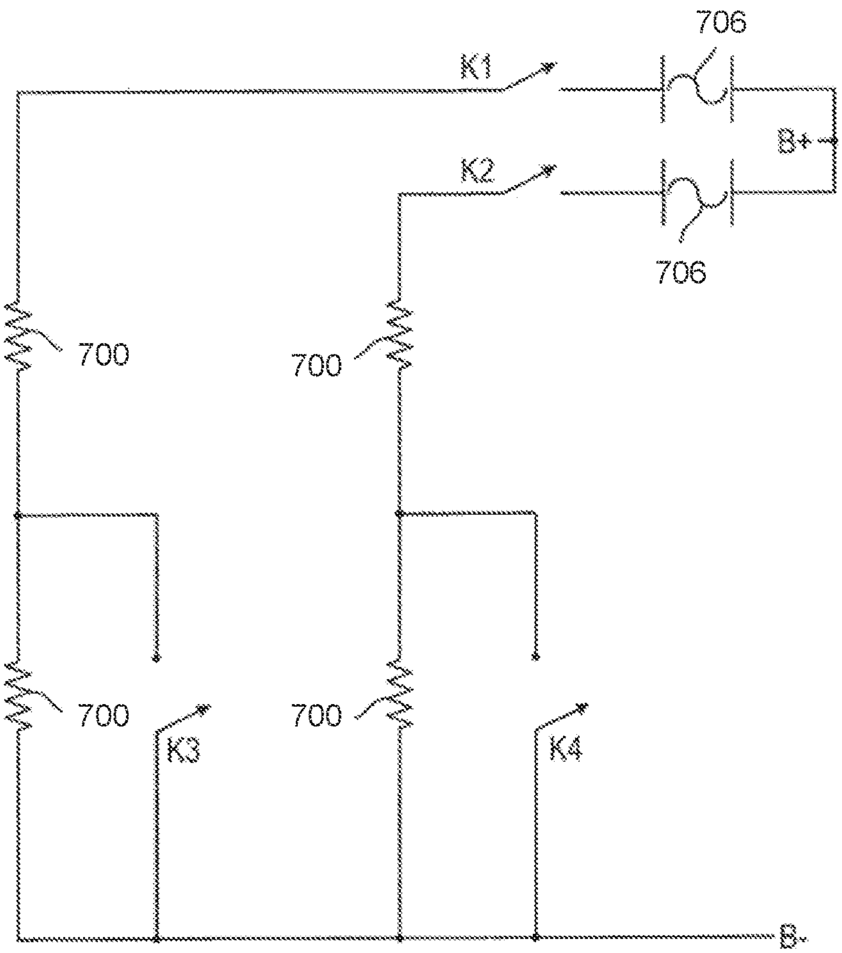
FIG. 20 is a schematic diagram of a controllable resistance load.
Figure 21:
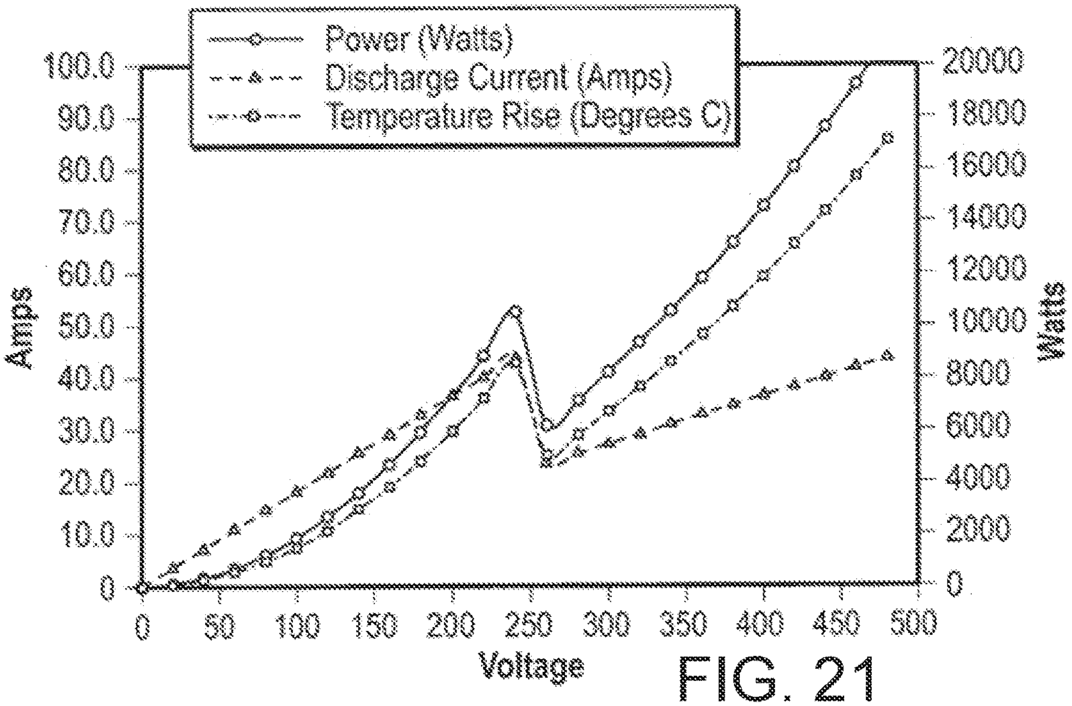
FIG. 21 is a graph showing power, discharge current and temperature during battery discharge.

FIG. 20 is a simplified schematic diagram of another example embodiment of controllable load 470. In the configuration of FIG. 20, the four coils 700 illustrated in FIG. 19 are electrically connected in a series/parallel configuration. In this configuration, switches K1, K2, K3 and K4 are provided for controlling the resistance provided by controllable load 470. These switches can be any type of switch including relays or transistor switches. In one configuration, the switches are manual switches. Switches K1 and K2 control two parallel legs of the circuit while switches K3 and K4 control the amount of resistance in series in each leg. In this configuration, a maximum discharge capability of 20 KW is provided if both switches K1 and K2 are closed and switches K3 and K4 are open. The B+ and B− connections are used for coupling to the storage battery and fusible links 706 are provided for safety. In one example configuration, if the voltage across terminals B+ and B− drops below 240 volts DC, switch K3 and/or switch K4 can then be closed to reduce the resistance applied to battery 404 and optimize the loading of the battery. FIG. 21 is a graph showing the loading performance of such an arrangement. As illustrated in FIG. 21, the step change occurs when the resistive load provided by controllable load 100 is decreased, for example, by activating switch K2

As mentioned above, the fans illustrated in FIG. 17 can be used to provide an air flow across the coils 700. In one configuration, all of the fans control circuits and relays may be operated by 12 volt DC and can be powered, for example, by an auxiliary battery or a “cigarette lighter” output from a vehicle such as a tow truck. A double insulation technique can be used proximate the load coils such that any electrical fault, for example a heater coil failure, cannot be conducted to a location outside of the housing 702. Optional temperature safety sensors 606 shown in FIG. 17 can be used. The temperature sensors 606 can be provided on both the inlet and the outlet of each heater coil and can be used to detect fan failure or blocked air flow. This configuration can also be used to detect the amount that the air is heated by the coil. In another example configuration, fusible links 604 may provide hard wired temperature cutout switches to prevent overheating. In such a configuration, when a temperature threshold is reached, the switch will open. Data obtained during discharge can be logged to a memory such as memory 464 such as a local flash drive or other local storage device. In another configuration, the logged data is sent to a remote location such as cloud storage for analysis. Such records can be of significance for warranty or insurance purposes.

In one configuration, the voltage sensor 532 is used to detect leakage currents in the battery undergoing discharge. The device can also monitor battery cell voltages and temperatures to ensure that unsafe conditions are not being created during discharge.

The input/output circuitry 490 can be used to connect to a databus of the vehicle, for example, through an OBDII connection in order to collect information such as VIN, software and hardware version numbers, etc. The device can communicate with the battery ECU (Electronic Control Unit) using any appropriate protocol including CAN, LIN, or others, in order to obtain specific battery information and discharge protocols. The device can be connected as a slave unit to another piece of shop equipment either using a hardwire connection or a wireless connection such as Bluetooth or Wi-Fi. Reverse polarity protection as well as overvoltage protection can be provided. Other safety techniques for electrical potential, temperature and axis points can be fully interlocked to prevent operation of the unit. In one configuration, the input/output 484 can include a barcode scanner which can then be used to capture specific information such as battery type or serial number as well as vehicle identification number, etc. In another example configuration, input/output circuitry 484 can include a remote temperature sensor that can be electrically coupled to the discharger to report battery temperature. This is useful when internal battery temperature sensors are damaged or inoperative. The devices are scalable such that multiple controllable loads 400 can be connected in parallel. Relay contacts can also be provided and available externally to control various circuits on the battery pack undergoing discharge. Additional voltage sensing connections such as those provided by junction box 152 can be used to monitor various circuits on the battery pack.

Another example configuration includes a high voltage DC to DC converter such as power supply 480 shown in FIG. 15. In such a configuration, the high voltage output from the battery pack can be converted to a lower DC voltage for use in powering the device.

As discussed above, in some configurations the present invention can be arranged to measure a dynamic parameter of the battery pack. In such a configuration, a forcing function is applied to the battery pack and a dynamic parameter such as dynamic conductance, resistance, admittance, etc. can be determined based upon a change in the voltage across the battery pack and the current flowing through the battery pack. The forcing function can be any type of function which has a time varying aspect including an AC signal or a transient signal.

In one aspect, the maintenance device can be configured to "balance" individual cells within the battery pack. The balancing can be performed by selected cells or individual batteries within the pack which have similar storage capacity and state of charge. The charging feature of the device can be used to increase the charge of a cell or battery to that of other cells or batteries. Similarly, the maintenance device can be used to discharge individual cells or batteries to a level similar to that of other cells or batteries within the pack.

In another aspect, the device of FIG. 15 includes an ambient temperature sensor. The microprocessor can use information from the ambient temperature sensor in determining how the battery pack should be discharged. For example, if the ambient temperature is high, the discharge rate can be reduced.

During discharge of the battery pack, the discharge profile can be monitored to ensure proper operation. For example, if the voltage of the battery suddenly drops, this can be an indication that a component within the battery has failed or a short circuit has occurred.

Different types of junction boxes and connection cables can be used based upon the particular type of vehicle and battery pack under maintenance. The microprocessor can provide information to the operator prompting the operator to use the appropriate junction box or cable. This can be based upon the operator inputting the vehicle identification number (VIN) to the microprocessor, or other identifying information including an identification number associated with the battery pack. During discharging of the battery pack, the microprocessor can also provide information to the operator which indicates the time remaining to complete the discharge. The microprocessor 460 can also detect if the correct junction box and cable have been coupled to the device and to the battery pack for the particular battery pack and vehicle under maintenance. Information can be provided to the operator if the wrong cabling or junction box has been employed.

The device of the present invention can be used with battery packs which have been removed from a vehicle as well as individual batteries, or groups of batteries, within a pack. For example, a battery pack typically includes a battery connector assembly which is used by the vehicle 402 to couple to the battery pack 404. However, when the battery pack 404 is removed from the vehicle 402, the device 400 can directly couple to this battery connector assembly and thereby charge or discharge the battery pack, perform tests on the battery pack, interact with devices on the battery pack including sensors, controllers, etc. As discussed above, the device 400 can include multiple connectors for use in connecting the low voltage junction box 452 and/or the high voltage junction box 454 to the vehicle 402 and/or battery pack 404. This allows the device 400 to easily be modified to interact with different types of batteries or vehicles by simply selecting the appropriate connector. In one configuration, the connectors include some type of identifier which can be read by the device 400 whereby the microprocessor 460 and device 400 can receive information to thereby identify the type of connector in use. This allows the microprocessor 400 to know what types of information or tests may be available through the various connectors. In another example, the operator uses operator I/O 482 shown in FIG. 12 to input information to the microprocessor 460 related to the type of connector(s) being used. In another example embodiment, the microprocessor 460 may receive information which identifies the type of vehicle or battery on which maintenance is being performed. This information can be input by an operator using the operator I/O 482, or through some other means such as by communicating with the databus of the vehicle, scanning a barcode or other type of input, etc. Based upon this information, the microprocessor can provide an output to the operator using operator I/O 482 which informs the operator which type of interconnect cable should be used to couple the low voltage junction box 452 and/or the high voltage junction box 454 to the vehicle and/or battery pack.

The operator I/O 482 may include a display along with a keypad input or touchscreen. The input may take various formats, for example, a menu driven format in which an operator moves through a series of menus selecting various options and configurations. Similarly, the operator I/O 482 can be used by the microprocessor 460 to step the operator through a maintenance procedure. In one configuration, the memory 464 is configured to receive a user identification which identifies the operator using the equipment. This can be input, for example, through operator I/O 482 and allows information related to the maintenance being performed to be associated with information which identifies a particular operator. Additional information that can be associated with the maintenance data include tests performed on the vehicle and/or battery, logging information, steps performed in accordance with the maintenance, date and time information, geographical location information, environmental information including temperature, test conditions, etc., along with any other desired information. This information can be stored in memory 464 for concurrent or subsequent transmission to another device or location for further analysis. Memory 164 can also store program instructions, battery parameters, vehicle parameters, testing or maintenance information or procedures, as well as other information. These programming instructions can be updated, for example, using I/O 484 or 486, through an USB flash drive, SD card or other memory device, or through some other means as desired. This allows the device 400 to be modified, for example, if new types of vehicles or battery pack configurations are released, if new testing or maintenance procedures are desired, etc.

Many techniques have been developed for testing the battery and related systems of the vehicle. Example techniques that have been pioneered by Dr. Keith S. Champlin and Midtronics, Inc. are shown and described in U.S. Pat. No. 3,873,911, issued Mar. 25, 1975, to Champlin; U.S. Pat. No. 3,909,708, issued Sep. 30, 1975, to Champlin; U.S. Pat. No. 4,816,768, issued Mar. 28, 1989, to Champlin; U.S. Pat. No. 4,825,170, issued Apr. 25, 1989, to Champlin; U.S. Pat. No. 4,881,038, issued Nov. 14, 1989, to Champlin; U.S. Pat. No. 4,912,416, issued Mar. 27, 1990, to Champlin; U.S. Pat. No. 5,140,269, issued Aug. 18, 1992, to Champlin; U.S. Pat. No. 5,343,380, issued Aug. 30, 1994; U.S. Pat. No. 5,572, 136, issued Nov. 5, 1996; U.S. Pat. No. 5,574,355, issued Nov. 12, 1996; U.S. Pat. No. 5,583,416, issued Dec. 10, 1996; U.S. Pat. No. 5,585,728, issued Dec. 17, 1996; U.S. Pat. No. 5,589,757, issued Dec. 31, 1996; U.S. Pat. No. 5,592,093, issued Jan. 7, 1997; U.S. Pat. No. 5,598,098, issued Jan. 28, 1997; U.S. Pat. No. 5,656,920, issued Aug. 12, 1997; U.S. Pat. No. 5,757,192, issued May 26, 1998; U.S. Pat. No. 5,821,756, issued Oct. 13, 1998; U.S. Pat. No. 5,831,435, issued Nov. 3, 1998; U.S. Pat. No. 5,871,858, issued Feb. 16, 1999; U.S. Pat. No. 5,914,605, issued Jun. 22, 1999; U.S. Pat. No. 5,945,829, issued Aug. 31, 1999; U.S. Pat. No. 6,002,238, issued Dec. 14, 1999; U.S. Pat. No. 6,037,751, issued Mar. 14, 2000; U.S. Pat. No. 6,037,777, issued Mar. 14, 2000; U.S. Pat. No. 6,051,976, issued Apr. 18, 2000; U.S. Pat. No. 6,081,098, issued Jun. 27, 2000; U.S. Pat. No. 6,091,245, issued Jul. 18, 2000; U.S. Pat. No. 6,104,167, issued Aug. 15, 2000; U.S. Pat. No. 6,137,269, issued Oct. 24, 2000; U.S. Pat. No. 6,163,156, issued Dec. 19, 2000; U.S. Pat. No. 6,172,483, issued Jan. 9, 2001; U.S. Pat. No. 6,172,505, issued Jan. 9, 2001; U.S. Pat. No. 6,222,369, issued Apr. 24, 2001; U.S. Pat. No. 6,225,808, issued May 1, 2001; U.S. Pat. No. 6,249,124, issued Jun. 19, 2001; U.S. Pat. No. 6,259,254, issued Jul. 10, 2001; U.S. Pat. No. 6,262,563, issued Jul. 17, 2001; U.S. Pat. No. 6,294,896, issued Sep. 25, 2001; U.S. Pat. No. 6,294,897, issued Sep. 25, 2001; U.S. Pat. No 6,304,087, issued Oct. 16, 2001; U.S. Pat. No. 6,310,481, issued Oct. 30, 2001; U.S. Pat. No. 6,313,607, issued Nov. 6, 2001; U.S. Pat. No. 6,313,608, issued Nov. 6, 2001; U.S. Pat. No. 6,316,914, issued Nov. 13, 2001; U.S. Pat. No. 6,323,650, issued Nov. 27, 2001; U.S. Pat. No. 6,329,793, issued Dec. 11, 2001; U.S. Pat. No. 6,331,762, issued Dec. 18, 2001; U.S. Pat. No. 6,332,113, issued Dec. 18, 2001; U.S. Pat. No. 6,351,102, issued Feb. 26, 2002; U.S. Pat. No. 6,359,441, issued Mar. 19, 2002; U.S. Pat. No. 6,363,303, issued Mar. 26, 2002; U.S. Pat. No. 6,377,031, issued Apr. 23, 2002; U.S. Pat. No. 6,392,414, issued May 21, 2002; U.S. Pat. No. 6,417,669, issued Jul. 9, 2002; U.S. Pat. No. 6,424,158, issued Jul. 23, 2002; U.S. Pat. No. 6,441,585, issued Aug. 17, 2002; U.S. Pat. No. 6,437,957, issued Aug. 20, 2002; U.S. Pat. No. 6,445,158, issued Sep. 3, 2002; U.S. Pat. Nos. 6,456,045; 6,466,025, issued Oct. 15, 2002; U.S. Pat. No. 6,465,908, issued Oct. 15, 2002; U.S. Pat. No. 6,466,026, issued Oct. 15, 2002; U.S. Pat. No. 6,469,511, issued Nov. 22, 2002; U.S. Pat. No. 6,495,990, issued Dec. 17, 2002; U.S. Pat. No. 6,497,209, issued Dec. 24, 2002; U.S. Pat. No. 6,507,196, issued Jan. 14, 2003; U.S. Pat. No. 6,534,993; issued Mar. 18, 2003; U.S. Pat. No. 6,544,078, issued Apr. 8, 2003; U.S. Pat. No. 6,556,019, issued Apr. 29, 2003; U.S. Pat. No. 6,566,883, issued May 20, 2003; U.S. Pat. No. 6,586,941, issued Jul. 1, 2003; U.S. Pat. No. 6,597,150, issued Jul. 22, 2003; U.S. Pat. No. 6,621,272, issued Sep. 16, 2003; U.S. Pat. No. 6,623,314, issued Sep. 23, 2003; U.S. Pat. No. 6,633,165, issued Oct. 14, 2003; U.S. Pat. No. 6,635,974, issued Oct. 21, 2003; U.S. Pat. No. 6,696,819, issued Feb. 24, 20144; U.S. Pat. No. 6,707,303, issued Mar. 16, 2004; U.S. Pat. No. 6,737,831, issued May 18, 2004; U.S. Pat. No. 6,744,149, issued Jun. 1, 2004; U.S. Pat. No. 6,759,849, issued Jul. 6, 2004; U.S. Pat. No. 6,781,382, issued Aug. 24, 2004; U.S. Pat. No. 6,788,025, filed Sep. 7, 2004; U.S. Pat. No. 6,795,782, issued Sep. 21, 2004; U.S. Pat. No. 6,805, 090, filed Oct. 19, 2004; U.S. Pat. No. 6,806,716, filed Oct. 19, 2004; U.S. Pat. No. 6,850,037, filed Feb. 1, 2005; U.S. Pat. No. 6,850,037, issued Feb. 1, 2005; U.S. Pat. No. 6,871,151, issued Mar. 22, 2005; U.S. Pat. No. 6,885,195, issued Apr. 26, 2005; U.S. Pat. No. 6,888,468, issued May 3, 2005; U.S. Pat. No. 6,891,378, issued May 10, 2005; U.S. Pat. No. 6,906,522, issued Jun. 14, 2005; U.S. Pat. No. 6,906,523, issued Jun. 14, 2005; U.S. Pat. No. 6,909,287, issued Jun. 21, 2005; U.S. Pat. No. 6,914,413, issued Jul. 5, 2005; U.S. Pat. No. 6,913,483, issued Jul. 5, 2005; U.S. Pat. No. 6,930,485, issued Aug. 16, 2005; U.S. Pat. No. 6,933, 727, issued Aug. 23, 200; U.S. Pat. No. 6,941,234, filed Sep. 6, 2005; U.S. Pat. No. 6,967,484, issued Nov. 22, 2005; U.S. Pat. No. 6,998,847, issued Feb. 14, 2006; U.S. Pat. No. 7,003,410, issued Feb. 21, 2006; U.S. Pat. No. 7,003,411, issued Feb. 21, 2006; U.S. Pat. No. 7,012,433, issued Mar. 14, 2006; U.S. Pat. No. 7,015,674, issued Mar. 21, 2006; U.S. Pat. No. 7,034,541, issued Apr. 25, 2006; U.S. Pat. No. 7,039,533, issued May 2, 2006; U.S. Pat. No. 7,058,525, issued Jun. 6, 2006; U.S. Pat. No. 7,081,755, issued Jul. 25, 2006; U.S. Pat. No. 7,106,070, issued Sep. 12, 2006; U.S. Pat. No. 7,116,109, issued Oct. 3, 2006; U.S. Pat. No. 7,119,686, issued Oct. 10, 2006; and U.S. Pat. No. 7,126, 341, issued Oct. 24, 2006; U.S. Pat. No. 7,154,276, issued Dec. 26, 2006; U.S. Pat. No. 7,198,510, issued Apr. 3, 2007; U.S. Pat. No. 7,363,175, issued Apr. 22, 2008; U.S. Pat. No. 7,208,914, issued Apr. 24, 2007; U.S. Pat. No. 7,246,015, issued Jul. 17, 2007; U.S. Pat. No. 7,295,936, issued Nov. 13, 2007; U.S. Pat. No. 7,319,304, issued Jan. 15, 2008; U.S. Pat. No. 7,363,175, issued Apr. 22, 2008; U.S. Pat. No. 7,398,176, issued Jul. 8, 2008; U.S. Pat. No. 7,408,358, issued Aug. 5, 2008; U.S. Pat. No. 7,425,833, issued Sep. 16, 2008; U.S. Pat. No. 7,446,536, issued Nov. 4, 2008; U.S. Pat. No. 7,479,763, issued Jan. 20, 2009; U.S. Pat. No. 7,498,767, issued Mar. 3, 2009; U.S. Pat. No. 7,501,795, issued Mar. 10, 2009; U.S. Pat. No. 7,505,856, issued Mar. 17, 2009; U.S. Pat. No. 7,545,146, issued Jun. 9, 2009; U.S. Pat. No. 7,557,586, issued Jul. 7, 2009; U.S. Pat. No. 7,595,643, issued Sep. 29, 2009; U.S. Pat. No. 7,598,699, issued Oct. 6, 2009; U.S. Pat. No. 7,598,744, issued Oct. 6, 2009; U.S. Pat. No. 7,598,743, issued Oct. 6, 2009; U.S. Pat. No. 7,619,417, issued Nov. 17, 2009; U.S. Pat. No. 7,642, 786, issued Jan. 5, 2010; U.S. Pat. No. 7,642,787, issued Jan. 5, 2010; U.S. Pat. No. 7,656,162, issued Feb. 2, 2010; U.S. Pat. No. 7,688,074, issued Mar. 30, 2010; U.S. Pat. No. 7,705,602, issued Apr. 27, 2010; U.S. Pat. No. 7,706,992, issued Apr. 27, 2010; U.S. Pat. No. 7,710,119, issued May 4, 2010; U.S. Pat. No. 7,723,993, issued May 25, 2010; U.S. Pat. No. 7,728,597, issued Jun. 1, 2010; U.S. Pat. No. 7,772,850, issued Aug. 10, 2010; U.S. Pat. No. 7,774,151, issued Aug. 10, 2010; U.S. Pat. No. 7,777,612, issued Aug. 17, 2010; U.S. Pat. No. 7,791,348, issued Sep. 7, 2010; U.S. Pat. No. 7,808,375, issued Oct. 5, 2010; U.S. Pat. No. 7,924,015, issued Apr. 12, 2011; U.S. Pat. No. 7,940,053, issued May 10, 2011; U.S. Pat. No. 7,940,052, issued May 10, 2011; U.S. Pat. No. 7,959,476, issued Jun. 14, 2011; U.S. Pat. No. 7,977,914, issued Jul. 12, 2011; U.S. Pat. No. 7,999,505, issued Aug. 16, 2011; U.S. Pat. No. D643,759, issued Aug. 23, 2011; U.S. Pat. No. 8,164,343, issued Apr. 24, 2012; U.S. Pat. No. 8,198,900, issued Jun. 12, 2012; U.S. Pat. No. 8,203,345, issued Jun. 19, 2012; U.S. Pat. No. 8,237,448, issued Aug. 7, 2012; U.S. Pat. No. 8,306,690, issued Nov. 6, 2012; U.S. Pat. No. 8,344,685, issued Jan. 1, 2013; U.S. Pat. No. 8,436,619, issued May 7, 2013; U.S. Pat. No. 8,442,877, issued May 14, 2013; U.S. Pat. No. 8,493, 022, issued Jul. 23, 2013; U.S. Pat. No. D687,727, issued Aug. 13, 2013; U.S. Pat. No. 8,513,949, issued Aug. 20, 2013; U.S. Pat. No. 8,674,654, issued Mar. 18, 2014; U.S. Pat. No. 8,674,711, issued Mar. 18, 2014; U.S. Pat. No. 8,704,483, issued Apr. 22, 2014; U.S. Pat. No. 8,738,309, issued May 27, 2014; U.S. Pat. No. 8,754,653, issued Jun. 17, 2014; U.S. Pat. No. 8,872,516, issued Oct. 28, 2014; U.S. Pat. No. 8,872,517, issued Oct. 28, 2014; U.S. Pat. No.

8,958,998, issued Feb. 17, 2015; U.S. Pat. No. 8,963,550, issued Feb. 24, 2015; U.S. Pat. No. 9,018,958, issued Apr. 28, 2015; U.S. Pat. No. 9,052,366, issued Jun. 9, 2015; U.S. Pat. No. 9,201,120, issued Dec. 1, 2015; U.S. Pat. No. 9,229,062, issued Jan. 5, 20126; U.S. Pat. No. 9,244,100, issued Jan. 26, 2016; U.S. Pat. No. 9,255,955, issued Feb. 9, 2016; U.S. Pat. No. 9,274,157, issued Mar. 1, 2016; U.S. Pat. No. 9,312,575, issued Apr. 12, 2016; U.S. Pat. No. 9,335, 362, issued May 10, 2016; U.S. Pat. No. 9,425,487, issued Aug. 23, 2016; U.S. Pat. No. 9,419,311, issued Aug. 16, 2016; U.S. Pat. No. 9,496,720, issued Nov. 15, 2016; U.S. Pat. No. 9,588,185, issued Mar. 7, 2017; U.S. Pat. No. 9,923,289, issued Mar. 20, 2018; U.S. Pat. No. 9,966,676, issued May 8, 2018; U.S. Pat. No. 10,046,649, issued Aug. 14, 2018; U.S. Pat. No. 10,222,397, issued Mar. 5, 2019; U.S. Pat. No. 10,317,468, issued Jun. 11, 2019; U.S. Pat. No. 10,429,449, issued Oct. 1, 2019; U.S. Pat. No. 10,473,555, issued Nov. 12, 2019; U.S. Pat. No. 10,608,353, issued Mar. 31, 2020; U.S. Pat. No. 10,843,574, issued Nov. 24, 2020; U.S. Pat. No. 11,054,480, issued Jul. 6, 2021; U.S. Pat. No. 11,325,479, issued May 10, 2022; U.S. Pat. No. 11,474,153, issued Oct. 18, 2022; U.S. Pat. No. 11,486,930, issued Nov. 1, 2022; U.S. Pat. No. 11,513,160, issued Nov. 29, 2022; U.S. Pat. No. 11,545,839, issued Jan. 3, 2023; U.S. Pat. No. 11,548,404, issued Jan. 10, 2023; U.S. Pat. No. 11,566,972, issued Jan. 31, 2023; U.S. Ser. No. 09/780,146, filed Feb. 9, 2001, entitled STORAGE BATTERY WITH INTEGRAL BATTERY TESTER; U.S. Ser. No. 09/756,638, filed Jan. 8, 2001, entitled METHOD AND APPARATUS FOR DETERMINING BATTERY PROPERTIES FROM COMPLEX IMPEDANCE/ADMITTANCE; U.S. Ser. No. 09/862,783, filed May 21, 2001, entitled METHOD AND APPARATUS FOR TESTING CELLS AND BATTERIES EMBEDDED IN SERIES/PARALLEL SYSTEMS; U.S. Ser. No. 09/880, 473, filed Jun. 13, 2001; entitled BATTERY TEST MODULE; U.S. Ser. No. 10/109,734, filed Mar. 28, 2002, entitled APPARATUS AND METHOD FOR COUNTERACTING SELF DISCHARGE IN A STORAGE BATTERY; U.S. Ser. No. 10/263,473, filed Oct. 2, 2002, entitled ELECTRONIC BATTERY TESTER WITH RELATIVE TEST OUTPUT; U.S. Ser. No. 09/653,963, filed Sep. 1, 2000, entitled SYSTEM AND METHOD FOR CONTROLLING POWER GENERATION AND STORAGE; U.S. Ser. No. 10/174, 110, filed Jun. 18, 2002, entitled DAYTIME RUNNING LIGHT CONTROL USING AN INTELLIGENT POWER MANAGEMENT SYSTEM; U.S. Ser. No. 10/258,441, filed Apr. 9, 2003, entitled CURRENT MEASURING CIRCUIT SUITED FOR BATTERIES; U.S. Ser. No. 10/681,666, filed Oct. 8, 2003, entitled ELECTRONIC BATTERY TESTER WITH PROBE LIGHT; U.S. Ser. No. 11/207,419, filed Aug. 19, 2005, entitled SYSTEM FOR AUTOMATICALLY GATHERING BATTERY INFORMATION FOR USE DURING BATTERY TESTER/CHARGING, U.S. Ser. No. 11/356,443, filed Feb. 16, 2006, entitled ELECTRONIC BATTERY TESTER WITH NETWORK COMMUNICATION; U.S. Ser. No. 12/697,485, filed Feb. 1, 2010, entitled ELECTRONIC BATTERY TESTER; U.S. Ser. No. 12/769, 911, filed Apr. 29, 2010, entitled STATIONARY BATTERY TESTER; U.S. Ser. No. 13/152,711, filed Jun. 3, 2011, entitled BATTERY PACK MAINTENANCE FOR ELECTRIC VEHICLE; U.S. Ser. No. 14/039,746, filed Sep. 27, 2013, entitled BATTERY PACK MAINTENANCE FOR ELECTRIC VEHICLE; U.S. Ser. No. 14/565,589, filed Dec. 10, 2014, entitled BATTERY TESTER AND BATTERY REGISTRATION TOOL; U.S. Ser. No. 15/017,887, filed Feb. 8, 2016, entitled METHOD AND APPARATUS FOR MEASURING A PARAMETER OF A VEHICLE ELECTRICAL SYSTEM; U.S. Ser. No. 15/049,483, filed Feb. 22, 2016, entitled BATTERY TESTER FOR ELECTRIC VEHICLE; U.S. Ser. No. 15/077,975, filed Mar. 23, 2016, entitled BATTERY MAINTENANCE SYSTEM; U.S. Ser. No. 15/149,579, filed May 9, 2016, entitled BATTERY TESTER FOR ELECTRIC VEHICLE; U.S. Ser. No. 16/021,538, filed Jun. 28, 2018, entitled BATTERY PACK MAINTENANCE FOR ELECTRIC VEHICLE; U.S. Ser. No. 16/253,526, filed Jan. 22, 2019, entitled HIGH CAPACITY BATTERY BALANCER; U.S. Ser. No. 16/297,975, filed Mar. 11, 2019, entitled HIGH USE BATTERY PACK MAINTENANCE; U.S. Ser. No. 17/086,629, filed Nov. 2, 2020, entitled HYBRID AND ELECTRIC VEHICLE BATTERY PACK MAINTENANCE DEVICE; U.S. Ser. No. 17/136,600, filed Dec. 29, 2020, entitled INTELLIGENT MODULE INTERFACE FOR BATTERY MAINTENANCE DEVICE; U.S. Ser. No. 17/364,953, filed Jul. 1, 2021, entitled ELECTRICAL LOAD FOR ELECTRONIC BATTERY TESTER AND ELECTRONIC BATTERY TESTER INCLUDING SUCH ELECTRICAL LOAD; U.S. Ser. No. 17/504,897, filed Oct. 19, 2021, entitled HIGH CAPACITY BATTERY BALANCER; U.S. Ser. No. 17/739,393, filed May 9, 2022, entitled HYBRID AND ELECTRIC VEHICLE BATTERY PACK MAINTENANCE DEVICE; U.S. Ser. No. 17/750,719, filed May 23, 2022, entitled BATTERY MONITORING SYSTEM; U.S. Ser. No. 17/893,412, filed Aug. 23, 2022, entitled POWER ADAPTER FOR AUTOMOTIVE VEHICLE MAINTENANCE DEVICE; U.S. Ser. No. 18/166,702, filed Feb. 9, 2023, entitled BATTERY MAINTENANCE DEVICE WITH HIGH VOLTAGE CONNECTOR; all of which are incorporated herein by reference in their entireties.

Although the present invention has been described with reference to preferred embodiments, workers skilled in the art will recognize that changes may be made in form and detail without departing from the spirit and scope of the invention.

What is claimed is:

1. A battery maintenance system comprising:

a first unit comprising a battery maintenance device;

a second unit comprising a battery maintenance device;

a third unit having a power supply and voltage input-output circuitry configured to couple to a battery;

a fourth unit having an operator interface;

wherein each of the first, second, third and fourth units are encased in a housing and include physical connectors that allow the first unit, the second unit, the third unit and the fourth unit to be coupled together in a stacked configuration in a user selectable order; and wherein each of the first, the second, the third and the fourth units includes a channel that extends from a bottom panel of each housing to a top panel of each housing and has channel walls, each channel configured to house cables to electrically interconnect each of the units to each other.

2. The battery maintenance system of claim 1, wherein the physical connectors of the first and second units are coupled together and the first and second units are sandwiched between the third unit and the fourth unit so that the third unit is located below the first and second units and the fourth unit is located above the first and second units.

3. The battery maintenance system of claim 1, wherein each of the first unit, the second unit, the third unit and the fourth unit include four physical connectors located at each corner of the housing of each unit.

4. The battery maintenance system of claim 3, wherein each physical connector comprises a vertical member having a first end and an opposing second end and an extension protruding from the first end, wherein the second ends of the vertical members of the four physical connectors of the second unit are mounted to the extensions of the four physical connectors of the first unit.

5. The battery maintenance system of claim 1, wherein one of the channel walls of each channel comprises a removable cover that allows user access from an exterior of each housing of each unit.

6. A battery maintenance system comprising:

a plurality of separable units coupled together and including a first battery maintenance device having a first set of physical connectors each located at a corner of a housing of the first battery maintenance device and a second battery maintenance device including a second set of physical connectors each located at a corner of a housing of the second battery maintenance device, wherein each physical connector of the first set of physical connectors aligns with one of the physical connectors of the second set of physical connectors;

wherein each physical connector of the first battery maintenance device and each physical connector of the second battery maintenance device comprises:

a vertical member having a first end and an opposing second end; and an extension protruding from the first end;

wherein the second end of each of the vertical members of the physical connectors on the second battery maintenance devices are mounted to one of the extensions of the physical connectors on the first battery maintenance device; and wherein the housing of each of the plurality of separable units comprises a channel configured to allow cables to run between the plurality of separable units when coupled together.

7. The battery maintenance system of claim 6, wherein each of the vertical members of the first set of physical connectors and the second set of physical connectors are at least partially hollow.

8. The battery maintenance system of claim 6, wherein the plurality of separable units further comprise a base unit including a third set of physical connectors each located at a corner of a housing of the base unit, wherein each physical connector of the third set of physical connectors aligns with one of the physical connectors of the first set of physical connectors and wherein each physical connector of the third set of physical connectors comprises a vertical member having a first end with a protruding extension and an opposing second end.

9. The battery maintenance system of claim 8, wherein the second end of each of the vertical members of the first set of physical connectors are mounted to one of the extensions of the third set of connectors on the base unit.

10. The battery maintenance system of claim 6, further comprising a set of wheels, wherein the second end of each of the vertical members of the third set of connectors on the base unit is mounted to one of the set of wheels.

11. The battery maintenance system of claim 6, wherein the plurality of units further comprise a top unit including a fourth set of physical connectors each located at a corner of a housing of the top unit, wherein each physical connector of the fourth set of physical connectors aligns with one of the physical connectors of the second set of physical connectors and wherein each physical connector of the fourth set of physical connectors comprises a vertical member having a first end with a protruding extension and an opposing second end.

12. The battery maintenance system of claim 11, further comprising a pair of rail members and associated four corner members, wherein each first, second, third and fourth corner member is mounted to one of the extensions of the fourth set of physical connectors on the top unit, wherein a first rail member connects the first and second corner members and a second rail member connects the third and fourth corner members.

13. The battery maintenance system of claim 6, wherein the first battery maintenance device comprises a battery discharging unit.

14. The battery maintenance system of claim 6, wherein the second battery maintenance device comprises a battery charging unit.

15. A battery maintenance system comprising:

a plurality of separable units each enclosed in a housing and coupled to each other, the plurality of separable units including at least first and second units comprising battery maintenance devices, a third unit comprising a base unit that provides a power supply, voltage input-output circuitry configured to couple to a battery and at least one digital communication module for the battery maintenance system and a fourth unit comprising an operator input/output interface for the battery maintenance system; and wherein each of the first unit, the second unit, the third unit and the fourth unit includes a channel that extends from a bottom of each unit to a top of each unit and has channel walls, each channel configured to house cables to electrically interconnect each of the units together.

16. The battery maintenance system of claim 15, wherein one of the channel walls of each channel comprises a removable cover that allows user access from an exterior of each housing of each unit.

17. The battery maintenance system of claim 15, wherein each of the plurality of separable units enclosed in a housing comprises four physical connectors located at each corner of each housing, wherein each physical connector on each unit includes a vertical member having a first end and an opposing second end and an extension protruding from the first end, wherein the second end of each of the vertical members of the connectors on the second unit are mounted to one of the extensions of the connectors on the first unit.

* * * * *